United States Patent
Hirayama et al.

(10) Patent No.: US 10,310,164 B2
(45) Date of Patent: Jun. 4, 2019

(54) DISPLAY BACKLIGHT HAVING LIGHTGUIDE WITH VARIABLE DENSITY LIGHT EXTRACTION ELEMENTS

(71) Applicant: Sharp Kabushiki Kaisha, Sakai, Osaka (JP)

(72) Inventors: Yoshinobu Hirayama, Sakai (JP); Takao Imaoku, Sakai (JP); Shugo Yagi, Yonago (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 57 days.

(21) Appl. No.: 15/533,946

(22) PCT Filed: Dec. 3, 2015

(86) PCT No.: PCT/JP2015/083966
§ 371 (c)(1),
(2) Date: Jun. 7, 2017

(87) PCT Pub. No.: WO2016/093137
PCT Pub. Date: Jun. 16, 2016

(65) Prior Publication Data
US 2017/0363798 A1 Dec. 21, 2017

(30) Foreign Application Priority Data
Dec. 10, 2014 (JP) .................................. 2014-249944

(51) Int. Cl.
*G02B 6/00* (2006.01)
*F21V 8/00* (2006.01)
(Continued)

(52) U.S. Cl.
CPC ......... *G02B 6/0055* (2013.01); *G02B 6/0036* (2013.01); *G02B 6/0053* (2013.01);
(Continued)

(58) Field of Classification Search
CPC .. G02B 6/0035; G02B 6/0011; G02B 6/0033; G02B 6/0036; G02B 6/0038;
(Continued)

(56) References Cited

U.S. PATENT DOCUMENTS 5,390,436 A * 2/1995 Ashall ................. G02B 6/0043
362/618
6,692,133 B2 * 2/2004 Katsu ................... G02B 6/0038
349/64

(Continued)

FOREIGN PATENT DOCUMENTS

JP 2002-050219 A 2/2002
JP 2012-113891 A 6/2012

*Primary Examiner* — Ismael Negron
(74) *Attorney, Agent, or Firm* — ScienBiziP, P.C.

(57) ABSTRACT

A lighting device includes a light guide plate, a plurality of LEDs positioned to project light into a first side surface of the light guide plate, a reflection sheet facing a bottom surface of the light guide plate, a plurality of reflective elements on a light exit surface of the light guide plate opposite the bottom surface and extending in a direction parallel to the first side surface, and a plurality of convex elements on the bottom surface of the light guide plate. The density of the convex elements increases with increasing distance from the light source.

14 Claims, 26 Drawing Sheets

(51) Int. Cl.
*G02F 1/1333* (2006.01)
*G02F 1/1335* (2006.01)
*G02F 1/1362* (2006.01)
*G02F 1/1368* (2006.01)
*G02F 1/1337* (2006.01)

(52) U.S. Cl.
CPC ......... G02B 6/0061 (2013.01); G02B 6/0085 (2013.01); G02B 6/0091 (2013.01); G02F 1/1368 (2013.01); G02F 1/13338 (2013.01); G02F 1/133308 (2013.01); G02F 1/133502 (2013.01); G02F 1/133514 (2013.01); G02F 1/136286 (2013.01); *G02B 6/009* (2013.01); *G02B 6/0038* (2013.01); *G02B 6/0088* (2013.01); *G02F 1/1337* (2013.01); *G02F 1/133512* (2013.01); *G02F 1/133528* (2013.01); *G02F 2001/13629* (2013.01); *G02F 2001/133302* (2013.01); *G02F 2001/133331* (2013.01); *G02F 2201/123* (2013.01)

(58) Field of Classification Search
CPC .. G02B 6/0051; G02B 6/0053; G02B 6/0058; G02B 6/0061
USPC .................................................. 362/620, 626
See application file for complete search history.

(56) References Cited

U.S. PATENT DOCUMENTS

| | | | | |
|---|---|---|---|---|
| 7,128,456 B2* | 10/2006 | Yamashita | ............... | G02B 5/30 362/606 |
| 7,226,197 B2* | 6/2007 | Hayashi | ............... | G02B 6/0016 362/330 |
| 7,393,131 B2* | 7/2008 | Yu | ........................ | G02B 6/0043 362/619 |
| 7,510,315 B2* | 3/2009 | Hsu | ..................... | G02B 6/0036 362/615 |
| 7,543,973 B2* | 6/2009 | Shimura | ............. | G02B 3/0031 362/619 |
| 7,568,828 B2* | 8/2009 | Chen | .................... | G02B 6/0036 362/614 |
| 7,936,420 B2* | 5/2011 | Kim | .................... | G02B 6/0038 349/65 |
| 8,136,976 B2* | 3/2012 | Wang | .................. | G02B 6/0061 349/62 |
| 9,766,390 B2* | 9/2017 | Lee | ..................... | G02B 6/0038 |
| 2002/0015300 A1 | 2/2002 | Katsu et al. | | |
| 2012/0134175 A1* | 5/2012 | Kunimasa | ........... | G02B 6/0016 362/602 |
| 2013/0194823 A1* | 8/2013 | Yagi | .................... | G02B 6/0038 362/607 |
| 2014/0146561 A1 | 5/2014 | Yuki et al. | | |

* cited by examiner

FIG.14

| PHOTO | | COMPARATIVE EXAMPLE 1 | COMPARATIVE EXAMPLE 2 | FIRST EMBODIMENT |
|---|---|---|---|---|
| OCCUPIED RATIO OF OPPOSITE PLATE SURFACE SIDE CONVEX LENTICULAR LENS PORTIONS (OCCUPIED RATIO OF FLAT PORTIONS) | LIGHT ENTRANCE SURFACE SIDE EDGE PORTION | 60% (40%) | 100% (0%) | 60% (40%) |
| | OPPOSITE EDGE SURFACE SIDE EDGE PORTION | 35% (65%) | 100% (0%) | 90% (10%) |
| INTERFERENCE UNEVENNESS | | YES | NO | ALLOWABLE |
| LUMINANCE UNEVENNESS | | NO | YES | ALLOWABLE |
| LUMINANCE RATIO (%) | | 100 | 94 | 98 |

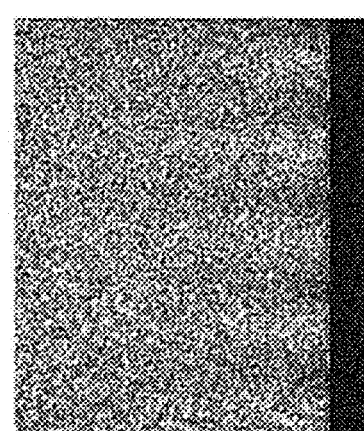

FIG.20

| | FIRST POSITION | | SECOND POSITION | | THIRD POSITION | | FOURTH POSITION | | FIFTH POSITION | |
|---|---|---|---|---|---|---|---|---|---|---|
| | HEIGHT DIMENSION OF THE UNIT REFLECTION PORTION (μm) | REPRODUCI- BILITY | HEIGHT DIMENSION OF THE UNIT REFLECTION PORTION (μm) | REPRODUCI- BILITY | HEIGHT DIMENSION OF THE UNIT REFLECTION PORTION (μm) | REPRODUCI- BILITY | HEIGHT DIMENSION OF THE UNIT REFLECTION PORTION (μm) | REPRODUCI- BILITY | HEIGHT DIMENSION OF THE UNIT REFLECTION PORTION (μm) | REPRODUCI- BILITY |
| COMPARA- TIVE EXAMPLE 5 | 0.60 | NOT GOOD | 0.81 | NOT GOOD | 1.14 | NOT GOOD | 1.72 | NOT GOOD | 4.34 | GOOD |
| FIRST EMBODI- MENT | 3.05 | ALMOST GOOD | 3.24 | GOOD | 3.53 | GOOD | 4.16 | GOOD | 6.13 | GOOD |

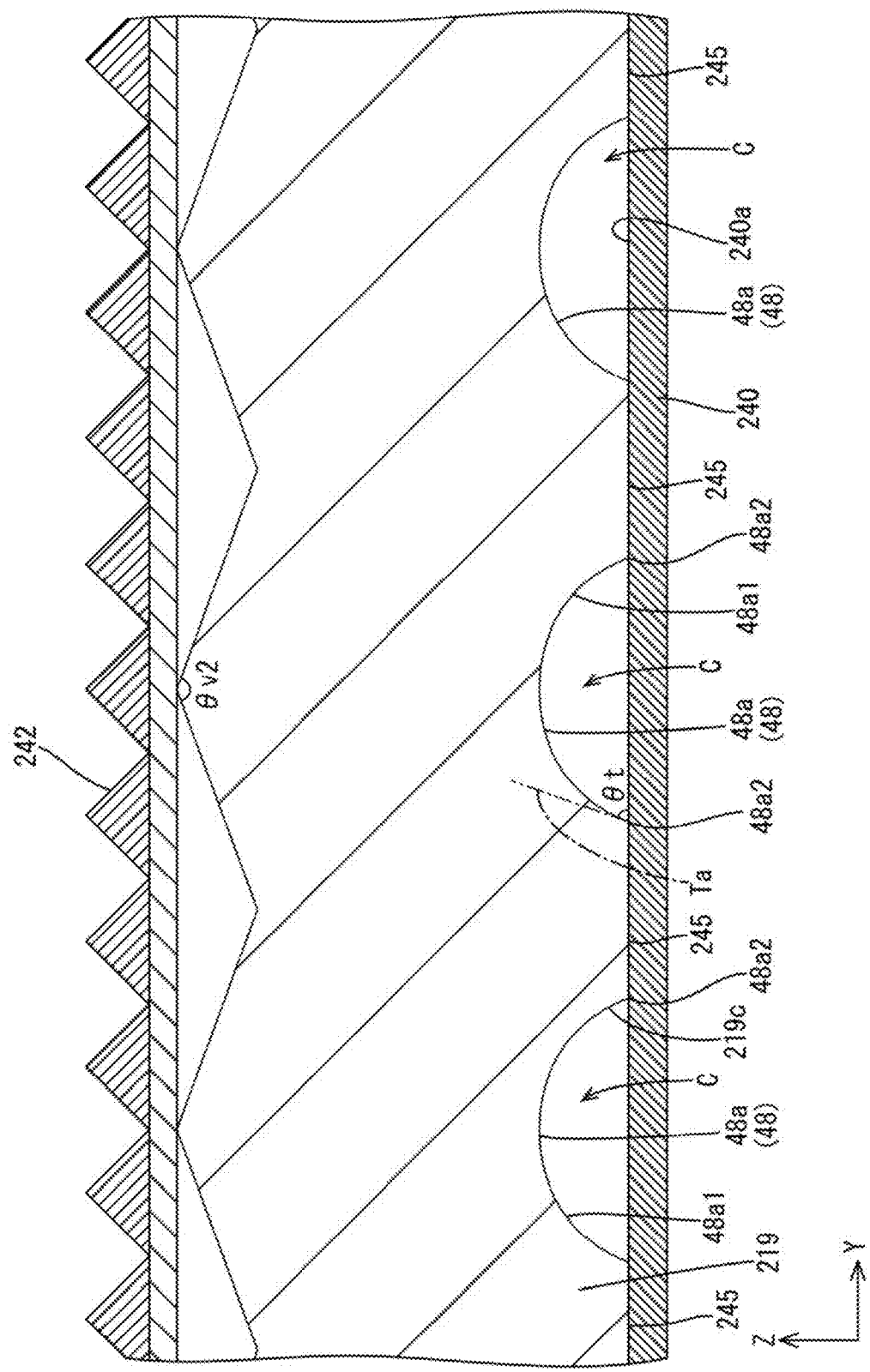

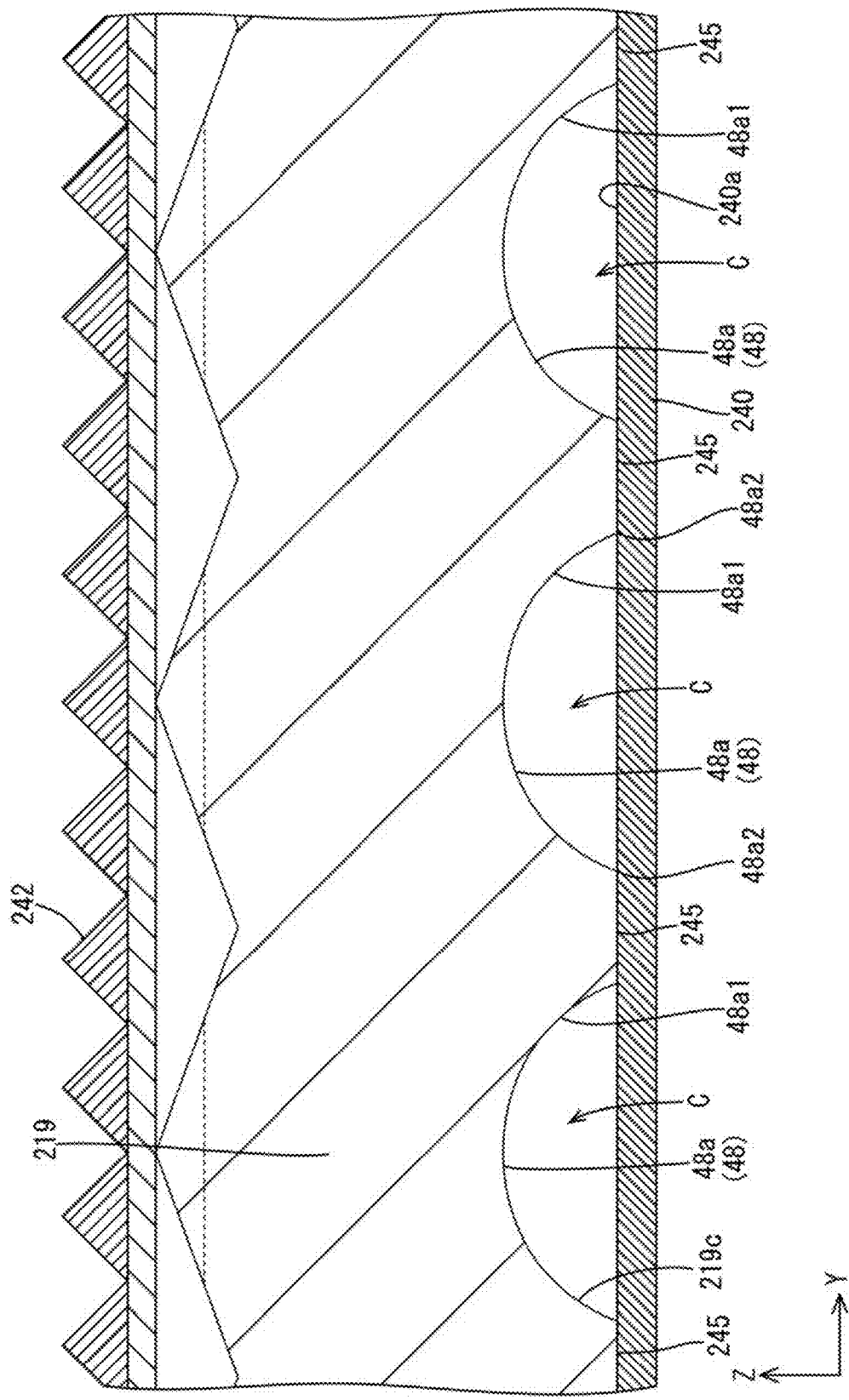

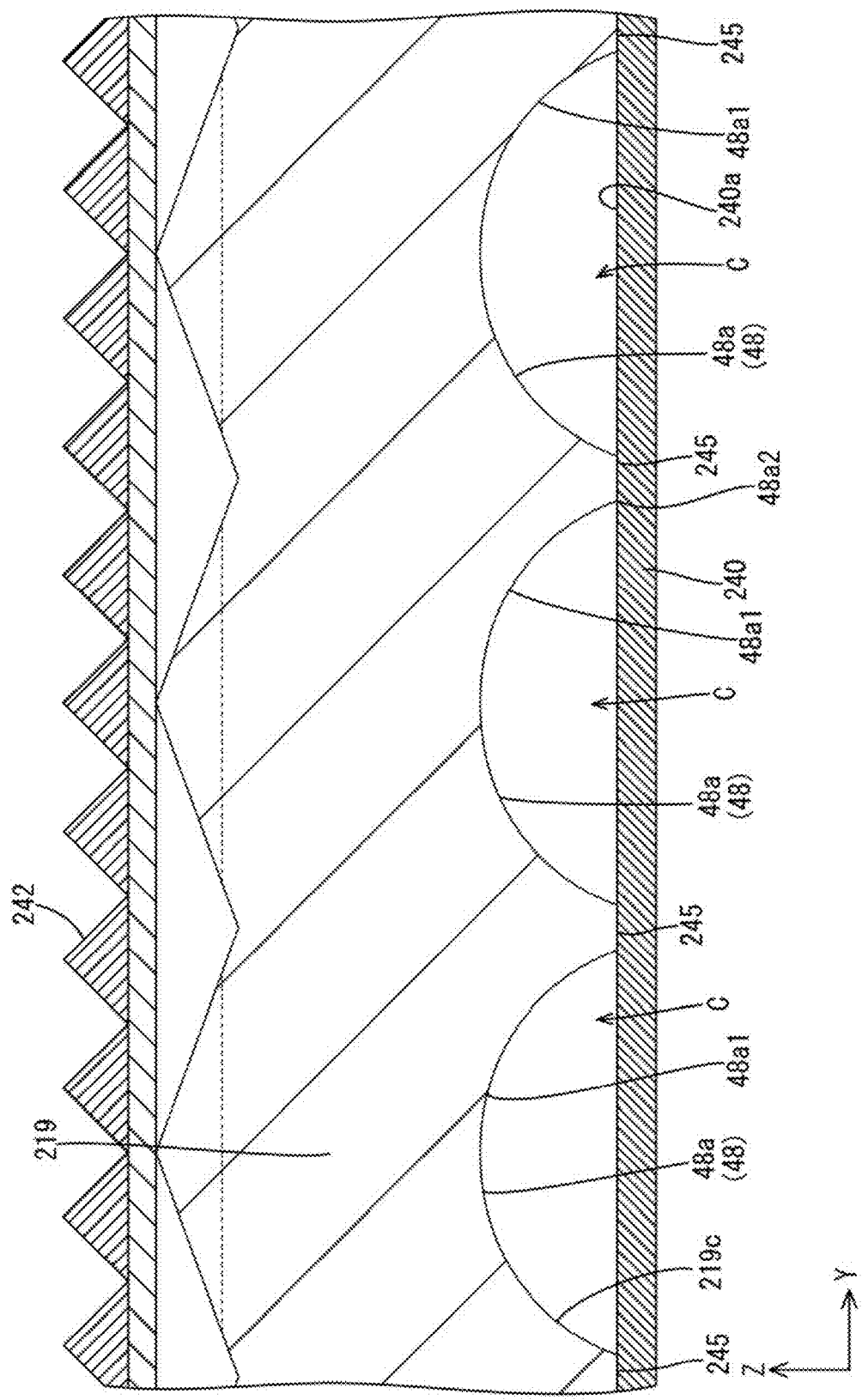

DISPLAY BACKLIGHT HAVING LIGHTGUIDE WITH VARIABLE DENSITY LIGHT EXTRACTION ELEMENTS

TECHNICAL FIELD

The present invention relates to a lighting device and a display device.

BACKGROUND ART

In recent years, displays in image display devices are being shifted from conventional cathode-ray tube displays to thin display panels, such as liquid crystal panels and plasma display panels. With the thin displays, thicknesses of the image display devices can be decreased. Liquid crystal panels used for the liquid crystal display device do not emit light. Therefore, liquid crystal display devices including liquid crystal panels require backlight devices. The backlight devices are classified broadly into a direct type and an edge-light type based on mechanisms. The edge-light type backlight device includes a light source arranged on an edge portion, a light guide plate that guides light from the light source, and optical member that changes optical properties of light from the light guide plate and provides even planar light to the liquid crystal panel. A backlight device disclosed in Patent Document 1 is known as an example of the kind. In the configuration of Patent Document 1, the light exit surface or the opposing surface of the light guide extends in a direction facing the light entrance surface and includes multiple convex and concave portions in the light guide plate. The convex and concave portions include a flat surface on a bottom portion of a concave portion or on a top portion of a convex portion.

RELATED ART DOCUMENT

Patent Document

Patent Document 1: Japanese Unexamined Patent Application Publication No. 2002-50219

Problem to be Solved by the Invention

In the configuration of Patent Document 1, the light emitted by a lamp and entering the light guide plate through the light entrance surface is reflected by a reflection processing portion disposed on a back surface of the light guide plate while travelling within the light guide plate, and the light exits through the light exit surface. However, the light reflected by the reflection processing portion on the back surface of the light guide plate promptly travels toward the light exit surface. Therefore, the light is less likely to be dispersed effectively in a longitudinal direction of the light entrance surface. Accordingly, luminance unevenness is likely to be caused in the exit light through the light exit surface with respect to the longitudinal direction. Interference unevenness may be caused if the luminance unevenness is to be obviated.

Disclosure of the Present Invention

An object of the present invention is to increase luminance with reducing luminance unevenness and interference unevenness.

Means for Solving the Problem

To solve the above problem, a lighting device includes light sources, a guide plate having a rectangular plate shape having outer peripheral edge surfaces and plate surfaces, the outer peripheral edge surfaces including a pair of edge surfaces that are opposite from each other and one of the pair of edge surfaces being a light entrance surface through which light emitted by the light source enters and one of the plate surfaces being a light exit surface through which the light exits and another one of the plate surfaces being an opposite plate surface, a reflecting member arranged opposite the opposite plate surface of the light guide plate and reflecting the light, an exit light reflection portion disposed on a side of the light exit surface of the light guide plate and reflecting light travelling within the light guide plate to accelerate exiting of the light through the light exit surface, the exit light reflection portion including unit reflecting portions extending in a second direction that is parallel to the pair of edge surfaces of the outer peripheral edge surfaces of the light guide plate including the light entrance surface, the unit reflecting portions being arranged at intervals in a first direction that is parallel to another pair of edge surfaces of the outer peripheral edge surfaces of the light guide plate not including the light entrance surface, an opposite plate surface-side anisotropic light collecting portion included on a side of the opposite plate surface of the light guide plate, the plate surface-side anisotropic light collecting portion including opposite plate surface-side cylindrical lenses that extend in the first direction and are arranged in the second direction, the opposite plate surface-side anisotropic light collecting portion having a relatively low occupied ratio with respect to the second direction in a portion near the light entrance surface in the first direction and having a relatively high occupied ratio in a portion far away from the light entrance surface, and flat portions included on a side of the opposite plate surface of the light guide plate and being flat in the first direction and the second direction and having a relatively high occupied ratio to the opposite plate surface with respect to the second direction in a portion near the light entrance surface in the first direction and having a relatively low occupied ratio in a portion far away from the light entrance surface.

According to such a configuration, the light emitted by the light source enters the light guide plate through the light entrance surface and travels within the light guide plate with reflecting off the exit light reflection portion included on the light exit surface side of the light guide plate. The unit reflecting portions extend in the second direction and are arranged in the first direction at intervals. Therefore, the unit reflecting portions reflect the light traveling within the light guide plate in the first direction toward the opposite plate surface. The light reflected by the exit light reflection portion toward the opposite plate surface is totally reflected by the opposite plate surface or passes through the opposite plate surface and is reflected by the reflecting member. Thereafter, the light exits through the light exit surface.

If the exit light reflection portion is included on the opposite plate surface side, the light is reflected by the exit light reflection portion directly toward the light exit surface and exits therethrough. Compared to this configuration, with the configuration in that the exit light reflection portion is included on the light exit surface side of the light guide plate, light is reflected by the exit light reflection portion toward the opposite plate surface and the light may be totally reflected by the opposite plate surface or reflected by the reflecting member toward the light exit surface again. Then, the light exits through the light exit surface. Namely, a path of light reflecting off the exit light reflection portion and exiting through the light exit surface is complicated. Especially, the light reflecting off the reflecting member is refracted at least twice when exiting through the opposite plate surface toward the reflecting member and when reflecting off the reflecting member and entering through the opposite plate surface. The light is likely to be dispersed in the second direction due to the refraction, and the light is effectively mixed with respect to the second direction and luminance unevenness is less likely to occur in the exit light through the light exit surface with respect to the second direction.

However, the light reflecting off the exit light reflection portion and reaching the opposite plate surface of the light guide plate may be totally reflected by the opposite plate surface toward the light exit surface or may pass through the opposite plate surface and reflect off the reflecting member and enter through the opposite plate surface and travel toward the light exit surface. Therefore, the phases of light travelling in the two paths may be matched, and interference unevenness may be caused in the exit light exiting through the light exit surface. The light guide plate includes the opposite plate surface-side anisotropic light collecting portion on the opposite plate surface of the light guide plate. The opposite plate surface-side anisotropic light collecting portion includes opposite plate surface-side cylindrical lenses each of which extends in the first direction and that are arranged in the second direction. A distance between each of the opposite plate surface-side cylindrical lenses and the reflecting member changes according to a position with respect to the second direction. Therefore, a phase of the light that is totally reflected at a border surface of each opposite plate surface-side cylindrical lens is less likely to match a phase of the light that passes through each opposite plate surface-side cylindrical lens and reflects off the reflecting member. Thus, interference unevenness is likely to be reduced.

When the light travelling within the light guide plate may be reflected by a border surface of the opposite plate surface-side cylindrical lenses of the opposite plate surface-side anisotropic light collecting portion, the reflected light is less likely to be dispersed over an area greater than an area, with respect to the second direction, where the opposite plate surface-side cylindrical lenses are formed. The opposite plate surface-side cylindrical lenses selectively collect the light reflected by the exit light reflecting member with respect to the second direction. The light affected by the anisotropic light collecting action is less likely to be used effectively by the optical member if the light guide plate includes the optical member. Therefore, if the opposite plate surface-side anisotropic light collecting portion is arranged over an entire area of the opposite plate surface of the light guide plate, luminance unevenness is caused with respect to the second direction in the exit light through the light exit surface due to the arrangement of the light source and the luminance may be lowered. Luminance unevenness may be distinct in a portion near the light entrance surface with respect to the first direction. The light guide plate includes the opposite plate surface-side anisotropic light collecting portion and also the plate portions on the opposite plate surface of the light guide plate. The flat portions are flat to be parallel to the first direction and the second direction, and the flat portions are less likely to change optical properties of light. The flat portions are likely to disperse light over a larger area with respect to the second direction compared to the opposite plate surface-side anisotropic light collecting portion and luminance is less likely to be lowered.

Regarding the occupied ratio of the opposite plate surface-side anisotropic light collecting portion and that of the flat portions to the opposite plate surface with respect to the second direction, the occupied ratio of the opposite plate surface-side anisotropic light collecting portion is relatively low near the light entrance surface in the first direction and the occupied ratio of the flat portions is relatively high near the light entrance surface in the first direction. The occupied ratio of the opposite plate surface-side anisotropic light collecting portion is relatively high far away from the light entrance surface in the first direction and the occupied ratio of the flat portions is relatively low far away from the light entrance surface. In the portion near the light entrance surface with respect to the first direction, luminance unevenness may be caused with respect to the second direction due to the light source. In such a portion near the light entrance surface, the luminance unevenness is less likely to be caused with respect to the second direction and luminance is less likely to be lowered in the exit light through the light exit surface by forming the flat portions having a relatively high occupied ratio. In the portion far from the light entrance surface with respect to the first direction where the luminance unevenness is less likely to be caused due to the light source, the interference unevenness is less likely to be caused by forming the opposite plate surface-side anisotropic light collecting portion having a relatively high occupied ratio. Accordingly, the luminance unevenness and the interference unevenness are less likely to be caused and the luminance is improved.

The present invention may further include a following configuration.

(1) The opposite plate surface-side anisotropic light collecting portion may have the occupied ratio that is continuously and gradually increased as is farther away from the light entrance surface with respect to the first direction and the flat portions may have the occupied ratio that is continuously and gradually decreased as is farther away from the light entrance surface with respect to the first direction. According to such a configuration, compared to a configuration in that the occupied ratio of each of the opposite plate surface-side anisotropic light collecting portion and the flat portions is varied in a stepwise manner, occurrence of the luminance unevenness and the interference unevenness is effectively suppressed and luminance is effectively improved.

(2) The opposite plate surface-side anisotropic light collecting portion and the flat portions may be disposed on an entire area of the opposite plate surface with respect to the first direction, respectively. According to such a configuration, occurrence of luminance unevenness and interference unevenness is effectively suppressed in the portion of the light guide plate near the light entrance surface with respect to the first direction and in the portion of the light guide plate far away from the light entrance surface, and the luminance is effectively improved compared to the following configuration. The opposite plate surface-side anisotropic light collecting portion is not included but only the flat portions are included on the portion of the opposite plate surface close to the light entrance surface with respect to the first direction, and the flat portions are not included but only the opposite plate surface-side anisotropic light collecting portion is included on the portion of the opposite plate surface far from the light entrance surface.

(3) The opposite plate surface-side anisotropic light collecting portion may have the occupied ratio of 60% in a portion of the light guide plate closest to the light entrance surface in the first direction and may have the occupied ratio of 90% in a portion of the light guide plate farthest from the light entrance surface, and the flat portions may have the occupied ratio of 40% in a portion of the light guide plate closest to the light entrance surface in the first direction and may have the occupied ratio of 10% in a portion of the light guide plate farthest from the light entrance surface. According to such a configuration, occurrence of the luminance unevenness and the interference unevenness is effectively suppressed and luminance is effectively improved in the portion of the light guide plate close to the light entrance surface with respect to the first direction and the portion thereof far from the light entrance surface.

(4) Among the outer peripheral edge surfaces of the light guide plate, one of the pair of edge surfaces that are opposite each other maybe the light entrance surface and another one may be a non-light entrance opposite surface, and the opposite plate surface-side anisotropic light collecting portion and the flat portions may be disposed such that the occupied ratio of the opposite plate surface-side anisotropic light collecting portion is continuously and gradually increased and the occupied ratio of the flat portions is continuously and gradually decreased from the light entrance surface side to the opposite edge surface side with respect to the first direction. In such a one-side light entrance type lighting device, occurrence of the luminance unevenness and the interference unevenness is effectively suppressed from the light entrance surface side to the non-light entrance opposite surface side with respect to the first direction, and the luminance is effectively improved.

(5) The opposite plate surface-side cylindrical lenses of the opposite plate surface-side anisotropic light collecting portion may include single opposite plate surface-side cylindrical lenses and continuous opposite plate surface-side cylindrical lenses. The flat portions may be disposed between the single opposite plate surface-side cylindrical lenses with respect to the second direction, and the continuous opposite plate surface-side cylindrical lenses may be arranged continuously to each other in the second direction and have different height dimensions. According to such a configuration, a clearance between the reflecting member and each of the single opposite plate surface-side cylindrical lenses, the flat portions, and the continuous opposite plate surface-side cylindrical lenses is varied in more complicated way according to the position with respect to the second direction. Therefore, a phase of light totally reflecting off border surfaces of the single opposite plate surface-side cylindrical lenses, the flat portions, and the continuous opposite plate surface-side cylindrical lenses is less likely to match a phase of light passes through the single opposite plate surface-side cylindrical lenses, the flat portions, and the continuous opposite plate surface-side cylindrical lenses and reflecting off the reflecting member. Accordingly, interference unevenness is further reduced.

(6) The lighting device may further include a light exit surface-side anisotropic light collecting portion that is included on the side of the light exit surface side of the light guide plate, and the light exit surface-side anisotropic light collecting portion may include light exit surface-side unit light collecting portions that extend in the first direction and are arranged in the second direction. According to such a configuration, the anisotropic light collecting action is applied by the light exit surface-side anisotropic light collecting portion to at least a part of rays of light that is reflected by the exit light reflection portion toward the opposite plate surface of the light guide plate and reaching the light exit surface again. Namely, the light exit surface-side anisotropic light collecting portion include the light exit surface-side unit light collecting portions that extend in the first direction and are arranged in the second direction, and therefore, the light exiting the light exit surface-side unit light collecting portions includes light that is selectively provided with the light collecting action with respect to the second direction in which the light exit surface-side unit light collecting portions are arranged. The light traveling within the light guide plate in the first direction without being reflected by the exit light reflection portion is totally reflected by the light exit surface-side unit light collecting portions so as to travel within the light guide plate with being dispersed in the second direction. Accordingly, the light travelling within the light guide plate is effectively mixed with respect to the second direction and the luminance unevenness is less likely to be caused in the exit light through the light exit surface with respect to the second direction.

(7) The unit reflecting portions of the exit light reflection portion may include separated unit reflecting portions that are arranged at intervals in the second direction. In the unit reflecting portions, the amount of reflecting light tends to be proportional to a surface area thereof. Therefore, the size of the surface area is determined so as to obtain a required amount of reflecting light. If the unit reflecting portions extend over an entire length of the light guide plate in the second direction, a dimension of the unit reflection portions in the normal line of the plate surface of the light guide plate cannot be greater than a certain value to set the surface area of the unit reflecting portions to the above value. With the configuration in that the unit reflecting portions include the separated unit reflecting portions that are arranged at intervals in the second direction, the dimension of the unit reflecting portions with respect to the normal line of the plate surface of the light guide plate can be relatively increased to set the surface area of the unit reflecting portions to the above value. Therefore, the separated unit reflecting portions of the unit reflecting portions on the opposite plate surface are likely to be formed as is designed when the light guide plate is formed with resin and the exit light reflection portion is integrally formed with the opposite plate surface. Accordingly, the exit light reflection portion can effectively exert the optical properties.

If the unit reflecting portions extend over an entire length of the light guide in the second direction, the number of the unit reflecting portions arranged in the first direction is reduced to adjust the total area of the surface areas of the unit reflecting portions. However, the interval between the unit reflecting portions arranged in the first direction is increased and luminance unevenness may be caused. With the configuration in that the unit reflecting portions include the separated unit reflecting portions arranged at intervals in the second direction, the number and the arrangement intervals of the unit reflecting portions arranged in the first direction is not necessary to be changed. Therefore, the luminance unevenness is less likely to be caused in the exit light from the lighting device.

(8) The unit reflecting portions may be formed by cutting off a part of a top portion of each of the light exit surface-side unit light collecting portions of the light exit surface-side anisotropic light collecting portion to be open in the second direction. If the unit reflecting portions are not open in the second direction but have side surfaces parallel to the first direction, the light is refracted or reflected by the side surfaces parallel to the first direction and the light collecting performance by the light exit surface-side anisotropic light collecting portions may be deteriorated. The exit light reflection portion is configured such that the unit reflecting portions are open in the second direction by cutting off a part of the top portion side of the light exit surface-side unit light collecting portions and therefore, the light exit surface-side anisotropic light collecting portions effectively exert the light collecting performance and the luminance of the exit light from the lighting device is increased.

(9) The light exit surface-side unit light collecting portions of the light exit surface-side anisotropic light collecting portion may include unit prisms each having an apex angle within a range from 135° to 155° or 100°. According to such a configuration, the luminance of the exit light is higher than that in the configuration in that the apex angle of the unit prisms 43a is smaller than 135° and is not 100° or greater than 150°.

(10) The light exit surface-side unit light collecting portions of the light exit surface-side anisotropic light collecting portion may include unit prisms each having an apex angle of 150°. According to such a configuration, the luminance of the exiting light is improved most effectively.

(11) The lighting device may further include a light exit side anisotropic light collecting portion disposed on the light exit side with respect to the light guide plate and including light exit-side unit light collecting portions extending in the first direction and arranged in the second direction. According to such a configuration, the light exiting the light guide plate through the light exit surface is applied with the anisotropic light collecting properties by the light exit-side anisotropic light collecting portion arranged on the light exit side with respect to the light guide plate. The light exit-side anisotropic light collecting portion includes the light exit-side unit light collecting portions extending in the first direction and arranged in the second direction and with such a configuration, the light exiting the light exit-side unit light collecting portions is selectively applied with the light collecting action with respect to the second direction in which the light exit-side unit light collecting portions are arranged. Accordingly, the luminance of the exit light from the lighting device can be increased.

Next, to solve the above problem, a display device includes the above lighting device and a display panel displaying images using light from the lighting device.

According to the display device having such a configuration, luminance unevenness and interference unevenness are less likely to be caused in exiting light of the lighting device and luminance is improved. Therefore, images are displayed with good display quality.

Advantageous Effect of the Invention

According to the present invention, luminance is improved with reducing luminance unevenness and interference unevenness.

BRIEF DESCRIPTION OF THE DRAWINGS

FIG. 14 is a table illustrating photographs of light guide plates according to Comparative Examples 1, 2 and a first embodiment taken from the light exit surface side, judgement results regarding interference unevenness and luminance unevenness, and luminance ratios in Comparative Experiment 1.

FIG. 15 is a table illustrating photographs of light guide plates according to Comparative Example 3 and the first embodiment taken from the light exit surface side, luminance ratios, judgement results regarding luminance unevenness, and average Cm values in Comparative Experiment 2.

FIG. 20 is a table representing height dimensions of the unit reflection portion and shape reproducibility of the unit reflection portion in each of a first position to a fifth position of each of the light guide plates according to Comparative Example 5 and the first embodiment in Comparative Experiment 5.

FIG. 24 is a cross-sectional view illustrating a cross-sectional configuration of a light entrance surface-side edge portion of a backlight device with respect to a long-side direction (the first direction, the X-axis direction) according to third second embodiment of the present invention, the cross-sectional view being taken along a short-side direction (the second direction, the Y-axis direction).

FIG. 25 is a cross-sectional view illustrating a cross-sectional configuration of a middle portion of the backlight device with respect to the long-side direction (the first direction, the X-axis direction) taken along the short-side direction (the second direction, the Y-axis direction).

FIG. 26 is a cross-sectional view of an opposite edge surface-side edge portion of the backlight device with respect to the long-side direction (the first direction, the X-axis direction) taken along the short-side direction (the second direction, the Y-axis direction).

MODES FOR CARRYING OUT THE INVENTION

First Embodiment

Figure 1:
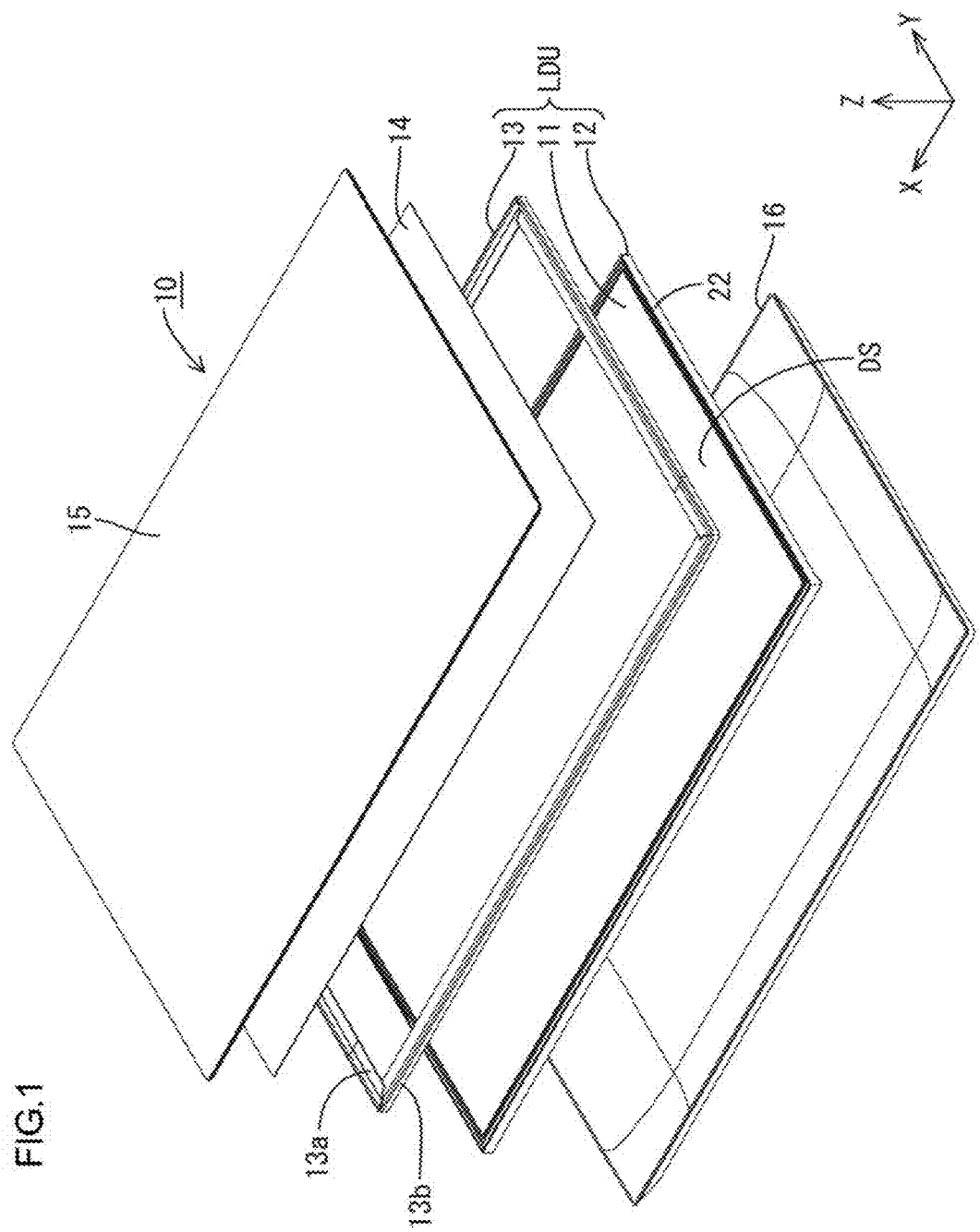
FIG. 1 is an exploded perspective view illustrating a general configuration of a liquid crystal display device according to a first embodiment of the present invention.

A first embodiment of the present invention will be described with reference to FIGS. 1 to 20. In the present embodiment, a liquid crystal display device 10 will be described as an example. X-axis, the Y-axis and the Z-axis may be present in the drawings and each of the axial directions represents a direction represented in each drawing. An up-down direction is referred to FIGS. 3 to 5 and an upper side and a lower side in the drawings correspond to a front side and a back side, respectively.

As illustrated in FIG. 1, the liquid crystal display device 10 has a rectangular plan-view shape as a whole, and includes a liquid display unit LDU that is a base component, and a touch panel 14, a cover panel (a protection panel, a cover glass) 15, and a casing 16 that are mounted in the liquid crystal display unit LDU. The liquid crystal display unit LDU includes a liquid crystal panel 11 (a display panel), a backlight device 12 (a lighting device), and a frame 13 (casing member). The liquid crystal panel 11 has a display surface DS displaying images on a front side. The backlight device 12 is disposed on the back side of the liquid crystal panel 11 and light exits the backlight device 12 toward the liquid crystal panel 11. The frame 13 presses the liquid crystal panel 11 from the front side or an opposite side from the backlight device 12 with respect to the liquid crystal panel 11 (from a display surface DS side). The touch panel 14 and the cover panel 15 are arranged within the frame 13 of the liquid crystal display unit LDU1 from the front side and the frame 13 receives outer peripheral portions (including outer peripheral edge portions) of the panels from the back side. The touch panel 14 is spaced from the liquid crystal panel 11 on the front side with a predetermined clearance and has a back side (inner side) plate surface that is an opposite surface that is opposite the display surface DS. The cover panel 15 overlaps the touch panel 14 on the front side and has a back side (inner side) plate surface that is an opposite surface opposite the front side plate surface of the touch panel 14. An antireflection film AR is disposed between the touch panel 14 and the cover panel 15 (see FIG. 5). The casing 16 is mounted in the frame 13 to cover the liquid crystal display unit LDU from the back side. Among the components of the liquid crystal display devices 10, a part of the frame 13 (a loop portion 13b, which will be described later), the cover panel 15, and the casing 16 provide an outer appearance of the liquid crystal display device 10. The liquid crystal display device 10 of the present embodiment is used in electronic devices such as smartphones and a screen size thereof is approximately 5 inches.

Figure 3:
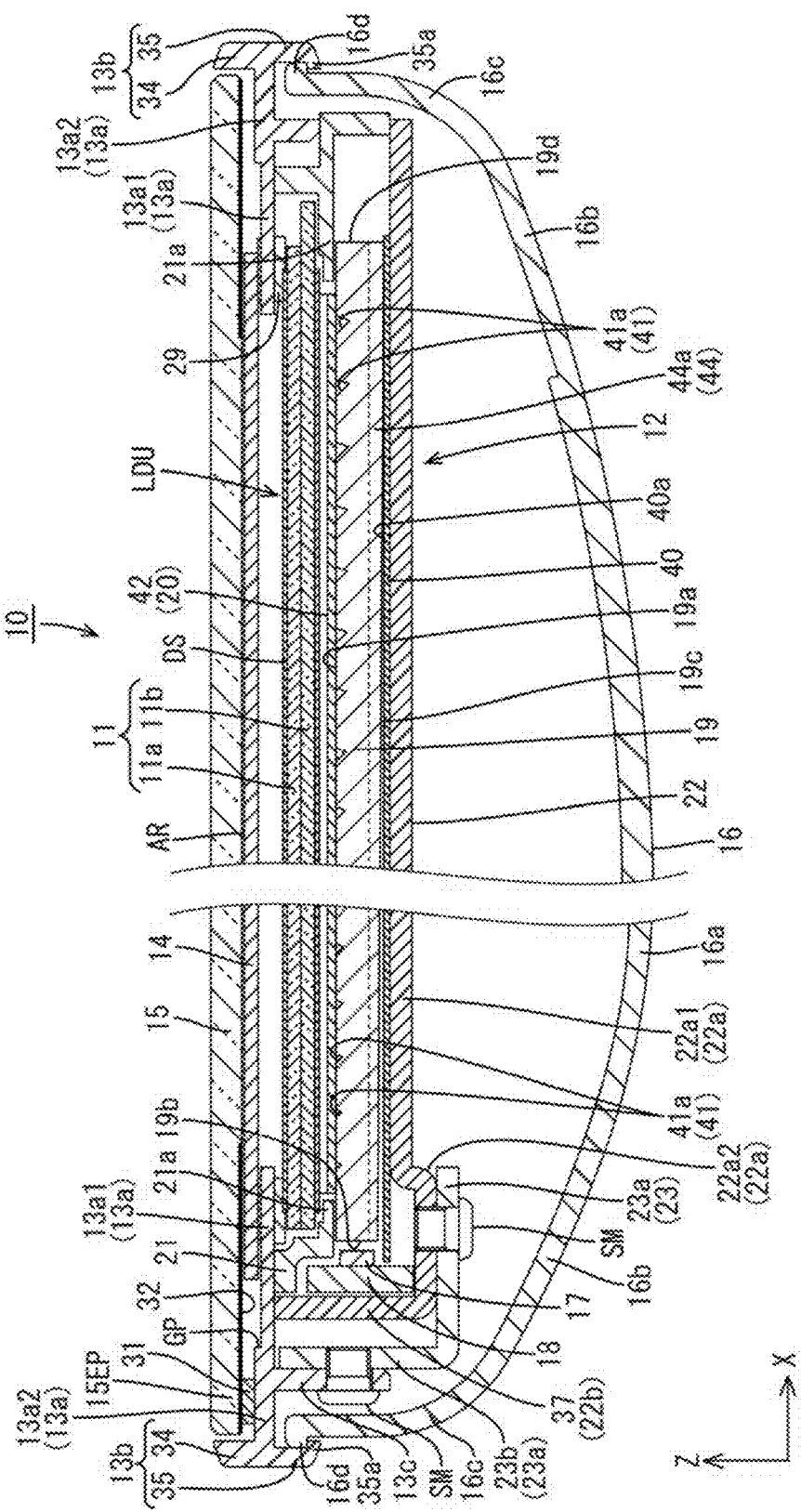
FIG. 3 is a cross-sectional view illustrating a cross-sectional configuration taken along a long-side direction (a first direction, X-axis direction) of the liquid crystal display device.
Figure 4:
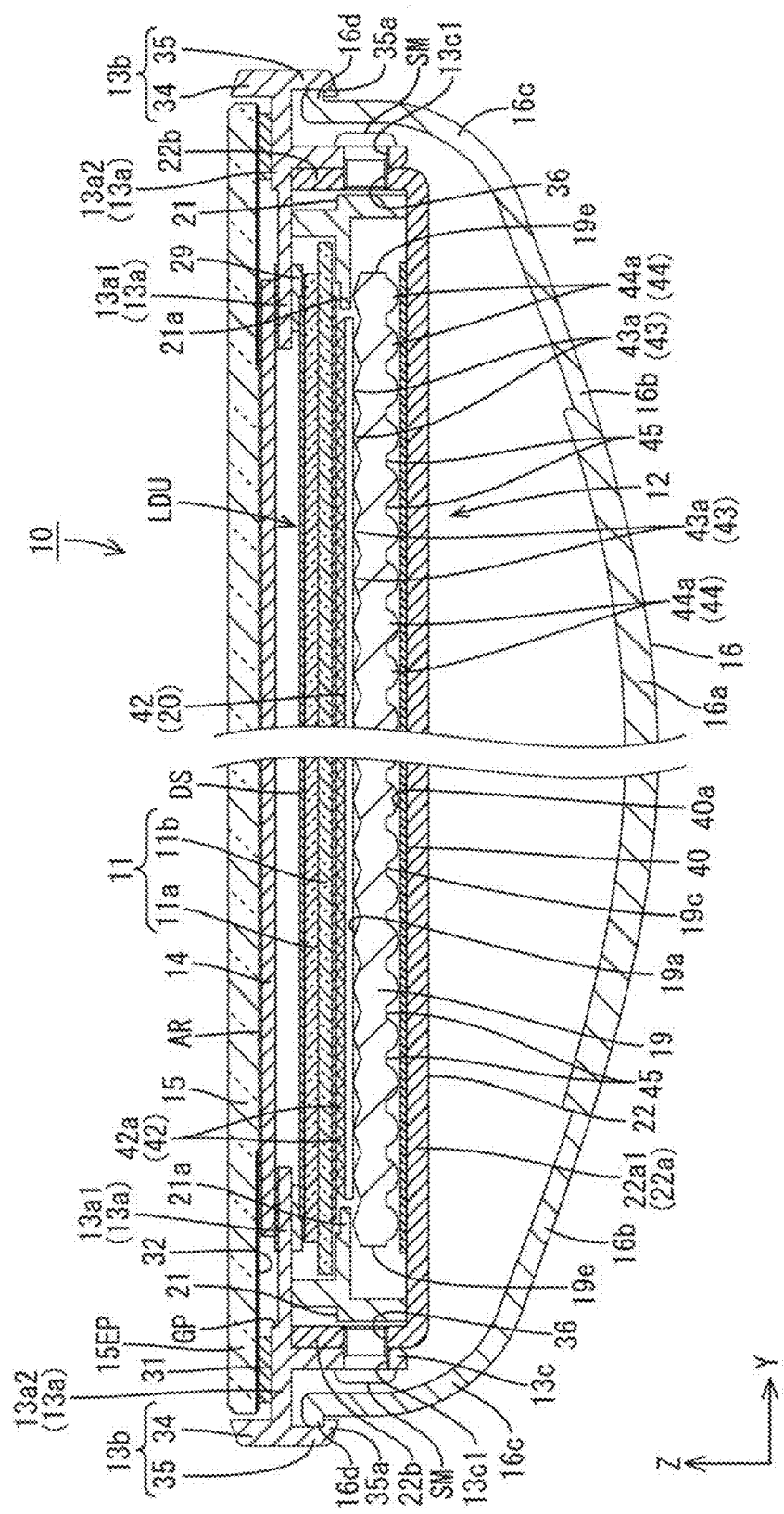
FIG. 4 is a cross-sectional view illustrating a cross-sectional configuration taken along a short-side direction (a second direction, Y-axis direction) of the liquid crystal display device.

The liquid crystal panel 11 included in the liquid crystal display unit LDU will be described in detail. As illustrated in FIGS. 3 and 4, the liquid crystal panel 11 includes a pair of substrates 11a, 11b and a liquid crystal layer (not illustrated) interposed between the substrates 11a, 11a. The substrates 11a, 11b have a plan view rectangular shape and are made of glass that is substantially transparent and has high transmissivity. The liquid crystal layer includes liquid crystal molecules having optical characteristics that change according to application of the electric field. The substrates 11a, 11b are adhered to each other via a sealing member (not illustrated) with having a gap of the liquid crystal layer therebetween. The liquid crystal panel 11 includes a display area where images are displayed (a middle portion surrounded by a plate surface light blocking layer 32, which will described later) and a non-display area formed in a frame shape surrounding the display area and where no image is displayed (an outer peripheral portion overlapping the plate surface light blocking layer 32). A long-side direction of the liquid crystal panel 11 matches the X-axis direction and a short-side direction matches the Y-axis direction, and a thickness direction matches the Z-axis direction.

Among the substrates 11a, 11b, a front-side (front-surface side) one is a color filter (CF) substrate 11A and a back-side (rear-surface side) one is an array substrate 11b. TFTs (thin film transistors), which are switching components, and pixel electrodes are disposed on an inner surface side (a liquid crystal layer side, on a side opposite the CF board 11a) with respect to the array board 11b. Gate lines and source lines are routed in a matrix near the TFTs and the pixel electrodes. The gate lines and the source lines receive certain image signals from a control circuit (not illustrated). The pixel electrode that is arranged in a square area defined by the gate lines and the source lines may be a transparent conductive film made of ITO (Indium Oxide Tin), and ZnO (Zinc oxide).

On the CF substrate 11a, color filters are arranged to overlap each of the pixel electrodes. The color filters includes red (R), green (G), and blue (B) color portions that are arranged alternately. A light blocking layer (a black matrix) is formed between the color portions to prevent mixing of the colors. Counter electrodes are arranged on surfaces of the color filter and the light blocking layer. The counter electrodes are opposite the pixel electrodes on the array substrate 11b side. The CF substrate 11a is slightly smaller than the array substrate 11b. Alignment films are disposed on the inner surface side of the substrates 11a, 11b to align the liquid crystal molecules included in the liquid crystal layer. Polarizing plates 11c, 11d are attached to the outer surfaces of the substrates 11a and 11b, respectively (see FIG. 5).

Figure 2:
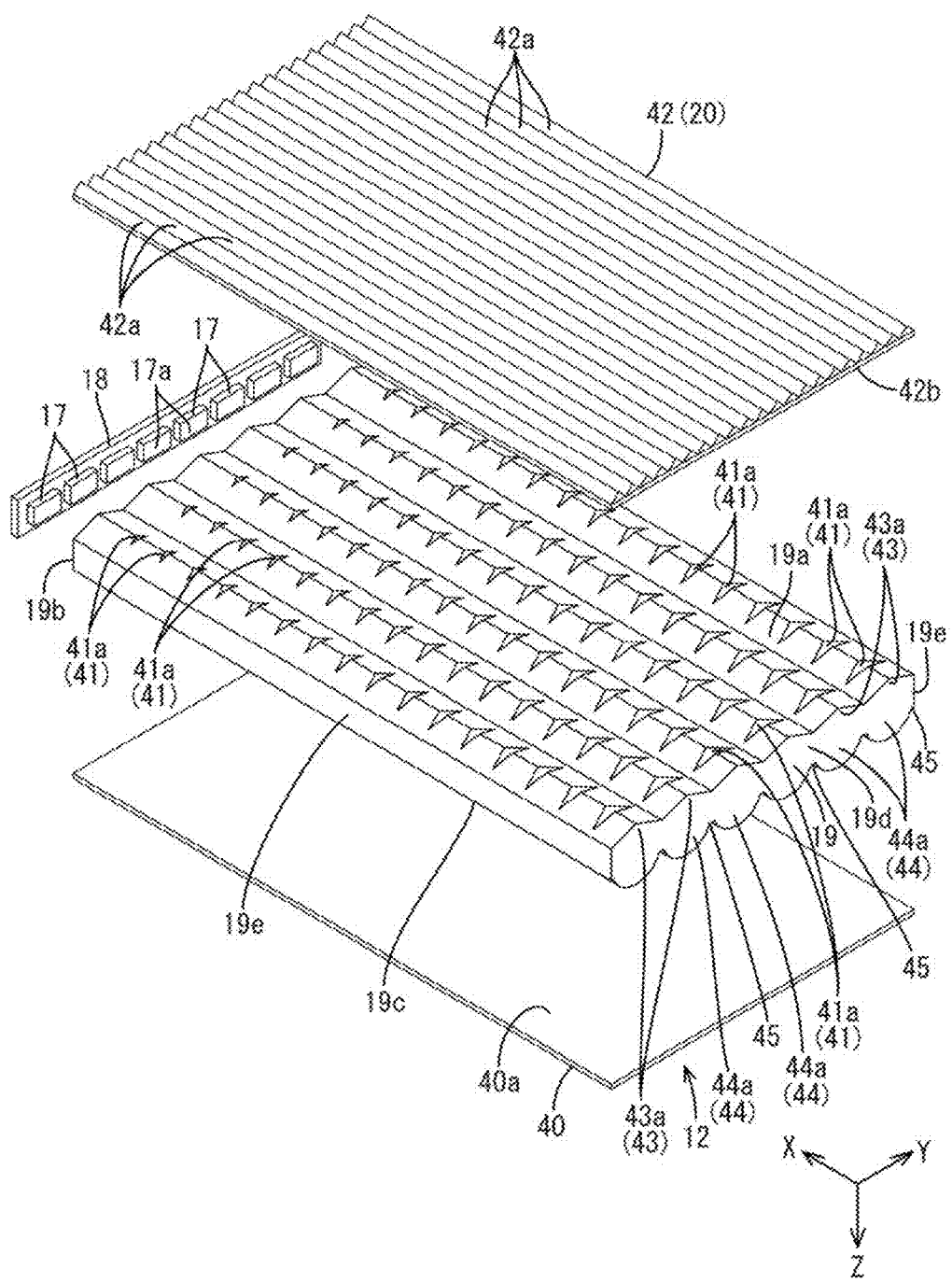
FIG. 2 is an exploded perspective view illustrating a general configuration of a liquid crystal display device included in the liquid crystal display device.

Next, the backlight device 12 of the liquid crystal display unit LDU will be described in detail. As illustrated in FIG. 1, the backlight device 12 has a plan-view rectangular block shape as a whole similar to that of the liquid crystal panel 11. As illustrated in FIGS. 2 to 4, the backlight device 12 includes LEDs 17 (light emitting diodes) that are light sources, an LED board 18 (a light source board) where the LEDs 17 are mounted, a light guide plate 19 that guides light from the LEDs 17, a light reflection sheet 40 (a light reflecting member) that reflects light from the light guide plate 19, an optical sheet 20 (a light exit-side anisotropic light collecting member, an optical member) that is layered on the light guide plate 19, a light blocking frame 21 that presses the light guide plate 19 from the front side, a chassis 22 where the LED board 18, the light guide plate 19, the optical sheet 20, and the light blocking frame 21 are arranged, and a heat dissipation member 23 that is arranged to be in contact with an outer surface of the chassis 22. The backlight device 12 includes the LEDs 17 (the LED board 18) on a short-side edge portion of an outer peripheral portion thereof and light enters through one side surface. The backlight device 12 is an edge-light type (a side-light type).

Figure 5:
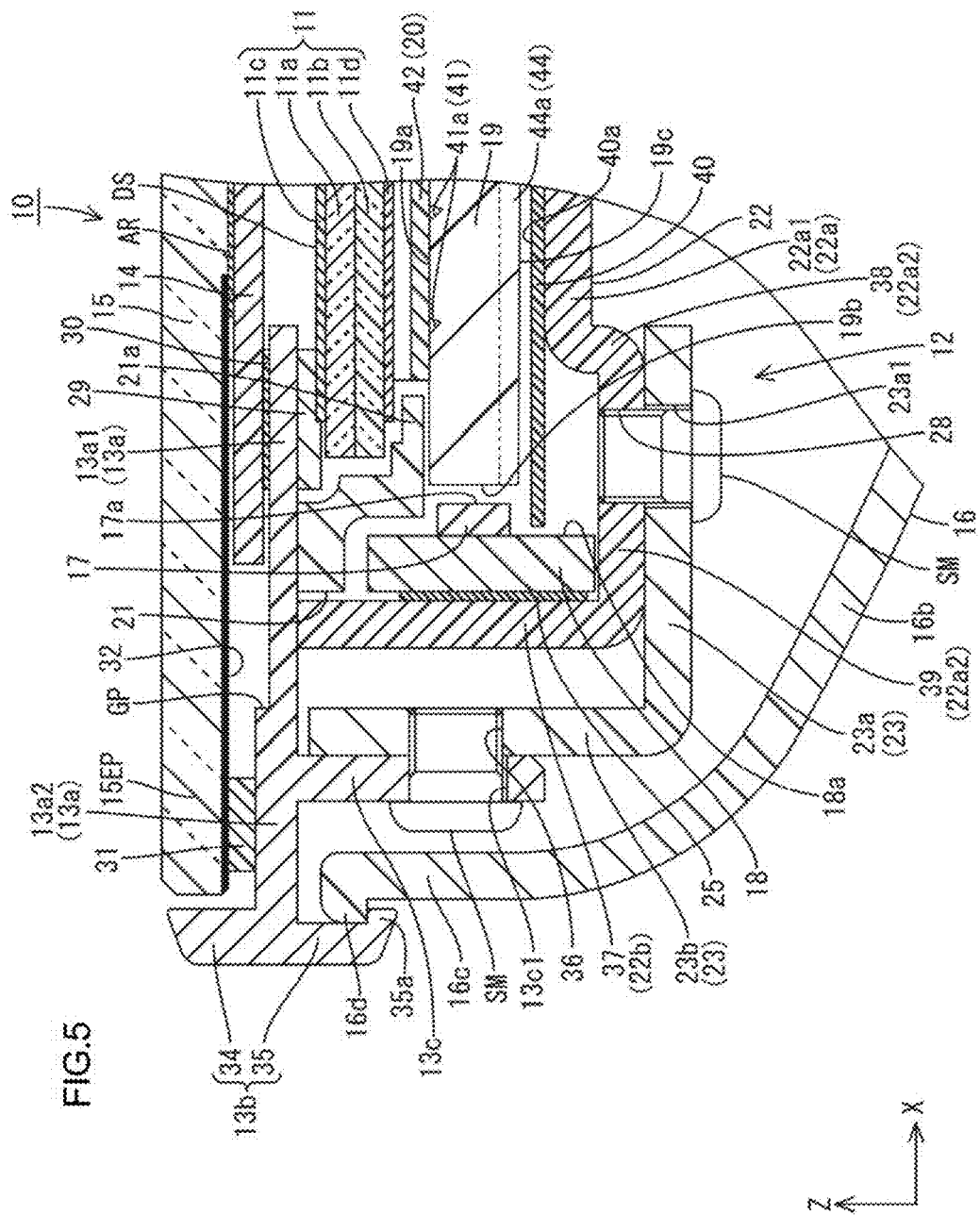
FIG. 5 is a cross-sectional view illustrating a vicinity of a LED in FIG. 3.

As illustrated in FIGS. 2, 3 and 5, the LEDs 17 are mounted on a base board that is fixed on the LED board 18 and the LEDs 17 are configured by enclosing LED chips with resin material on the base board. The LED chips mounted on the base board emit light having one main light emission wavelength and specifically emit single blue light. Phosphors are dispersed in the resin material with which the LED chips are enclosed and the phosphors are excited by the blue light emitted by the LED chips and emits light of predetermined color and the LEDs 17 emit substantially white light as a whole. As the phosphors, yellow phosphors that emit yellow light, green phosphors that emit green light, and red phosphors that emit red light may be used in combination or the phosphors of a single color may be used. The LEDs 17 are side-surface emitting type where side surfaces of the LEDs 17 are light emitting surfaces 17a. The side surfaces of the LEDs 17 are opposite surfaces from the mounting surfaces that are mounted on the LED board 18.

As illustrated in FIGS. 2, 3 and 5 the LED board 18 has an elongated plate shape that extends in the Y-axis direction (in the short side direction of the light guide plate 19 and the chassis 22). The LED board 18 is arranged in the chassis 22 such that a plate surface thereof is parallel to a Y-Z plane or is perpendicular to plate surfaces of the liquid crystal panel 11 and the light guide plate 19. Namely, the LED board 18 is arranged such that a long-side direction of the plate surface thereof matches the Y-axis direction and a short-side direction matches the Z-axis direction, and a thickness direction that is perpendicular to the plate surface thereof matches the X-axis direction. The LED board 18 is arranged such that an inner plate surface thereof (a mounting surface 18a) is opposite a short-side edge surface of the light guide plate (a light entrance surface 19b, a light source opposing edge surface) with a predetermined clearance in the X-axis direction. Therefore, a direction in which the LEDs 17, the LED board 18, and the light guide plate 19 are arranged substantially matches the X-axis direction. The LED board 18 has a length dimension that is substantially same as or greater than the short-side dimension of the light guide plate 19 and is mounted on a short-side edge portion of the chassis 22, which will be described later.

As illustrated in FIG. 5, the LEDs 17 having the above configuration are mounted on an inner plate surface (an opposing surface opposite the light guide plate 19) of the LED board 18 facing the light guide plate 19. The inner plate surface is the mounting surface 18a. The LEDs 17 are arranged along a line (linearly) in a longitudinal direction (the Y-axis direction) of the LED board 18 on the mounting surface at a predetermined interval. The LEDs 17 are arranged at intervals in the short-side direction on the short-side edge portion of the backlight device 12. The interval (an arrangement interval) between the adjacent LEDs 17 is substantially equal. The LED board 18 includes a tracing pattern (not illustrated) on the mounting surface thereof. The tracing pattern is made of a metal film (such as a copper foil) and extends in the Y-axis direction to cross the LEDs 17 and connect the adjacent LEDs 17 in series. The tracing pattern has end terminals that are connected to an external LED driving circuit so that driving power is supplied to the LEDs 17. A substrate of the LED board 18 is metal same as the chassis 22 and the tracing pattern (not illustrated) is formed on the surface of the substrate via an insulation layer. An insulation material such as ceramics may be used for the substrate of the LED board 18.

Figure 6:
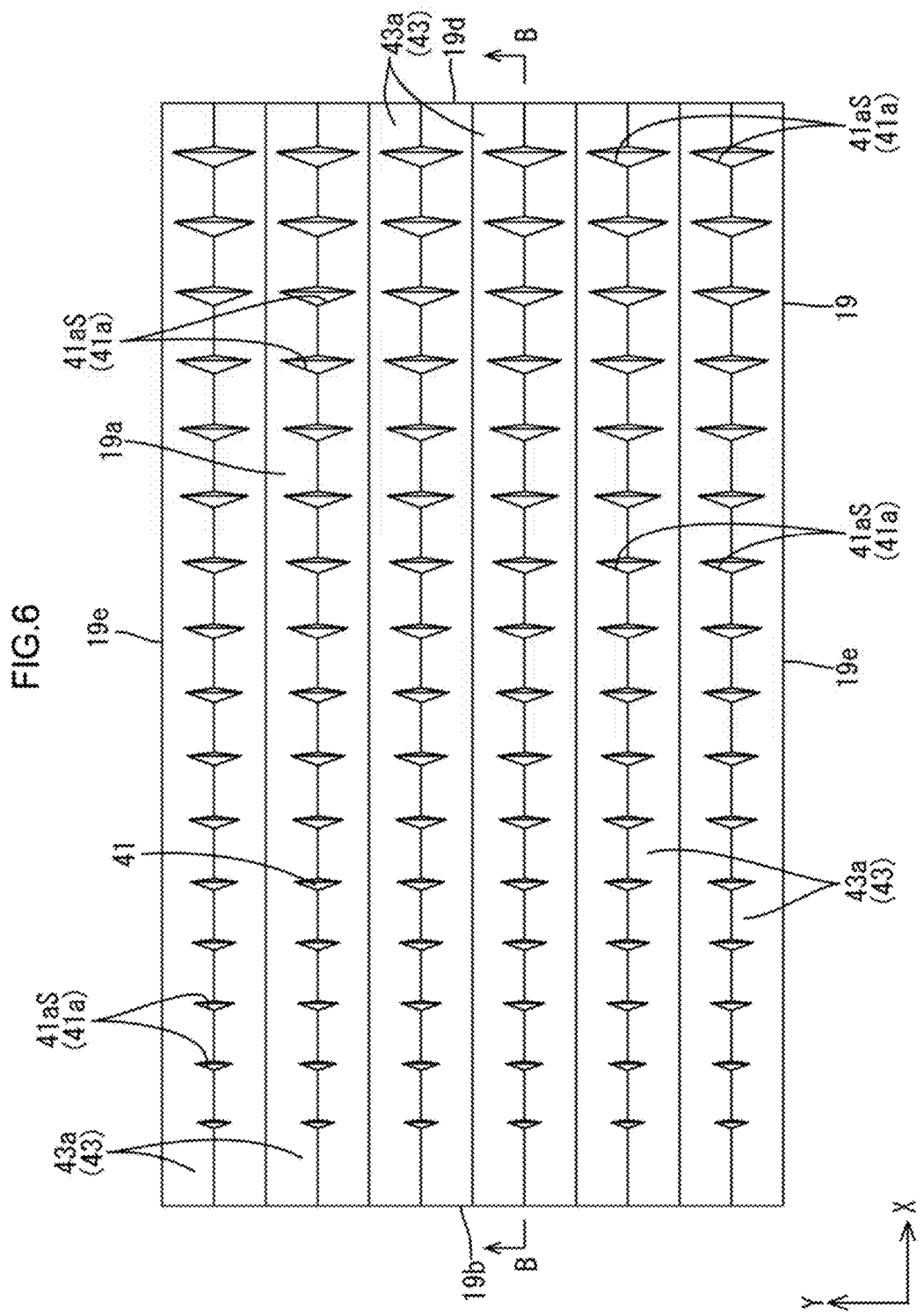
FIG. 6 is a plan view of the light guide plate.

The light guide plate 19 is made of synthetic resin that has refractive index greater than air and high transmissivity and is substantially transparent (acrylic resin such as PMMA). As illustrated in FIGS. 2 and 6, the light guide plate 19 has a substantially rectangular plan-view plate shape similar to that of the liquid crystal panel 11. The light guide plate 19 has a plate surface that is parallel to the plate surface of the liquid crystal panel 11 (the display surface DS). On the plate surface of the light guide plate 19, a long-side direction matches the X-axis direction, a short-side direction matches the Y-axis direction, and a plate thickness direction that is perpendicular to the plate surface matches the Z-axis direction. As illustrated in FIGS. 3 and 4, the light guide plate 19 is arranged directly below the liquid crystal panel 11 and the optical sheet 20 within the chassis 22. Among outer peripheral edge surfaces of the light guide plate 19, one short-side edge surface (the light entrance surface 19B) is opposite the LEDs 17 on the LED board 18 that is arranged in the short-side edge portion of the chassis 22. According to such a configuration, an arrangement direction in which the LEDs 17 (the LED board 18) and the light guide plate 19 are arranged matches the X-axis direction and an arrangement direction in which the optical sheet 20 (the liquid crystal panel 11) and the light guide plate 19 are arranged (overlapped) matches the Z-axis direction, and the arrangement directions are perpendicular to each other. Light emitted by the LEDs 17 in the X-axis direction (an arrangement direction in which the LEDs 17 and the light guide plate 19 are arranged) enters the light guide plate 19 through the short-side edge surface and travels within the light guide plate 19 toward the optical sheet 20 (the front side, the light exit side) and exit the light guide plate through the plate surface.

The light guide plate 19 that has a flat plate shape has plate surfaces and one of the plate surfaced faces the front side (the light exit side). As illustrated in FIGS. 3 and 4, the plate surface facing the front side (an opposing surface opposite the liquid crystal panel 11 and the optical sheet 20) is the light exit surface 19a through which light within the light guide plate 19 exits toward the optical sheet 20 and the liquid crystal panel 11. The light guide plate 19 has the outer peripheral edge surfaces that are adjacent to the plate surface thereof. The outer peripheral edge surfaces include short-side edge surfaces extending in the Y-axis direction (in the arrangement direction of the LEDs 17, the long-side direction of the LED board 18). One of the short-side edge surfaces (on the left side in FIG. 3) is opposite the LEDs 17 (the LED board 18) with a certain clearance, as illustrated in FIG. 5, and is a light entrance surface 19b through which the light from the LEDs 17 enters the light guide plate 19. Namely, the light entrance surface 19b is a LED opposing edge surface (a light source opposing edge surface) opposite the LEDs 17. The light entrance surface 19b is a Y-Z axis plane and is substantially perpendicular to the light exit surface 19a. The arrangement direction in which the LEDs 17 and the light entrance surface 19b (the light guide plate 19) are arranged matches the X-axis direction and parallel to the light exit surface 19a. The other one of the short-side edge surfaces of the outer peripheral edge surfaces of the light guide plate 19 (forms a pair with the light entrance surface 19b) is opposite from the light entrance surface 19b and is an opposite edge surface 19d (non-light entrance opposite surface). A pair of long-side edge surfaces (a pair of edge surfaces not including the light entrance surface 19b) that are adjacent to the light entrance surface 19b and the opposite edge surface 19d are side edge surfaces 19e. The outer peripheral edge surfaces of the light guide plate 19 include three edge surfaces except for the light entrance surface 19b and, as illustrated in FIGS. 3 and 4, the three edge surfaces that are opposite edge surface 19d and the pair of side edge surfaces 19e are LED non-opposing edge surfaces (light source non-opposing edge surfaces) that are not opposite the LEDs 17. The light enters the light guide plate 19 from the LEDs 17 through the light entrance surface 19b that is the outer peripheral edge surface of the light guide plate 19. The light is reflected by a reflection sheet 40, which will be described later, or totally reflected by the light exit surface 19a, the opposite plate surface 19c, and other outer peripheral edge surfaces (the opposite edge surface 19d and the side edge surfaces 19e) and travels within the light guide plate 19 effectively. The light guide plate 19 that is made of acrylic resin such as PMMA has refractive index of approximately 1.49 and has a critical angle of approximately 42°. Hereinafter, among the outer peripheral edge surfaces of the light guide plate 19, a pair of edge surfaces that include opposite sides except for the light entrance surface 19b (long-side edge surfaces, the side edge surfaces 19) are along a direction of a first direction (the X-axis direction). A pair of edge surfaces that include opposite sides and the light entrance surface 19b (short-side edge surfaces, the light entrance surface 19b, and the opposite edge surface 19d) are along a direction of a second direction (the Y-axis direction). A normal direction of the plate surface of the light guide plate 19 is a third direction (a direction perpendicular to the first direction and the second direction).

One of the plate surfaces of the light guide plate 19 facing the back side (an opposite side from the light exit side) (an opposing surface opposite the reflection sheet 40 and the bottom plate 22a of the chassis 22), that is an opposite plate surface from the light exit surface 19a, is an opposite plate surface 19c, as illustrated in FIGS. 3 and 4. The opposite plate surface 19c is covered with the reflection sheet 40 over substantially an entire area thereof. The light from the light guide plate 19 is reflected by the reflection sheet 40 toward the front side or the light exit surface 19a. Namely, the reflection sheet 40 is between the bottom plate 22a of the chassis 22 and the light guide plate 19. The reflection sheet 40 has a reflection surface (a reflection mirror surface) 40a that is opposite the opposite plate surface 19c of the light guide plate 19 and reflects the light. The reflection sheet 40 has the reflection surface that is silver and configured to mirror reflect the light. For example, the reflection sheet 40 is obtained by evaporating a metal thin film (such as a silver thin film) on a surface of a film substrate made of synthetic resin. As illustrated in FIG. 5, an edge portion of the reflection sheet 40 near the light entrance surface 19b of the light guide plate 19 extends outward or toward the LEDs 17 from the light entrance surface 19b. The extended portion reflects the light from the LEDs 17 to improve light entrance efficiency of light entering through the light entrance surface 19b.

As illustrated in FIGS. 2 to 4, the optical sheet 20 has a rectangular plan-view shape similar to the liquid crystal panel 11 and the chassis 22. The optical sheet 20 is on the light exit surface 19a of the light guide plate 19 with respect to the front side (the light exit side). Namely, the optical sheet 20 is between the liquid crystal panel 11 and the light guide plate 19. Accordingly, the optical sheet 20 changes optical properties of light that passes the optical sheet 20 from the light guide plate 19 and exits the light toward the liquid crystal panel 11. The optical sheet 20 will be described in detail later.

As illustrated in FIGS. 3 and 4, the light blocking frame 21 is formed in substantially a frame shape that extends along the outer peripheral portion (an outer peripheral edge portion) of the light guide plate 19. The light blocking frame 21 is configured to press substantially an entire outer peripheral portion of the light guide plate 19 from the front side. The light blocking frame 21 is made of synthetic resin and has a black surface to have a light blocking property. The light blocking frame 21 has an inner edge portion 21a that is disposed between the outer peripheral portion of the light guide plate 19 and the outer peripheral portion (outer peripheral edge portion) of the liquid crystal panel 11 and between the LEDs 17 and the outer peripheral portion (outer peripheral edge portion) of the optical sheet 20 over an entire periphery. Thus, the portions are optically blocked from each other. According to such a configuration, a part of the rays of light emitted by the LEDs 17 and may not enter the light guide plate 19 through the light entrance surface 19b or leak from the light guide plate 19 through the opposite edge surface 19d and the side edge surfaces 19e, and such light is less likely to directly enter the liquid crystal panel 11 and the optical sheet 20 through the outer peripheral portions thereof (especially edge surfaces). The blocking frame 21 has three side portions that do not overlap the LEDs 17 and the LED board 18 in a plan view (a pair of long-side portions and a short-side portion opposite from the LED board 18), and the three side portions include portions extending from the bottom plate 22a of the chassis 22 and a portion supporting the frame 13 from the back side. The blocking frame 21 has short-side portions overlapping the LEDs 17 and the LED board 18. The short-side portions cover the edge portions of the light guide plate 19 and the LED board 18 (the LEDs 17) from the front side and extend over the pair of long-side portions. The blocking frame 21 is fixed to the chassis 22, which will be described below, with fixing means such as screw members.

The chassis 22 is made of a metal plate having good thermal conductivity such as aluminum plate or electro-galvanized steel plate (SECC). As illustrated in FIGS. 3 and 4, the chassis 22 includes a bottom plate 22a that has a rectangular plan view shape similar to the liquid crystal panel 11, and side plates 22b each of which extends from an outer edge of each side (each of the long sides and each of the short sides) of the bottom plate 22a toward the front side. In the chassis 22 (or the bottom plate 22a), a long-side direction matches the X-axis direction and a short-side direction matches the Y-axis direction. Most part of the bottom plate 22a is a light guide plate support portion 22a1 that supports the light guide plate 19 from the back side and the bottom plate 22a has a base board arrangement portion 22a2 on the edge portion thereof near the LED board 18. The LED board 18 is mounted on a short-side side plate 22b that is continuous from the base board arrangement portion 22a2 and the side plate 22b forms a base board mount portion 37. The base board mount portion 37 has an opposite surface that is opposite the light entrance surface of the light guide plate 19, and the LED board 18 is mounted on the opposite surface. The LED board 18 has an opposite plate surface that is opposite from the mount surface 18a where the LEDs 17 are mounted. The LED board 18 is fixed to an inner plate surface of the base board mount portion 37 with the opposite plate surface thereof via a base board fixing member 25 such as a double-sided adhesive tape. A small clearance is provided between the LED board 18 and an inner plate surface of a bottom portion 39 of the base board arrangement portion 22a2. A liquid crystal panel drive circuit board (not illustrated) that controls driving of the liquid crystal panel 11, an LED drive circuit board (not illustrated) that supplies driving power to the LEDs 17, and a touch panel drive circuit board (not illustrated) that controls driving of the touch panel 14 are mounted on the back-side plate surface of the bottom plate 22a of the chassis 22.

The heat dissipation member 23 is made of a metal plate having good thermal conductivity such as an aluminum plate. As illustrated in FIG. 3, the heat dissipation member 23 extends along a short-side edge portion of the chassis 22 or the base board arrangement portion 22a2 where the LED board 18 is arranged. As illustrated in FIG. 5, the heat dissipation member 23 has a substantially L-shaped cross section and includes a first heat dissipation portion 23a that is parallel to and in contact with an outer surface of the base board arrangement portion 22a2 and a second heat dissipation portion 23b that is parallel to an outer surface of the side plate 22b (the base board mount portion 37) that is continuous from the base board arrangement portion 22a2. The first heat dissipation portion 23a has a thin elongated flat plate shape extending in the Y-axis direction. The first heat dissipation portion 23a has a plate surface parallel to a X-Y plane and facing the front side and the plate surface is in contact with an outer surface of the bottom portion 39 of the base board arrangement portion 22a2 over a substantially entire area. The first heat dissipation portion 23a is fixed to the bottom portion 39 with screws SM and has screw insertion holes 23a1 where the screws SM are inserted. The bottom portion 39 has screw holes 28 where the screws SM are screwed. Accordingly, heat generated by the LEDs 17 is transferred to the first heat dissipation portion 23a via the LED board 18, the base board mount portion 37, and the base board arrangement portion 22a2. The screws SM are arranged at intervals in a direction where the first heat dissipation member 23a extends. The second heat dissipation member 23b has an elongated flat plate shape extending in the Y-axis direction and has a plate surface parallel to a Y-Z plane and facing the inner side. The second heat dissipation member 23b is arranged such that the plate surface is opposite the outer plate surface of the base board mount portion 37 with a certain clearance therebetween.

Next, the frame 13 included in the liquid crystal display unit LDU will be described. The frame 13 is made of metal material having good thermal conductivity such as aluminum. As illustrated in FIG. 1, the frame 13 is formed in a rectangular frame plan view shape as a whole and the frame 13 extends along each of the outer peripheral portions (the outer peripheral edge portions) of the liquid crystal panel 11, the touch panel 14, and the cover panel 15. The frame 13 may be manufactured with pressing. As illustrated in FIGS. 3 and 4, the frame 13 presses the outer peripheral portion of the liquid crystal panel 11 from the front side and the frame 13 and the chassis 22 of the backlight device 12 hold the liquid crystal panel 11, the optical sheet 20, and the light guide plate 19 that are layered on each other. The frame 13 receives each of the outer peripheral portions of the touch panel 14 and the cover panel 15 from the rear side thereof and is disposed between the outer peripheral portions of the liquid crystal panel 11 and the touch panel 14. According to such a configuration, a certain clearance is provided between the liquid crystal panel 11 and the touch panel 14. Therefore, if an external force acts on the cover panel 15 and the touch panel 14 is deformed toward the liquid crystal panel 11 according to deformation of the cover panel 15, the deformed touch panel 14 is less likely to be in contact with the liquid crystal panel 11.

As illustrated in FIGS. 3 and 4, the frame 13 includes a frame portion (a frame base portion, frame portion) 13a, a loop portion (a cylindrical portion) 13b, and mount plate portion 13c. The frame portion 13a extends along each of the outer peripheral portions of the liquid crystal panel 11, the touch panel 14, and the cover panel 15. The loop portion 13b extends from the outer peripheral edge portion of the frame portion 13a and surrounds the touch panel 14, the cover panel 15, and the casing 16 from the outer peripheral side. The mount plate portion 13c projects from the frame portion 13a toward the back side and is mounted on the chassis 22 and the heat dissipation member 23. The frame portion 13a is formed in substantially a plate having a plate surface parallel to each of the plate surfaces of the liquid crystal panel 11, the touch panel 14, and the cover panel 15 and has a rectangular frame plan view shape. The frame portion 13a includes an inner peripheral portion 13a1 and an outer peripheral portion 13a2 that is relatively thicker than the inner peripheral portion 13a1. A level gap GP is provided at a border of the inner peripheral portion 13a1 and the outer peripheral portion 13a2. The inner peripheral portion 13a1 of the frame portion 13a is between the outer peripheral portion of the liquid crystal panel 11 and the outer peripheral portion of the touch panel 14 and the outer peripheral portion 13a2 receives the outer peripheral portion of the cover panel 15 from the back side thereof. A substantially entire area of the front side plate surface of the frame portion 13a is covered with the cover panel 15, and the front side plate surface is less likely to be exposed to the outside. Therefore, even if a temperature of the frame 13 is increased due to heat from the LEDs 17, a user of the liquid crystal display device 10 is less likely to touch an exposed portion of the frame 13 and the device is good in safety. As illustrated in FIG. 5, a buffer member 29 is fixed on the back side plate surface of the inner peripheral portion 13a1 of the frame portion 13a to buffer the outer peripheral portion of the liquid crystal panel 11 and press the outer peripheral portion of the liquid crystal panel 11 from the front side. A first fixing member 30 is fixed on the front side plate surface of the inner peripheral portion 13a1 to buffer the outer peripheral portion of the touch panel 14 and fix it. The buffer member 29 and the first fixing member 30 are arranged to overlap each other with a plan view at the inner peripheral portion 13a1. A second fixing member 31 is fixed on the front side plate surface of the outer peripheral portion 13a2 of the frame portion 13a to buffer the outer peripheral portion of the cover panel 15 and fix it. Each of the buffer member 29 and the fixing members 30, 31 extends along each side portion of the frame portion 13a except for four corner portions. The fixing members 30, 31 may be a double-sided adhesive tape including a base member having a cushioning property.

As illustrated in FIGS. 3 and 4, the loop portion 13b has a rectangular short squarely cylindrical plan view shape as a whole, and includes a first loop portion 34 that extends from the outer peripheral edge of the outer peripheral portion 13a2 of the frame portion 13a toward the front side and a second loop portion 35 that extends from the outer peripheral edge of the outer peripheral portion 13a2 of the frame portion 13a toward the back side. Namely, the loop portion 13b having the rectangular short squarely cylindrical shape has a middle portion of the loop portion 13b with respect to the axial direction (z-axis direction) and an inner peripheral surface of the middle portion is continuous from an outer peripheral edge of the frame portion 13a substantially over an entire area. The first loop portion 34 is arranged to surround entirely each of peripheral edge surfaces of the touch panel 14 and the cover panel 15 that are arranged on the front side with respect to the frame portion 13a. The first loop portion 34 has an inner peripheral surface that is opposite each of the outer peripheral edge surfaces of the touch panel 14 and the cover panel 15 and has an outer peripheral surface that is exposed to the outside of the liquid crystal display device 10 and provides an outer appearance of the side surface of the liquid crystal display device 10. The second loop portion 35 surrounds the front side edge portion (a mount portion 16c) of the casing 16, which is arranged on the back side with respect to the frame portion 13a, from the outer peripheral side. The second loop portion 35 has an inner peripheral surface that is opposite the mount portion 16c of the casing 16 (described later) and has an outer peripheral surface that is exposed to the outside of the liquid crystal display device 10 and provides the outer appearance of the side surface of the liquid crystal display device 10. The second loop portion 35 has frame-side stopper projection 35a at a projected distal end portion thereof. The frame-side stopper projection 35a has a hooked cross-sectional shape. The casing 16 is stopped by the frame-side stopper projection 35a and the casing 16 is maintained to be a mounted state.

As illustrated in FIGS. 3 and 4, the mount plate portion 13c projects from the outer peripheral portion 13a2 of the frame portion 13a toward the back side and is a plate extending along each of the sides of the frame portion 13a. The plate surface of the mount plate portion 13c is substantially perpendicular to the plate surface of the frame portion 13a. The mount plate portion 13c projects from each of the side portions of the frame portion 13a. The mount plate portion 13c projecting from the short-side portion of the frame portion 13a near the LED board 18 has an inner plate surface that is in contact with an outer plate surface of the second heat dissipation portion 23b of the heat dissipation member 23. The mount plate portion 13c is fixed on the second heat dissipation portion 23b with screws SM and has the screw insertion holes 13c1 where the screws SM are inserted. The second heat dissipation portion 23b has the screw holes 36 where the screws SM are screwed. Accordingly, heat from the LEDs 17 is transferred from the first heat dissipation portion 23a to the second heat dissipation portion 23b and then transferred to the mount plate portion 13c and further to the whole frame 13. Thus, the heat dissipates effectively. The mount plate portion 13c is fixed indirectly to the chassis 22 via the heat dissipation member 23. The frame portion 13a includes the mount plate portions 13c in the short-side portion opposite from the LED board 18 and a pair of long-side portions. Each of the mount plate portions 13c is fixed with the screws SM such that an inner plate surface thereof is in contact with an outer plate surface of the side plate 22b of the chassis 22. The mount plate portion 13c has the screw insertion holes 13c1 where the screws SM are inserted and the side plates 22b has the screw holes 26 where the screws SM are screwed. The screws SM are mounted in each of the mount plate portions 13c to be arranged in an extending direction of each mount plate portion 13c at an interval.

Next, the touch panel 14 that is to be mounted in the frame 13 will be described. As illustrated in FIGS. 1, 3 and 4, the touch panel 14 is a position input device with which position information within a surface area of the display surface DS of the liquid crystal panel 11 is input by a user. The touch panel 14 includes a rectangular glass substrate that is substantially transparent and has good light transmissivity and a predetermined touch panel pattern (not illustrated) is formed on the glass substrate. Specifically, the touch panel 14 includes a glass substrate having a plan view rectangular shape similar to the liquid crystal panel 11 and a touch panel transparent electrode portion (not illustrated) on the front side plate surface thereof. The touch panel transparent electrode portion forms a projection-capacitive touch panel pattern and the touch panel transparent electrode portions are arranged in rows and columns within the plane surface of the substrate. The short side edge portion of the touch panel 14 includes a terminal portion (not illustrated) that is connected to an end portion of a trace extending from the touch panel transparent electrode portion of the touch panel pattern. A flexible board (not illustrated) is connected to the terminal portion so that a potential is supplied from the touch panel drive circuit board to the touch panel transparent electrode portion that forms the touch panel pattern. As illustrated in FIG. 5, the inner plate surface of the outer peripheral portion of the touch panel 14 is fixed to the inner peripheral portion 13a1 of the frame portion 13a of the frame 13 via the first fixing member 30.

Next, the cover panel 15 that is to be mounted in the frame 13 will be described. As illustrated in FIGS. 1, 3 and 4, the cover panel 15 is arranged to cover an entire area of the touch panel 14 from the front side and protect the touch panel 14 and the liquid crystal panel 11. The cover panel 15 covers an entire area of the frame portion 13A of the frame 13 from the front side and provides a front side outer appearance of the liquid crystal display device 10. The cover panel 15 has a rectangular plan view shape and is made of glass plate substrate that is substantially transparent and has good light transmissivity. The cover panel 15 is preferably made of toughened glass. Chemically toughened glass including a chemically toughened layer on a surface thereof is preferably used as the toughened glass of the cover panel 15. The chemically toughened layer is provided by performing chemically toughening treatment on the surface of a glass plate substrate. The chemically toughening treatment is performed such that alkali metal ion contained in glass material is replaced with alkali metal ion having a greater ion radius with ion exchange treatment to strengthen the glass plate substrate. The obtained chemically toughened layer is a compressive stress layer (an ion exchange layer) where compressive stress remains. Therefore, the cover panel 15 has great mechanical strength and good shock resistance property, and the touch panel 14 and the liquid crystal panel 11 arranged on the back side of the cover panel 15 are not broken or damaged.

As illustrated in FIGS. 3 and 4, the cover panel 15 has a rectangular plan-view shape similar to the liquid crystal panel 11 and the touch panel 14 and has a plan view size greater than that of the liquid crystal panel 11 and the touch panel 14. Therefore, the cover panel 15 has an extended portion 15EP extending outward further from each of the outer peripheral edges of the liquid crystal panel 11 and the touch panel 14 over an entire periphery. The extended portion 15EP has a rectangular frame shape surrounding the liquid crystal panel 11 and the touch panel 14. As illustrated in FIG. 5, the extended portion 15EP has an inner plate surface that is fixed to and opposite the outer peripheral portion 13a2 of the frame portion 13a of the frame 13 via the second fixing member 31. A middle portion of the cover panel 15 is opposite the touch panel 14 and is layered on the front side of the touch panel 14 via the antireflection film AR1.

As illustrated in FIGS. 3 and 4, the plate surface light blocking layer 32 (a light blocking layer, a plate surface light blocking portion) is formed on the outer peripheral portion of the cover panel 15 including the extended portion 15EP on an inner side (the back side) plate surface thereof (a plate surface facing the touch panel 14). The plate surface light blocking layer 32 is made of light blocking material such as black coating material and such light blocking material is printed on the inner plate surface of the cover panel 15. Thus, the plate surface light blocking layer 32 is integrally formed on the plate surface of the cover panel 15. The plate surface light blocking layer 32 may be printed with printing methods such as screen printing or ink jet printing. The plate surface light blocking layer 32 is formed on an entire area of the extended portion 15EP of the cover panel 15 and a portion of the cover panel 15 that is inside the extended portion 15EP and overlaps each of the outer peripheral portions of the touch panel 14 and the liquid crystal panel 11 in a plan view. Accordingly, the plate surface light blocking layer 32 is arranged to surround the display area of the liquid crystal panel 11 and blocks light outside the display area. Therefore, display quality of images displayed in the display area is improved.

Next, the casing 16 that is to be mounted in the frame 13 will be described. The casing 16 is made of synthetic resin or metal material, and as illustrated in FIGS. 1, 3 and 4, the casing 16 has substantially a bowl shape that is open toward the front side. The casing 16 covers the frame portion 13a and the mount plate portion 13c of the frame 13, the chassis 22, and the heat dissipation member 23 from the back side and provides the back side outer appearance of the liquid crystal display device 10. As illustrated in FIG. 3, the casing 16 includes substantially a flat bottom portion 16a, curved portions 16b, and mount portions 16c. The curved portions 16b extend from the respective outer peripheral edges of the bottom portion 16a toward the front side and have a curved cross sectional shape. The mount portions 16c extend substantially vertically from the respective outer peripheral edges of the curved portions 16b toward the front side. Each of the mount portions 16c has a casing side stopper portion 16d having a hooked cross sectional shape. The casing side stopper portion 16d is stopped by a frame side stopper portion 35a of the frame 13 such that the casing 16 is mounted in the frame 13.

As illustrated in FIG. 3, an exit light reflection portion 41 is disposed on the light guide plate 19 included in the backlight device 12 having the above structure. The exit light reflection portion 41 reflects light travelling within the light guide plate 19 such that the light exits the light guide plate 19 through the light exit surface 19a. The exit light reflection portion 41 selectively changes optical properties of light with respect to only a first direction and the light is likely to be incident on the light exit surface 19a at an angle of incident not greater than the critical angle. Thus, the light is likely to exit through the light exit surface 19a. The exit light reflection portion 41 will be described in detail later.

The backlight device 12 according to the present embodiment includes a configuration of collecting exit light with respect to the second direction (the Y-axis direction) and effects and configurations thereof will be described below. As illustrated in FIGS. 3 and 5, the light travelling within the light guide plate 19 is reflected by unit reflecting portions 41a included in the exit light reflection portion 41 such that the light exits through the light exit surface 19a at an incident angle of not greater than the critical angle. The light travelling within the light guide plate 19 is reflected by the unit reflection portions 41a to collect in the front direction or toward the front side along a normal line of the light exit surface 19a with respect to the first direction (the X-axis direction). The exit light reflection portion 41 applies a light collecting action to the reflection light with respect to the first direction and is less likely to apply a light collecting action to the reflection light with respect to the second direction. Therefore, luminance of the exit light through the light exit surface 19a may have anisotropic properties. According to the configuration of the present embodiment, light is likely to be collected with respect to the second direction. As illustrated in FIG. 2, the optical sheet 20 includes a prism sheet 42 (light exit side anisotropic light collecting portion) having anisotropic light collecting properties that selectively apply the light collecting action to the light transmitting therethrough with respect to the second direction. The light guide plate 19 includes a light exit surface side prism portions 43 (light exit surface side anisotropic light collecting portion) on the light exit surface 19a. The light exit surface side prism portions 43 has anisotropic light collecting properties that selectively apply the light collecting action to the light reflected by the exit light reflection portion 41 with respect to the second direction. Next, the prism sheet 42 and the light exit surface-side prism portions 43 will be described in detail.

Figure 9:
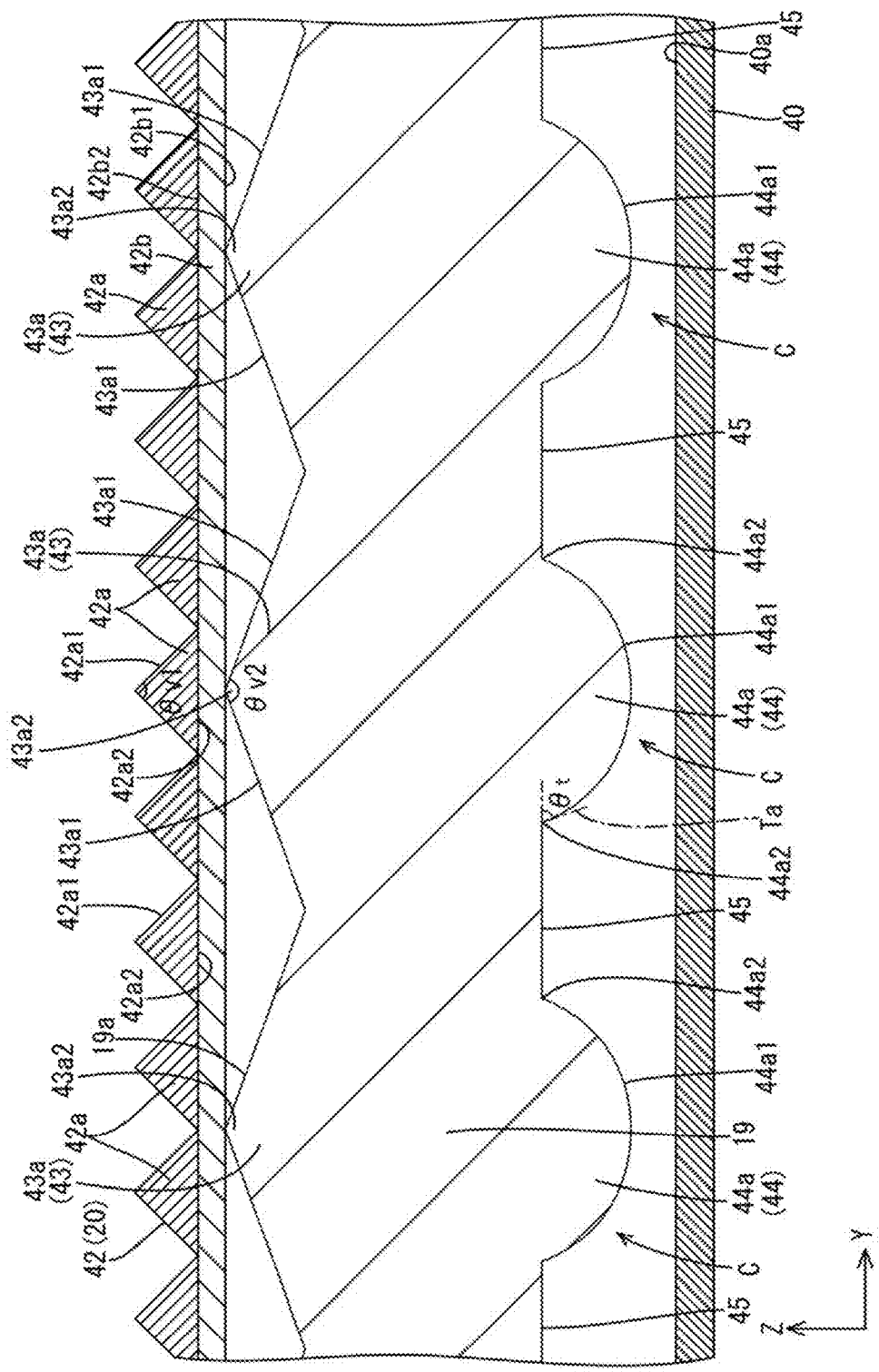
FIG. 9 is a cross-sectional view taken along line A-A in FIG. 8.

As illustrated in FIGS. 2 and 9, the prism sheet 42 includes a base sheet 42b and light exit-side unit prisms 42a (light exit-side unit light collecting portions). The light exit-side unit prisms 42a are formed on the light exit-side plate surface 42b2 that is a surface opposite from a light entrance-side plate surface 42b1 of the base sheet 42b (that is on a light exit side) and the light exiting the light guide plate 19 enters the prism sheet 42 through the light entrance-side plate surface 42b1. The light exit-side unit prisms 42a have the anisotropic light collecting properties. The base sheet 42b is made of substantially transparent synthetic resin and specifically made of thermoplastic resin material such as PET and refractive index of the material is approximately 1.667. The light exit-side unit prisms 42a are integrally formed with the light exit-side plate surface 42b2 of the base sheet 42b that is a front-side (light exit side) plate surface. The light exit-side unit prisms 42a are made of substantially transparent ultraviolet-curing resin material that is a kind of photo-curable resin. In manufacturing the prism sheet 42, a molding die is filled with uncured ultraviolet-curing resin material and the base sheet 42b is put on an opening edge of the molding die such that the uncured ultraviolet-curing resin material is in contact with the light exit-side plate surface 42b2. Then, the ultraviolet-curing resin material is irradiated with ultraviolet rays via the base sheet 42b so as to be cured and the light exit-side unit prisms 42a are integrally formed with the base sheet 42b. The ultraviolet-curing resin material of the light exit-side unit prisms 42a is acrylic resin such as PMMA, for example, and refractive index thereof is approximately 1.59. The light exit-side unit prisms 42a project from the light exit-side plate surface 42b2 of the base sheet 42b toward the front side (the light exit side) and project in a third direction (the Z-axis direction). Each of the light exit-side unit prisms 42a has substantially a triangular cross-sectional shape (a mountain shape) taken in the second direction (the Y-axis direction) and extends linearly in the first direction (the X-axis direction). The light exit-side unit prisms 42a are arranged in the second direction. Each of the light exit-side unit prisms 42a has a width dimension (in the second direction) that is constant over an entire length thereof in the first direction. Each of the light exit-side unit prisms 42a has substantially an isosceles triangular cross-sectional shape and includes a pair of inclined surfaces 42a1 and has an apex angle θv1 of substantially 90°. The light exit-side unit prisms 42a that are arranged in the second direction have substantially same apex angles θv1, substantially same width dimensions of a bottom surface 42a2, and substantially same height dimensions. Intervals between adjacent light exit-side unit prisms 42a are substantially same.

Light enters the prism sheet 42 having the above configuration through a surface near the light guide plate 19. The light enters the base sheet 42b through the light entrance-side plate surface 42b1 via an air layer between the light exit surface 19a of the light guide plate 19 and the base sheet 42b of the prism sheet 42. Therefore, the light is refracted at a border surface between the air layer and the light entrance-side plate surface 742b1 according to the angle of incident. When the light passing through the base sheet 42b exits the base sheet 42 through the light exit-side plate surface 42b2 and enters the light exit-side unit prisms 42a, the light is refracted at a border surface according to the angle of incident. The light travelling through the light exit-side unit prisms 42a reaches the sloped surfaces 42a1 of the light exit-side unit prisms 42a. If the angle of incident on the sloped surface 42a1 is greater than the critical angle, the light is totally reflected by the sloped surface 42a1 and returned into the base sheet 42b (retroreflection). If the angle of incident on the sloped surface 42a1 is not greater than the critical angle, the light is refracted by the border surface and exits the light exit-side unit prisms 42a. Among the rays of light exiting the light exit-side unit prisms 42a through the inclined surfaces 42a1, the rays of light travelling toward the adjacent light exit-side unit prisms 42a enter the adjacent light exit-side unit prisms 42a and are returned toward the base sheet 42b. Accordingly, the exit light from the light exit-side unit prisms 42a is guided to travel toward the front side and likely to be selectively collected in the second direction.

Next, the light exit surface-side prism portions 43 included on the light exit surface 19a of the light guide plate 19 will be described. The light exit surface-side prism portions 43 are formed integrally with the light guide plate 19. To form the light exit surface-side prism portions 43 integrally with the light guide plate 19, when manufacturing the light guide 19 with injection molding, a molding die for molding the light guide plate 19 may have a molding surface for molding the light exit surface 19a having a transfer shape for the light exit surface-side prism portions 43. As illustrated in FIGS. 2, 6, and 9, the light exit surface-side prism portions 43 include light exit surface-side unit prisms 43a (light exit surface-side unit light collecting portion) on the light exit surface 19a. The light exit surface-side unit prisms 43a extend in the first direction (the X-axis direction) and are arranged in the second direction (the Y-axis direction). The light exit surface-side unit prisms 43a project in the third direction (the Z-axis direction) from the light exit surface 19a toward the front side (the light exit side). Each of the light exit surface-side unit prisms 43a has substantially a triangular cross-sectional shape (a mountain shape) taken in the second direction and extends linearly in the first direction. Each of the light exit surface-side unit prisms 43a has a width dimension (in the second direction) that is constant over an entire length thereof in the first direction. Each of the light exit surface-side unit prisms 43a has substantially an isosceles triangular cross-sectional shape and includes a pair of inclined surfaces 43a1 and has an apex angle θv2 of an obtuse angle (greater than 90°), preferably ranging from 100° to 150°, and more preferably is approximately 140°. Namely, the apex angle θv2 of the light exit surface-side unit prisms 43a is relatively greater than the apex angle θv1 of the light exit-side unit prisms 42a. The light exit surface-side unit prisms 43a that are arranged in the second direction have substantially same apex angles θv2, substantially same width dimensions of a bottom surface 42a2, and substantially same height dimensions. Intervals between adjacent light exit surface-side unit prisms 43a are substantially same.

As illustrated in FIG. 9, the light exit surface-side prism portions 43 having such a configuration apply an optical action to the light travelling within the light guide plate 19 and reaching the light exit surface. The optical action will be described below. The light travelling through the light exit surface-side prism portions 43 reaches the sloped surfaces 43a1 of the light exit surface-side unit prisms 43a. If the angle of incident on the sloped surface 43a1 is not greater than the critical angle, the light exits the light guide plate with being refracted by the sloped surface 43a1 and thus the light is selectively collected with respect to the second direction. The light that is collected by the light exit surface-side prism portions 43 is likely to be collected by the prism sheet 42 with respect to the second direction. Accordingly, the front luminance of exit light from the prism sheet 42 is further improved. The anisotropic light collecting actions may not be applied to a part of the rays of light that is refracted by the inclined surface 43a1 of the light exit surface-side unit prisms 43a, and such rays of light may be dispersed in the second direction. If the light reaching the light exit surface 19a is incident on the inclined surface 43a1 of the light exit surface-side unit prisms 43a at an angle of incident greater than the critical angle, the light is totally reflected by the sloped surface 43a1 and returned toward the opposite plate surface 19c (retroreflection). The light totally reflected by the sloped surface 43a1 of the light exit surface-side unit prisms 43a travels within the light guide plate 19 to be dispersed in the second direction. Then, the light is reflected by the exit light reflection portion 41 and therefore, the light exiting through the light exit surface 19a is less likely to have luminance unevenness with respect to the second direction.

As illustrated in FIG. 9, the apex angle θv1 of the light exit-side unit prisms 42a is smaller than the apex angle θv2 of the light exit surface-side unit prisms 43a. Therefore, the prism sheet 42 reflects back a greater amount of rays of light and reduces a range of a light outgoing angle compared to the light exit surface-side prism portions 43 and has a most effective light collecting action. The light supplied to the prism sheet 42 is provided with the anisotropic light collecting action by the light exit surface-side prism portions 43 at least on the light exit surface 19a of the light guide plate 19. Therefore, the light is likely to be reflected back by the light exit-side unit prisms 42a of the prism sheet 42 and accordingly, the light effectively exits the light exit-side unit prisms 42a. The light use efficiency is improved and luminance of exit light from the backlight device 12 is effectively improved.

Figure 13:
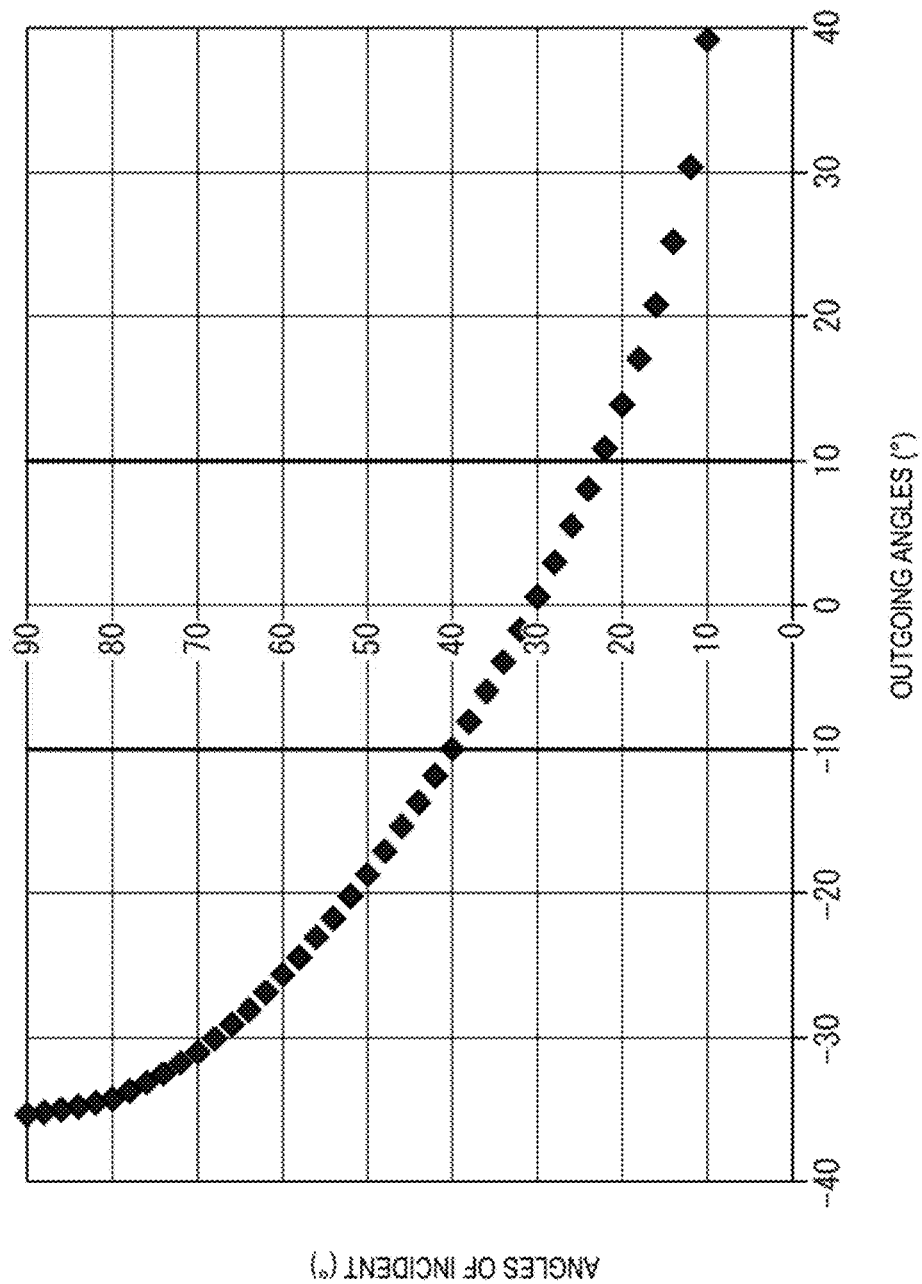
FIG. 13 is a graph representing relation between an angle of incident of light on a prism sheet and an outgoing angle of light from the prism sheet.

Relation between the angle of incident of the light supplied to the prism sheet 42 and the front luminance of the exit light from the prism sheet 42 and how the front luminance is improved was checked as follows. The relation between the angle of incident of the light on the light entrance-side plate surface 42b1 of the base sheet 42b of the prism sheet 42 and the outgoing angle of light exiting the light exit-side unit prisms 42a through the inclined surface 42a1 is calculated based on Snell's law, and the results are illustrated in FIG. 13. Specific calculation method will be described below. First, the outgoing angle of light exiting through the light entrance-side plate surface 42b1 is obtained from the angle of incident of light on the light entrance-side plate surface 42b1. According to the relation that the outgoing angle of light exiting through the light entrance-side plate surface 42b1 is equal to the angle of incident of light on the light exit-side plate surface 42b2 and the bottom surface 42a2 of the exit light-side unit prisms 42a, the outgoing angles of light exiting through the light exit-side plate surface 42b2 and the bottom surface 42a2 of the exit light-side unit prisms 42 are obtained (see FIG. 9). According to the relation that the outgoing angles of light exiting through the light exit-side plate surface 42b2 and through the bottom surface 42a2 of the light exit-side unit prisms 42a are equal to the angle of incident of light on the inclined surface 42a1 of the exit light-side unit prisms 42a, the outgoing angle of light exiting through the inclined surface 42a1 of the light exit-side unit prisms 42a is obtained (see FIG. 9). The refraction index of each of the base sheet 42b and the light exit-side unit prisms 42a and the apex angle θv1 of the light exit-side unit prisms 42a are same as described before. The external air layer has refractive index of 1.0. In FIG. 13, a vertical axis represents angles (°) of incident of light on the light entrance-side plate surface 42b1 of the base sheet 42b and a horizontal axis represents outgoing angles (°) of light exiting the light exit-side unit prisms 42a through the inclined surface 42a1. The light exiting parallel to the front direction has an outgoing angle of 0°. In FIG. 13, the angle of incident of light on the light entrance-side plate surface 42b1 of the base sheet 42b is set within a range from 23° to 40° such that the outgoing angle of light exiting the light exit-side unit prisms 42a through the inclined surface 42a1 is within a range of ±10°. Namely, if the light supplied to the prism sheet 42 or the light exiting the light guide plate 19 through the light exit surface 19a has an outgoing angle ranging from 23° to 40°, the light exiting the light exit-side unit prisms 42a of the prism sheet 42 has an outgoing angle of ±10° with respect to the front direction. This is effective to improve the front luminance of the exit light. In the present embodiment, the light that is affected by the anisotropic light collecting action caused by the light exit surface-side prism portions 43 is likely to include rays of light having an outgoing angle of 23° to 40° in exiting through the light exit surface 19a. However, the light that is affected by the anisotropic light collecting action caused by an opposite plate surface-side convex lenticular lens portion 44 is likely to include rays of light having an outgoing angle other than the range of 23° to 40° in exiting through the light exit surface 19a.

Figure 10:
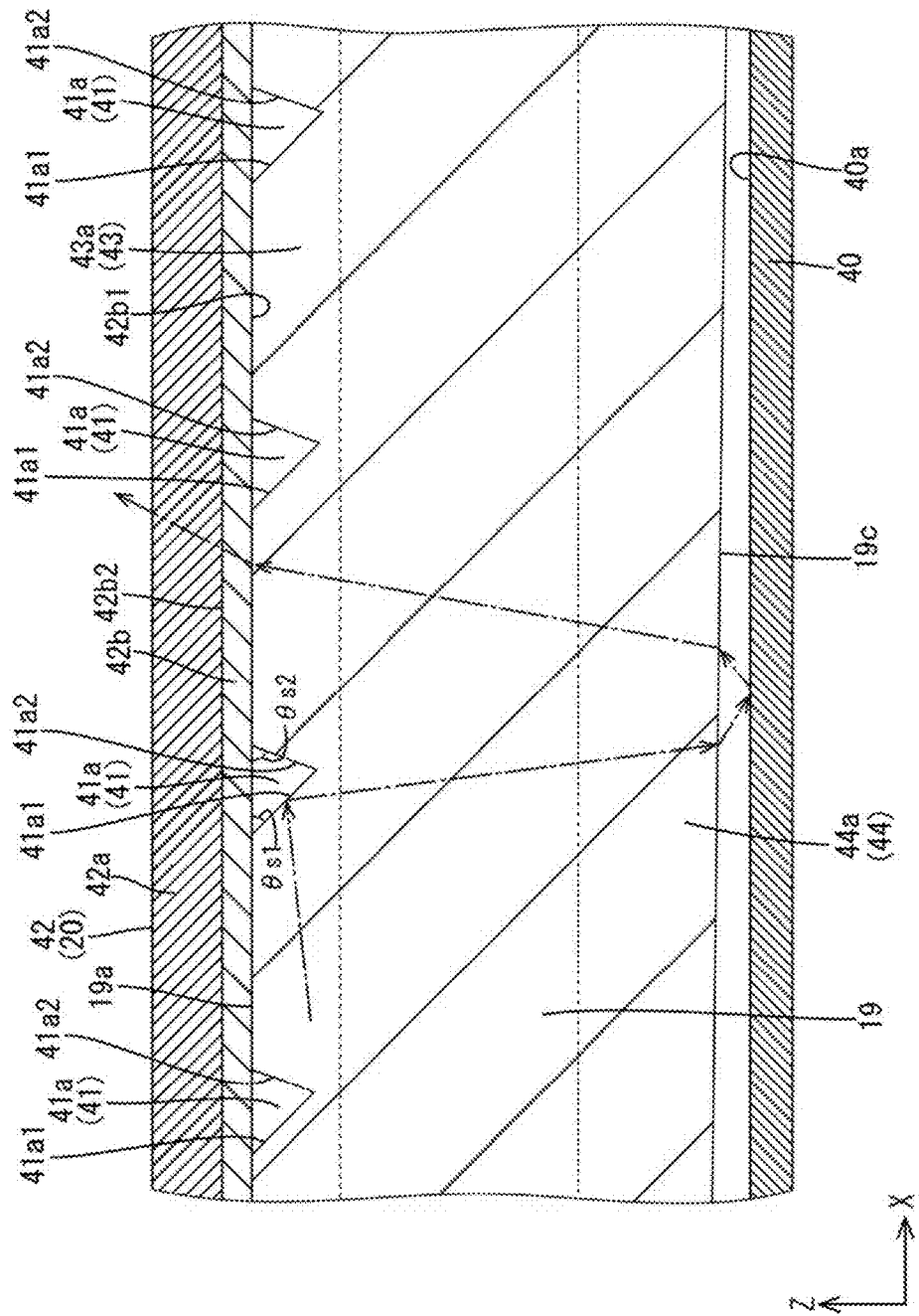
FIG. 10 is a cross-sectional view taken along line B-B in FIG. 6.
Figure 11:
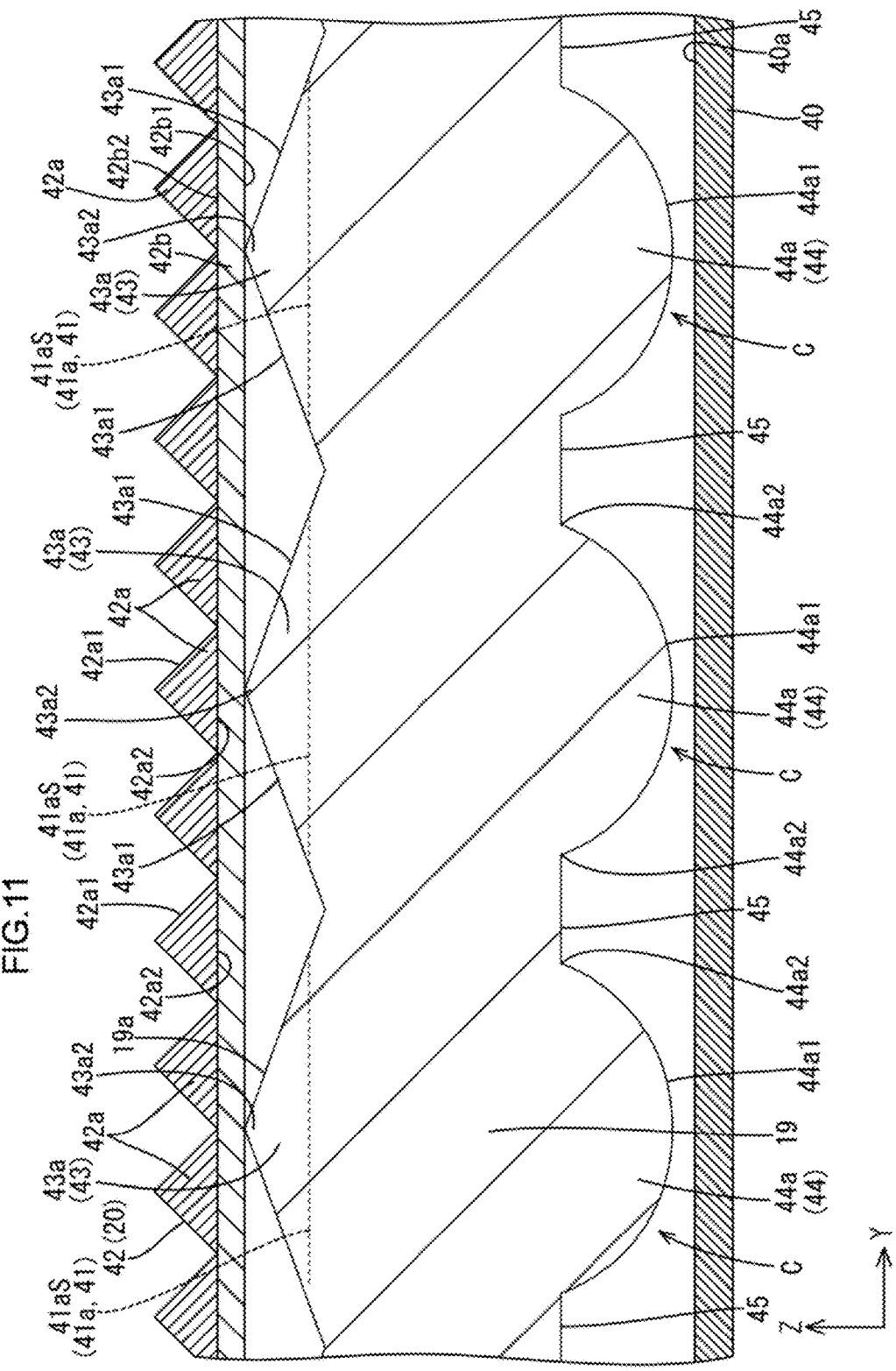
FIG. 11 is a cross-sectional view taken along line C-C in FIG. 8.
Figure 12:
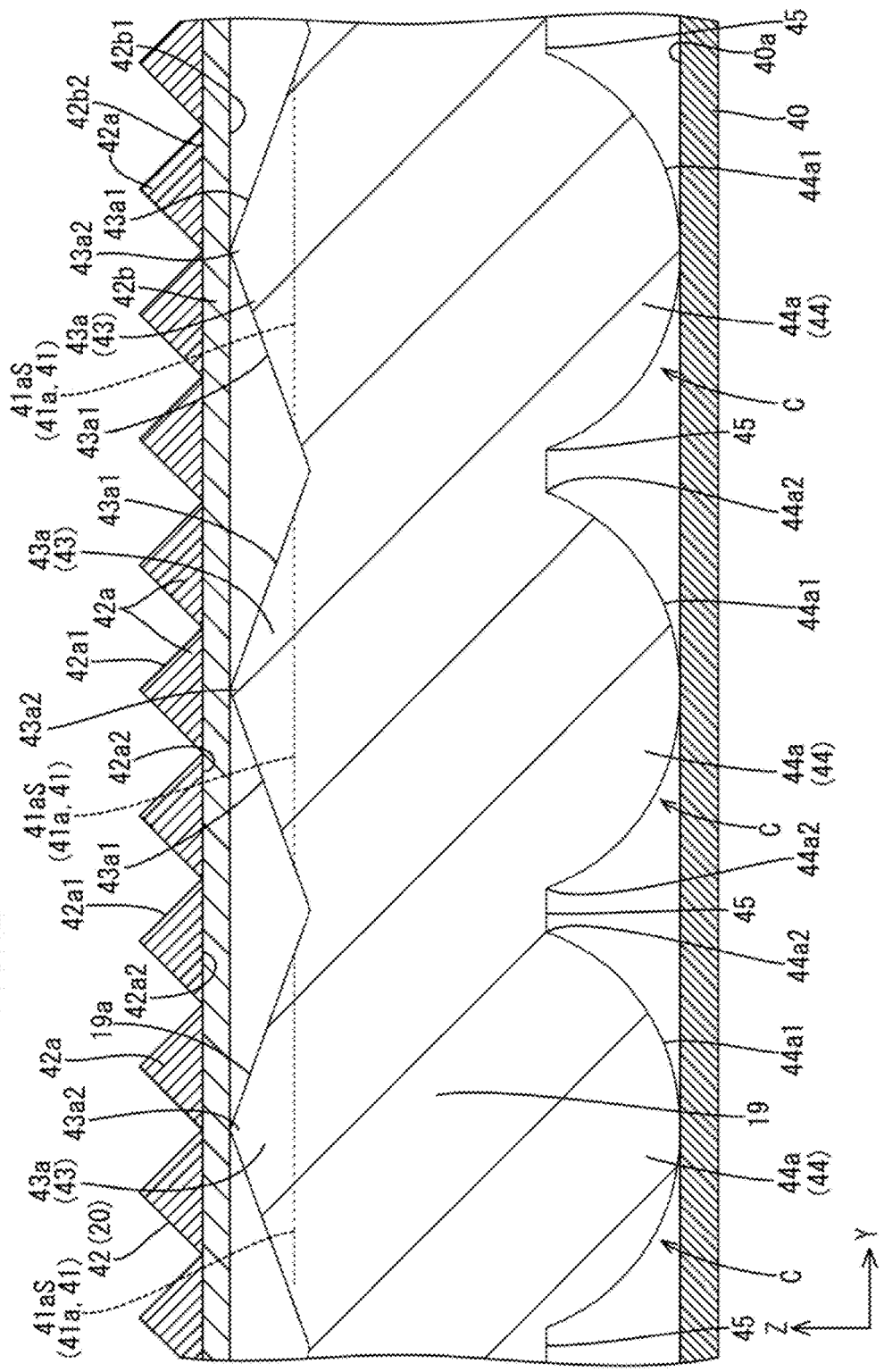
FIG. 12 is a cross-sectional view taken along line D-D in FIG. 8.

As illustrated in FIG. 10, the light guide plate 19 according to the present embodiment includes an exit light reflection portion 41 on the light exit surface 19a to reflect light traveling within the light guide plate 19 and accelerate exiting of light through the light exit surface 19a. Thus, the exit light reflection portion 41 is included on the light exit surface 19a of the light guide plate 19. Therefore, light is reflected by the exit light reflection portion 41 toward the opposite plate surface 19c and the light may be totally reflected by the opposite plate surface 19c of the light guide plate or reflected by the reflection sheet 40 toward the light exit surface 19a. Then, the light exits through the light exit surface 19a. Namely, a path of light reflecting off the exit light reflection portion 41 and exiting through the light exit surface 19a is complicated. Especially, the light reflecting off the reflection sheet 40 is refracted at least twice when exiting through the opposite plate surface 19c toward the reflection sheet 40 and when reflecting off the reflection sheet 40 and entering through the opposite plate surface 19c. The light is likely to be dispersed in the second direction due to such refraction, and the light is effectively mixed with respect to the second direction and luminance unevenness is less likely to occur in the exit light through the light exit surface 19a with respect to the second direction. The light exiting through the opposite plate surface 19c of the light guide plate 19 reflects off the reflection surface 40a of the reflection sheet 40 with the mirror reflection. Therefore, the light is effectively dispersed in the second direction by the refraction action caused when the light travels through the opposite plate surface 19c. The exit light reflection portion 41 may be included integrally with the light guide plate 19 by manufacturing the light guide plate 19 with injection molding. The molding die has a molding surface for molding the light exit surface 19a and the molding surface has a transfer shape for transferring the exit light reflection portion 41.

As illustrated in FIG. 10, the exit light reflection portion 41 includes unit reflection portions 41a (unit exit light reflection portions) each of which extends in the second direction (the Y-axis direction) and is formed in a groove shape having a substantially triangular cross-sectional shape (substantially V-shape). The unit reflection portions 41a are arranged in the first direction (the X-axis direction) at intervals. Each of the unit reflection portions 41a includes a main reflection surface 41a1 that is on the LED 17 side (the light entrance surface 19b side) in the first direction and a re-entrance surface 41a2 that is on an opposite side from the LED 17 side (the opposite edge surface 19d side) in the first direction. The main reflection surface 41a1 is an inclined surface that descends to be farther away from the light exit surface 19a (closer to the opposite plate surface 19c) as is farther away from the LEDs 17 (closer to the opposite edge surface 19c). The re-entrance surface 41a2 is an inclined surface that ascends to be closer to the light exit surface 19a (farther away from the opposite plate surface 19c) as is farther away from the LEDs 17 in the first direction. The main reflection surface 41a1 is preferably inclined at an inclination angle θs1 from 40° to 50° with respect to the light exit surface 19a or the opposite plate surface 19c, and in FIG. 10, the inclined angle is approximately 45°. The re-entrance surface 41a2 is preferably inclined at an inclination angle θs2 from 70° to 85° with respect to the light exit surface 19a or the opposite plate surface 19c, and in FIG. 10, the inclined angle is approximately 80°. Namely, the inclination angle θs1 of the main reflection surface 41a1 is smaller than the inclination angle θs2 of the re-entrance surface 41a2. Light reflects off the main reflection surface 41a1 of the unit reflection portion 41a included on the light entrance surface 19b side with respect to the first direction such that light having an angle of incident on the light exit surface 19a not greater than the critical angle is generated to accelerate exit of light through the light exit surface 19a. If the light having an angle of incident on the main reflection surface 41a1 not greater than the critical angle transmits through the main reflection surface 41a1, the transmitted light enters again the light guide plate 19 through the re-entrance surface 41a2 of the unit reflection portion 41a. A height dimension (a dimension in the third direction) of the unit reflection portions 41a arranged in the first direction gradually increases and areas (surface areas) of the main reflection surface 41a1 and the re-entrance surface 41a2 gradually increases as is farther away from the light entrance surface 19*b* (the LEDs 17) in the first direction. Accordingly, the light exiting through the light exit surface 19*a* has an even distribution within a plane of the light exit surface 19*a*. The unit reflection portions 41*a* are arranged at substantially equal intervals in the first direction (equal arrangement pitch) with no relation to the distance from the LEDs 17.

However, the light reflecting off the exit light reflection portion 41 on the light exit surface 19*a* of the light guide plate 19 and reaching the opposite plate surface 19*c* of the light guide plate 19 may be totally reflected by the opposite plate surface 19*c* toward the light exit surface 19*a* or may pass through the opposite plate surface 19*c* and reflect off the reflection sheet 40 and enter through the opposite plate surface 19*c* and travel toward the light exit surface 19*a*. Therefore, the phases of light travelling in the two paths may be matched, and interference unevenness such as reflective moire may occur in the exit light exiting through the light exit surface 19*a*.

As illustrated in FIG. 9, the light guide plate 19 according to the present embodiment includes the opposite plate surface-side convex lenticular lens portion 44 (the opposite plate surface-side anisotropic light collecting portion) on the opposite plate surface 19*c*. The opposite plate surface-side convex lenticular lens portion 44 includes opposite plate surface-side convex cylindrical lenses 44*a* (an opposite plate surface-side unit light collecting portion, an opposite plate-side cylindrical lens) each of which extends in the first direction and that are arranged in the second direction. Namely, the opposite plate surface 19*c* of the light guide plate 19 is not flat but has a convex-concave shape with respect to the second direction. A distance from each of the opposite plate surface-side convex cylindrical lenses 44*a* and the reflection sheet 40 changes according to a position with respect to the second direction. Therefore, a phase of the light that is totally reflected at a border surface of each opposite plate surface-side convex cylindrical lens 44*a* is less likely to match a phase of the light that passes through each opposite plate surface-side convex cylindrical lens 44*a* and reflects off the reflection sheet 40. Thus, interference unevenness is likely to be reduced.

Figure 8:
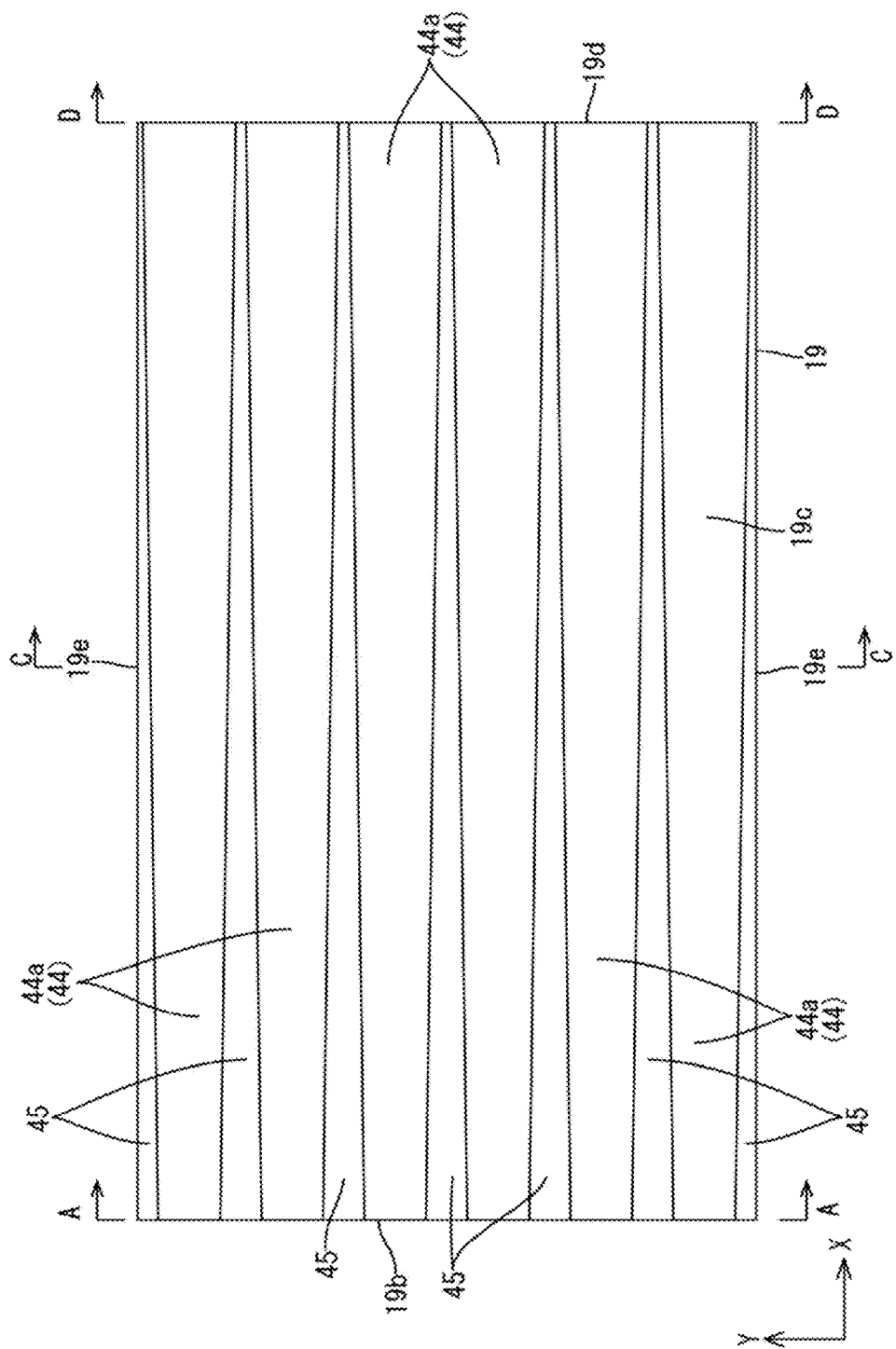
FIG. 8 is a back-side view of the light guide plate.

A configuration of the opposite plate surface-side convex lenticular lens portion 44 will be described in detail. The opposite plate surface-side convex lenticular lens portion 44 is integrally formed with the light guide plate 19. The opposite plate surface-side convex lenticular lens portion 44 may be included integrally with the light guide plate 19 by manufacturing the light guide plate 19 with injection molding. The molding die has a molding surface for molding the opposite plate surface 19*c* and the molding surface has a transfer shape for transferring the opposite plate surface-side convex lenticular lens portion 44. As illustrated in FIGS. 2, 8 and 9, the opposite plate surface-side convex lenticular lens portion 44 includes the opposite plate surface-side convex cylindrical lenses 44*a* each of which extends in the first direction (the X-axis direction) and that are arranged in the second direction (the Y-axis direction). Each of the opposite plate surface-side convex cylindrical lenses 44*a* projects from the opposite plate surface 19*c* in the third direction (the Z-axis direction) toward the back side (opposite side from the light exit side) and is a convex lens. Each of the opposite plate surface-side convex cylindrical lenses 44*a* has a substantially semi-cylindrical shape having an axis extending in the first direction and has a back-side (the reflection sheet 40 side) surface that is formed in an arched shape and is a convex arched surface 44*a*1. Each of the opposite plate surface-side convex cylindrical lenses 44*a* has a substantially semi-circular cross-sectional shape taken along the arrangement direction (the second direction) that is perpendicular to the extending direction (the first direction). Each of the opposite plate surface-side convex cylindrical lenses 44*a* has a tangent Ta to a basal portion 44*a*2 of the arched surface 44*a*1 and a tangent angle θt formed by the tangent Ta and a line in the second direction is approximately 70°. The opposite plate surface-side convex cylindrical lenses 44*a* that are arranged in the second direction have substantially a same tangent angle θt, have a bottom surface having substantially a same width dimension and substantially a same height dimension, and intervals between adjacent opposite plate surface-side convex cylindrical lenses 44*a* are substantially equal.

The light guide plate 19 includes the opposite plate surface-side convex lenticular lens portion 44 on the opposite plate surface 19*c* and the opposite plate surface 19*c* is a convex-concave surface. According to such a configuration, a certain clearance C is provided between the opposite plate surface-side convex cylindrical lenses 44*a* that are arranged in the second direction and the reflection sheet 40. The clearance C is provided between the opposite plate surface 19*c* of the light guide plate 19 and the reflection sheet 40 and is an air layer having refraction index of approximately 1.0. The clearance C changes its height dimension (a dimension in the third direction) according to a position in the second direction (the X-axis direction). Specifically, the height dimension decreases as the position is closer to edge portions from a middle of the opposite plate surface-side convex cylindrical lens 44*a* with respect to the second direction and a rate of the change depends on curvature of a front surface of the opposite plate surface-side convex cylindrical lens 44*a*. According to such a configuration, the light that is reflected by the exit light reflection portion 41 at the light exit surface 19*a* of the light guide plate 19 toward the opposite plate surface 19*c* is returned to the light exit surface 19*a* and exits therethrough. Such light may include rays of light that is totally reflected at a border surface of each opposite plate surface-side convex cylindrical lens 44*a* and rays of light that passes through each opposite plate surface-side convex cylindrical lens 44*a* and is reflected by the reflection sheet 40. Phases of such rays of light are less likely to be matched. Accordingly, the rays of light traveling along two different paths are less likely to be interfered with each other and interference unevenness (reflective moire) is less likely to be recognized.

When the light travelling within the light guide plate 19 may be reflected by a border surface of the opposite plate surface-side convex cylindrical lenses 44*a* of the opposite plate surface-side convex lenticular lens portion 44, the reflected light is less likely to be dispersed over an area greater than an area, with respect to the second direction, where the opposite plate surface-side convex cylindrical lenses 44*a* are formed. Specifically, if the light travelling within the light guide plate 19 and reaching the opposite plate surface 19*c* is incident on the arched surface 44*a*1 of the opposite plate surface-side convex cylindrical lens 44*a* at an angle of incident greater than the critical angle, the light is totally reflected by the arched surface 44*a*1. At this time, even if the light travels to be dispersed in the second direction, the light is likely to be totally reflected by the arched surface 44*a*1 of the opposite plate surface-side convex cylindrical lens 44*a* again. Namely, the light travelling within the light guide plate 19 travels in the first direction from the light entrance surface 19*b* side to the opposite edge surface 19*d* side with repeating total reflection within a width range of each opposite plate surface-side convex cylindrical lens 44a. Therefore, luminance unevenness caused due to the arrangement of the LEDs 17 at intervals in the second direction is less likely to be obviated. The opposite plate surface-side convex cylindrical lenses 44a selectively collect the light reflected by the exit light reflection portion 41 with respect to the second direction. The light affected by the anisotropic light collecting action is less likely to be collected with respect to the second direction via the prism sheet 42 that is an optical member arranged on the front side (the light exit side) with respect to the light guide plate 19 and is likely to be dispersed via the prism sheet 42 with respect to the second direction. Thus, the prism sheet may not be effectively used. Therefore, if the opposite plate surface-side convex lenticular lens portion 44 is arranged over an entire area of the opposite plate surface 19c of the light guide plate 19, luminance unevenness is caused with respect to the second direction in the exit light through the light exit surface 19a due to the arrangement of the LEDs 17 and the luminance may be lowered. Luminance unevenness may be distinct in a portion near the light entrance surface 19b with respect to the first direction.

As illustrated in FIG. 9, the light guide plate 19 according to the present embodiment includes flat portions 45 on the opposite plate surface 19c in addition to the opposite plate surface-side convex lenticular lens portions 44. The flat portions 45 are flat in the first direction (the X-axis direction) and the second direction (the Y-axis direction) and are formed in a non-forming area of the opposite plate surface 19c of the light guide plate 19 where the opposite plate surface-side convex lenticular lens portions 44 are not formed. The flat portions 45 are included adjacent to the opposite plate surface-side convex cylindrical lenses 44a included in the opposite plate surface-side convex lenticular lens portions 44 with respect to the second direction. Namely, the opposite plate surface-side convex cylindrical lenses 44a and the flat portions 45 are included on the opposite plate surface 19c of the light guide plate 19 alternately with respect to the second direction. The flat portions 45 are less likely to change optical properties of the reflected light when the light traveling within the light guide plate 19 reflects off the flat portions 45. The flat portions 45 are likely to disperse light over a larger area with respect to the second direction compared to the opposite plate surface-side convex lenticular lens portions 44. The light guide plate 19 includes the opposite plate surface-side convex lenticular lens portions 44 and the flat portions 45 on the opposite plate surface 19c. According to such a configuration, the luminance unevenness due to the arrangement of the LEDs 17 is less likely to be caused and the area occupied by the opposite plate surface-side convex lenticular lens portions 44 is reduced by the formation of the flat portions 45. Therefore, luminance is less likely to be lowered.

As illustrated in FIGS. 8, 9, 11, and 12, the flat portions 45 have a width dimension (a dimension in the second direction) that is relatively great near the light entrance surface 10b in the first direction (far away from the opposite edge surface 19d) and the width dimension is relatively reduced as is farther away from the light entrance surface 19b (closer to the opposite edge surface 19d). The opposite plate surface-side convex cylindrical lenses 44a have a width dimension relatively small near the light entrance surface 19b in the first direction and the width dimension is relatively increased as is farther away from the light entrance surface 19b. Namely, the areas of the flat portions 45 and the opposite plate surface-side convex lenticular lens portions 44 on the opposite plate surface 19c of the light guide plate 19 with respect to the second direction change according to the position thereof in the first direction, or according to a distance from the LEDs 17, and relation of the change of the area of the flat portions 45 and that of the opposite plate surface-side convex lenticular lens portions 44 is inverse correlation. Specifically, the occupied ratio of the flat portions 45 to the opposite plate surface 19c of the light guide plate 19 with respect to the second direction is relatively high near the light entrance surface 19b in the first direction, and the occupied ratio of the flat portions 45 to the opposite plate surface 19c with respect to the second direction is relatively low far away from the light entrance surface 19b. The occupied ratio of the opposite plate surface-side convex lenticular lens portions 44 to the opposite plate surface 19c of the light guide plate 19 with respect to the second direction is relatively low in a portion near the light entrance surface 19b in the first direction, and the occupied ratio of the opposite plate surface-side convex lenticular lens portions 44 to the opposite plate surface 19c is relatively high in a portion far away from the light entrance surface 19b. In the portion near the light entrance surface 19b with respect to the first direction, luminance unevenness may be caused with respect to the second direction due to the arrangement of the LEDs 17 having intervals therebetween in the second direction. In such a portion near the light entrance surface 19b, according to the above configuration, the luminance unevenness is less likely to be caused with respect to the second direction and luminance is less likely to be lowered in the exit light through the light exit surface 19a by forming the flat portions 45 having a relatively high occupied ratio. In the portion far from the light entrance surface 19b with respect to the first direction where the luminance unevenness is less likely to be caused due to the arrangement of the LEDs 17, the interference unevenness is less likely to be caused by forming the opposite plate surface-side convex lenticular lens portions 44 having a relatively high occupied ratio. Accordingly, the luminance unevenness and the interference unevenness are less likely to be caused and the luminance is improved.

Specifically, the opposite plate surface-side convex cylindrical lenses 44a included in the opposite plate surface-side convex lenticular lens portions 44 have a width dimension that corresponds to an occupied ratio to the opposite plate surface 19c with respect to the second direction, and the occupied ratio changes as follows. The occupied ratio of the opposite plate surface-side convex cylindrical lenses 44a is continuously and gradually increased as is farther away from the light entrance surface 19b and closer to the opposite edge surface 19d with respect to the first direction. The occupied ratio of the opposite plate surface-side convex cylindrical lenses 44a is continuously and gradually decreased as is farther away from the opposite edge surface 19d and closer to the light entrance surface 19b with respect to the first direction. The occupied ratio of the opposite plate surface-side convex cylindrical lenses 44a is minimum in the edge portion (the edge position) of the light guide plate 19 near the light entrance surface 19b in the first direction and is approximately 60%. The occupied ratio is maximum in the edge portion of the light guide plate 19 near the opposite edge surface 19d and is approximately 90%, and the occupied ratio in the middle portion with respect to the first direction is approximately 75%. Namely, the opposite plate surface-side convex lenticular lens portions 44 are formed over an entire length of the light guide plate 19 (the opposite plate surface 19c) in the first direction. Further, the opposite plate surface-side convex cylindrical lenses 44a are formed such that the height dimension thereof (the dimension in the third direction) changes according to the position with respect to the first direction. Specifically, the height dimension of the opposite plate surface-side convex cylindrical lenses 44a corresponds to a projected dimension from the opposite plate surface 19c and the projected dimension is continuously and gradually increased as is farther away from the light entrance surface 19b and closer to the opposite edge surface with respect to the first direction. the projected dimension is continuously and gradually decreased as is farther away from the opposite edge surface 19d and closer to the light entrance surface 19b with respect to the first direction. Namely, the height dimension of the opposite plate surface-side convex cylindrical lenses 44a changes similarly to the width dimension thereof according to the position in the first direction. Therefore, a surface area (area of the arched surface 44a1) of the opposite plate surface-side convex cylindrical lenses 44a also changes similarly to the width dimension and height dimension thereof according to the position in the first direction. The opposite plate surface-side convex cylindrical lenses 44a are inclined to ascend from the light entrance surface 19b toward the opposite edge surface 19d in the first direction and inclined to descend from the opposite edge surface 19d toward the light entrance surface 19b. The opposite plate surface-side convex cylindrical lenses 44a are inclined toward the light entrance surface 19b (the LEDs 17).

The flat portions 45 have a width dimension that corresponds to an occupied ratio to the opposite plate surface 19c with respect to the second direction, and the occupied ratio of the flat portions 45 to the opposite plate surface 19c with respect to the second direction changes as follows. The occupied ratio of the flat portions 45 is continuously and gradually increased as is closer to the light entrance surface 19b and farther away from the opposite edge surface 19d with respect to the first direction. The occupied ratio of the flat portions 45 is continuously and gradually decreased as is closer to the opposite edge surface 19d and farther away from the light entrance surface 19b with respect to the first direction. The occupied ratio of the flat portions 45 is maximum in the edge portion (the edge position) of the light guide plate 19 near the light entrance surface 19b in the first direction and is approximately 40%. The occupied ratio is minimum in the edge portion of the light guide plate 19 near the opposite edge surface 19d and is approximately 10%, and the occupied ratio in the middle portion with respect to the first direction is approximately 25%. Thus, the flat portions 45 are formed over an entire length of the light guide plate 19 (the opposite plate surface 19c) in the first direction similarly to the opposite plate surface-side convex lenticular lens portions 44. Thus, the minimum value (60%) of the occupied ratio of the opposite plate surface-side convex lenticular lens portions 44 in the second direction is greater than the maximum value (40%) of the occupied ratio of the flat portions 45. Namely, the occupied ratio of the opposite plate surface-side convex lenticular lens portions 44 to the opposite plate surface 19c of the light guide plate 19 with respect to the second direction is greater than the occupied ratio of the flat portions 45 to the entire length of the light guide plate 19 with respect to the first direction. Therefore, an occupied area ratio of the opposite plate surface-side convex lenticular lens portions 44 to the opposite plate surface 19c of the light guide plate 19 is relatively greater than an occupied area ratio of the flat portions 45 to the opposite plate surface 19c. Specifically, the occupied area ratio of the opposite plate surface-side convex lenticular lens portions 44 is approximately 75% and the occupied area ratio of the flat portions 45 is approximately 25%.

Comparative Experiment 1 was made to know how the interference unevenness, the luminance unevenness, and the luminance ratio change when the configuration of the opposite plate surface 19c of the light guide plate 19 is modified. In Comparative Experiment 1, the light guide plate 19 having the above-described configuration is used in the first embodiment, and the light guide plate has following configurations in Comparative Examples 1 and 2. In Comparative Example 1, the relation of the occupied ratio of the opposite plate surface-side convex lenticular lens portions 44 to the opposite plate surface 19c of the light guide plate 19 with respect to the second direction and the occupied ratio of the flat portions 45 to the opposite plate surface 19c is opposite from that of the first embodiment. In Comparative Example 2, the light guide plate includes the opposite plate surface-side convex lenticular lens portions over an entire area of the opposite plate surface thereof. In the light guide plate of Comparative Example 1, the occupied ratio of the opposite plate surface-side convex lenticular lens portions with respect to the second direction is lowered as is farther away from the light entrance surface in the first direction, and the occupied ratio of the flat portions with respect to the second direction is increased as is farther away from the light entrance surface in the first direction. In the light guide plate of Comparative Example 1, the minimum value of the occupied ratio of the opposite plate surface-side convex lenticular lens portions with respect to the second direction is 35% and the maximum value thereof is 60%, and the minimum value of the occupied ratio of the flat portions with respect to the second direction is 40% and the maximum value thereof is 65%. In the light guide plate of the first embodiment, the minimum value of the occupied ratio of the opposite plate surface-side convex lenticular lens portions with respect to the second direction is 60% and the maximum value thereof is 90%, and the minimum value of the occupied ratio of the flat portions with respect to the second direction is 10% and the maximum value thereof is 40%. In the light guide plate of Comparative Example 2, the opposite plate surface-side cylindrical lenses included in the opposite plate surface-side convex lenticular lens portions have a constant width over an entire length thereof in the first direction and the opposite plate surface-side cylindrical lenses are arranged in the second direction adjacent to each other without any interval therebetween on the opposite plate surface. In each of Comparative Example 1, Comparative Example 2, and the first embodiment, the exit light reflection portion 41 and the light exit surface-side prism portions 43 are included on the light exit surface of the light guide plate and the configuration thereof is same as those described before.

In Comparative Experiment 1, the backlight devices including the light guide plates of Comparative Example 1, Comparative Example 2, and the first embodiment are prepared and light from the LED enters each of the light guide plates through the light entrance surface and exits through the light exit surface. A photo of each light guide plate is taken from the light exit surface side and interference unevenness and luminance unevenness is determined based on the photos. Further, front luminance of the light exiting through the light exit surface is measured via the prism sheet and the experiment results are illustrated in table of FIG. 14. The backlight device used in Comparative Experiment 1 includes configurations same as the above-described configurations other than the light guide plates of Comparative Example 1, Comparative Example 2, and the first embodiment. FIG. 14 illustrates the photos of the light guide plates of Comparative Examples 1, 2 and the first embodiment taken from the light exit surface side and light exits each of the light guide plates through the respective light exit surface, determination results regarding the interference unevenness and the luminance unevenness based on the photos, and luminance ratio of the exit light. The luminance ratio represents a relative value (unit is %) with referring the luminance value of Comparative Example 1 as a reference value (100%). The photos of the whole light guide plate in FIG. 14 were taken from the light exit surface side and the LEDs are arranged on a lower side in FIG. 14. However, in Comparative Example 2 and the first embodiment, a finger of an operator appears on a part (a left edge portion) of the light guide plate as a shadow.

Experiment results of Comparative Experiment 1 will be described with reference to FIG. 14. In the light guide plate of Comparative Example 1, the luminance unevenness is rarely seen and the interference unevenness is seen, and the luminance ratio is highest. In the light guide plate of Comparative Example 2, the interference unevenness is rarely seen, and the luminance unevenness is seen, and the luminance ratio is lowest. In the light guide plate of the first embodiment, the interference unevenness and the luminance unevenness are rarely seen and are within an allowable range, and the luminance ratio is an effective value that is close to that of Comparative Example 1. Next, reasons of the above results will be described. In the light guide plate of Comparative Example 1, the occupied ratio of the opposite plate surface-side convex lenticular lens portions with respect to the second direction is maximum in the light entrance surface side edge portion in the first direction, and the value is same as the minimum value of the occupied ratio of the opposite plate surface-side convex lenticular lens portions 44 of the light guide plate 19 of the first embodiment. The occupied ratio of the opposite plate surface-side convex lenticular lens portions with respect to the second direction tends to be lowered as is closer to the opposite edge surface with respect to the first direction, and therefore, in Comparative Example 1, the occupied area ratio of the occupied ratio of the opposite plate surface-side convex lenticular lens portions to the opposite plate surface is lower than that of the first embodiment. Accordingly, the occupied ratio of the opposite plate surface-side convex lenticular lens portions may not effectively reduce the interference unevenness. In the light guide plate of Comparative Example 1, the occupied area ratio of the flat portions is higher than that of the first embodiment. Therefore, the luminance unevenness is less likely to be caused and the luminance ratio is higher than that of the first embodiment. In Comparative Example 2, the light guide plate includes the opposite plate surface-side convex lenticular lens portions over an entire area of the opposite plate surface thereof and includes no flat portions. Accordingly, the opposite plate surface-side convex lenticular lens portions most effectively achieve less occurrence of the interference unevenness. However, the luminance unevenness is likely to be seen and the luminance ratio is lowest because no flat portion is included.

In the light guide plate 19 of the first embodiment, the occupied ratio of the opposite plate surface-side convex lenticular lens portions 44 with respect to the second direction is a minimum value in the light entrance surface 19b side edge portion in the first direction, and the value is same as the maximum value of the occupied ratio of the opposite plate surface-side convex lenticular lens portions of the light guide plate of Comparative Example 1. The occupied ratio of the opposite plate surface-side convex lenticular lens portions 44 tends to be increased as is closer to the opposite edge surface in the first direction, and therefore, the occupied area ratio of the opposite plate surface-side convex lenticular lens portions 44 to the opposite plate surface 19c is higher than that in Comparative Example 1. Accordingly, the opposite plate surface-side convex lenticular lens portions 44 effectively achieve less occurrence of the interference unevenness. In the light guide plate 19 of the first embodiment, the occupied area ratio of the flat portions 45 is lower than that of Comparative Example 1 and higher than that of Comparative Example 2. Therefore, less occurrence of the luminance unevenness is effectively achieved and the luminance ratio is effectively high. Thus, according to the first embodiment, the interference unevenness and the luminance unevenness are less likely to be caused and high front luminance is effectively achieved.

Next, Comparative Experiment 2 was made to know how the luminance ratio and the luminance unevenness change when the occupied area ratio of the opposite plate surface-side convex lenticular lens portions and the occupied area ratio of the flat portions in Comparative Example 1 of Comparative Experiment 1 are same as those in the first embodiment. In Comparative Experiment 2, the light guide plate 19 having the above-described configuration is used in the first embodiment, and the light guide plate has following configurations in Comparative Example 3. In Comparative Example 3, the relation of the occupied ratio of the opposite plate surface-side convex lenticular lens portions 44 to the opposite plate surface 19c of the light guide plate 19 with respect to the second direction and the occupied ratio of the flat portions 45 to the opposite plate surface 19c is opposite from that of the first embodiment. Further, in Comparative Example 3, the specific values of the occupied area ratio of the opposite plate surface-side convex lenticular lens portions and the flat portions are same as those in the first embodiment. In the light guide plate of Comparative Example 3, the minimum value of the occupied ratio of the opposite plate surface-side convex lenticular lens portions with respect to the second direction is 60% (that is equal to the maximum value of the occupied ratio of Comparative Example 1), and the maximum value thereof is 90% (that is greater than the maximum value of the occupied ratio of Comparative Example 1). In Comparative Example 3, the minimum value of the occupied ratio of the flat portions with respect to the second direction is 10% (that is smaller than the minimum value of the occupied ratio) and the maximum value thereof is 40% (that is equal to the minimum value of the occupied ratio of Comparative Example 1). Namely, in the light guide plate of Comparative Example 3, the minimum value and the maximum value of the respective occupied ratios of the opposite plate surface-side convex lenticular lens portions and the flat portions with respect to the second direction are equal to those of the light guide plate 19 of the first embodiment.

Figure 16:
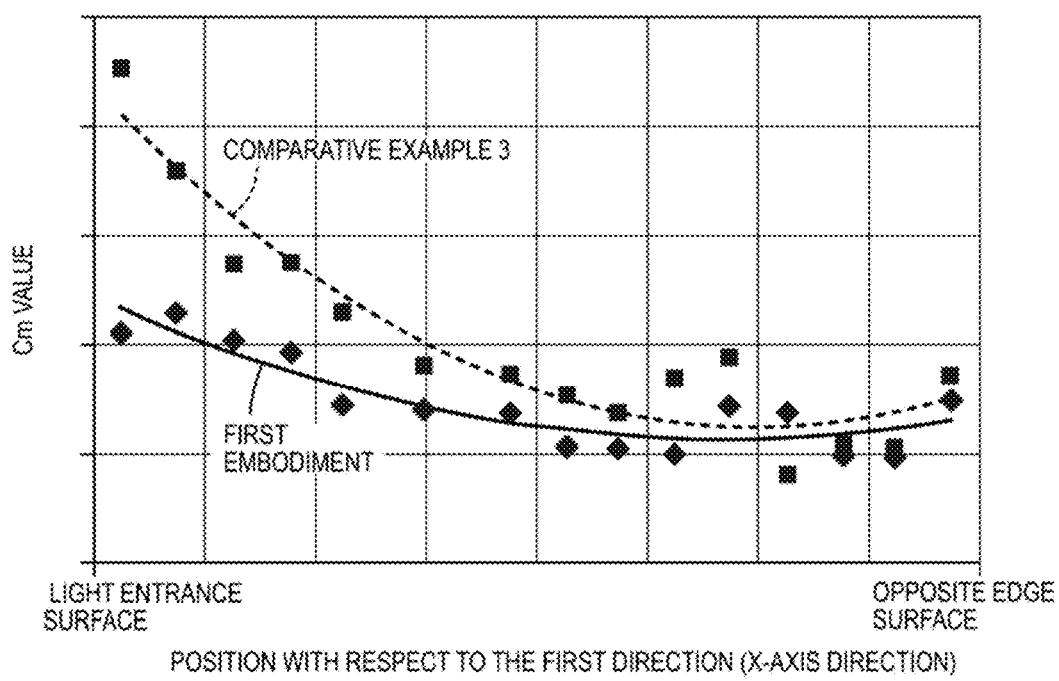
FIG. 16 is a graph representing relation between positions of each light guide plate with respect to the first direction according to Comparative Example 3 and the first embodiment in Comparative Experiment 2.

In Comparative Experiment 2, the backlight devices including the light guide plates of Comparative Example 3 and the first embodiment are prepared and light from the LED enters each of the light guide plates through the light entrance surface of the light guide plate and exits through the light exit surface. A photo of each light guide plate is taken from the light exit surface side and luminance unevenness is determined and Michelson contrast is measured based on the photos. Further, front luminance of the light exiting through the light exit surface is measured via the prism sheet and the experiment results are illustrated in FIGS. 15 and 16. FIG. 15 illustrates the photos of the light guide plates of Comparative Example 3 and the first embodiment taken from the light exit surface side through which light exits each of the light guide plates, determination results regarding the luminance unevenness based on the photos, average Cm values of Michelson contrast, and luminance ratio of the exit light. The average Cm value of Michelson contrast is an average value of the Cm values of Michelson contrast measured at different positions of the each light guide plate of Comparative Example 3 and the first embodiment with respect to the first direction. The Cm Value of Michelson contrast is a value obtained by dividing a difference value between a maximum luminance value and a minimum luminance value at the measured position by a total of the maximum luminance value and the minimum luminance value. As the Cm value is greater, the contrast (light-dark contrast) is higher and the luminance unevenness is likely to be seen. As the Cm value is smaller, the contrast is lower and the luminance unevenness is less likely to be seen. The luminance ratio represents a relative value (unit is %) with referring the luminance value of the first embodiment as a reference value (100%). The photos of the whole light guide plate in FIG. 15 were taken from the light exit surface side and the LEDs are arranged on a lower side in FIG. 15. In the graph of FIG. 16, the measurement results of Michelson contrast measured in different positions of each of the light guide plates of Comparative Example 3 and the first embodiment with respect to the first direction are plotted. A vertical axis represents the Cm values (no unit) of Michelson contrast and a horizontal axis represents a position on each of the light guide plates with respect to the first direction. The horizontal axis in FIG. 16 represents positions with respect to the first direction and the left end in FIG. 16 represents the position corresponding to the light entrance surface of each light guide plate and the right end in FIG. 16 represents the position corresponding to the opposite edge surface. In FIG. 16, square dots represent the measurement result of Comparative Example 3 and diamond dots represent the measurement result of the first embodiment.

Experiment results of Comparative Experiment 2 will be described with reference to FIG. 15. In the light guide plate of Comparative Example 3, the luminance ratio is slightly lower than that of the first embodiment and the luminance unevenness is seen and the average Cm value is greater than that of the first embodiment. In the light guide plate 19 of the first embodiment, the luminance ratio is slightly higher than that of Comparative Example 3 and the luminance unevenness is rarely seen and is within the allowable range, and the average Cm value is smaller than that of Comparative Example 3. As illustrated in FIG. 16, in the light guide plate of Comparative Example 3, the Cm values are widely varied as a whole and the difference between the Cm values is great in the adjacent measurement positions with respect to the first direction on the light entrance surface side. In the light guide plate 19 of the first embodiment, variation of the Cm values is small as a whole and the difference between the Cm values of the adjacent measurement positions with respect to the first direction on the light entrance surface side is slightly greater than that in the middle portion or the opposite edge surface side portion. However, the difference is smaller than that of Comparative Example 1. Next, reasons of the above results will be described. In the light guide plate of Comparative Example 3, the occupied ratio of the opposite plate surface-side convex lenticular lens portions to the light entrance surface side edge portion of the light guide plate with respect to the second direction is 90% that is higher than the occupied ratio of Comparative Example 1. In Comparative Example 3, the occupied ratio of the flat portions is 10% that is lower than the occupied ratio of Comparative Example 1. The flat portions are formed on a quite small area of the light entrance surface side edge portion where the luminance unevenness due to the arrangement of the LEDs may be caused, and therefore, the luminance unevenness is likely to be seen. In the light guide plate 19 of the first embodiment, the occupied ratio of the opposite plate surface-side convex lenticular lens portions to the light entrance surface side end portion of the light guide plate with respect to the second direction is 60% that is equal to the value of the occupied ratio of Comparative Example 1 and the occupied ratio of the flat portions is 40% that is equal to that of Comparative Example 1. Therefore, in the first embodiment, the luminance unevenness is rarely seen similarly to Comparative Example 1 and the result is better than that of Comparative Example 3. The luminance ratio is more effective in the first embodiment than Comparative Example 3.

Figure 17:
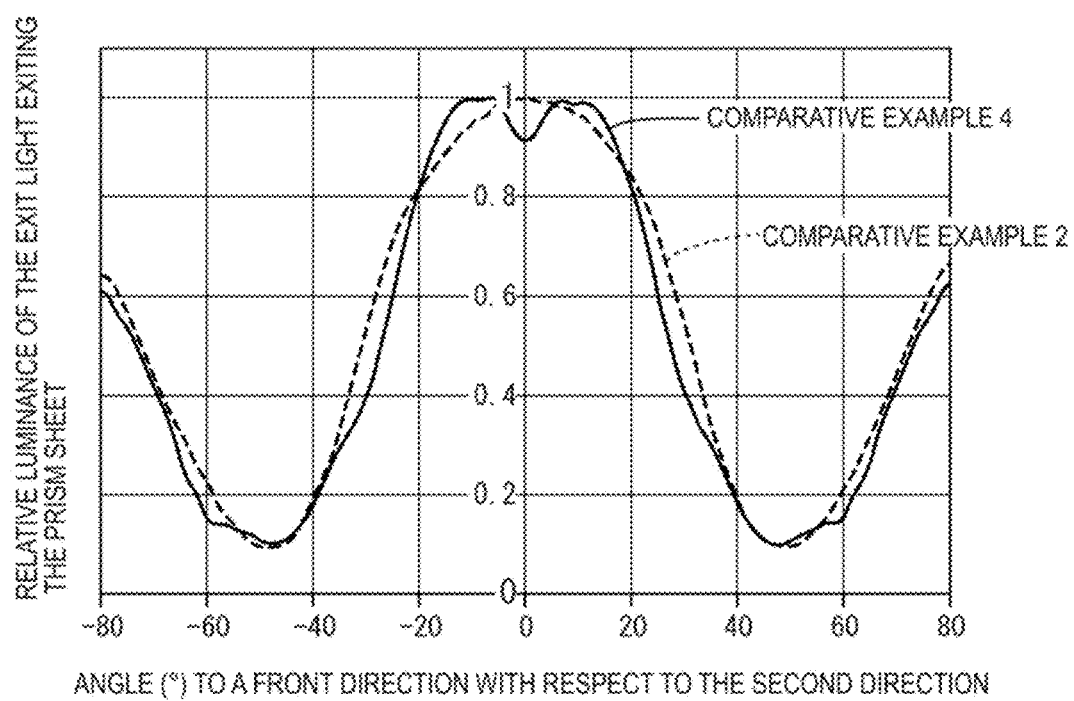
FIG. 17 is a graph representing a luminance angle distribution of exit light with respect to the second direction, the exit light exiting each of the light guide plates of Comparative Examples 2 and 4 through a prism sheet in Comparative Experiment 3.

Next, Comparative Experiment 3 was made using the light guide plate including the exit light reflection portion and the light exit surface side prism portions on the light exit surface and the opposite plate surface-side convex lenticular lens portions on the opposite plate surface to know how the luminance distribution of exit light exiting through the prism sheet change in the light guide plate including the flat portions over an entire area of the opposite plate surface and in the light guide plate including the opposite plate surface-side convex lenticular lens portions over an entire area of the opposite plate surface. In the Comparative Experiment 3, the light guide plate includes the flat portions on an entire area of the opposite plate surface in Comparative Example 4. A luminance distribution is measured for the exit light exiting each of the light guide plates of Comparative Example 4 and the Comparative Example 2 of the above Comparative Experiment 1 and transmitting through the prism sheet. The obtained luminance distributions are illustrated in FIG. 17. In the light guide plate of Comparative Example 4, the entire area of the opposite plate surface is the flat portions and the light exit surface-side unit prisms included in the light exit surface-side prism portion disposed on the light exist surface have an apex angle of 140°. The light guide plate of Comparative Example 2 includes a configuration as described in the above Comparative Experiment 1, and the light exit surface-side unit prisms included in the light exit surface-side prism portion disposed on the light exist surface have an apex angle of 140° that is same as that of Comparative Example 4. The prism sheet has a configuration same as the above described ones. In FIG. 17, a vertical axis represents a relative luminance (no unit) of the exit light exiting the prism sheet and a horizontal axis represents an angle (°) to a front direction with respect to the second direction. The relative luminance represented by the vertical axis in FIG. 17 is a relative value with referring the luminance value of the each of the light guide plates of Comparative Example 2 and Comparative Example 4 with respect to the front direction (the angle is 0°) as the reference value (1.0). In FIG. 17, the graph described by a dotted line represents the results of Comparative Example 2 and the graph described by a solid line represents the results of Comparative Example 4.

Experiment results of Comparative Experiment 3 will be described with reference to FIG. 17. In Comparative Example 4, the front luminance of the exit light from the prism sheet with respect to the second direction is higher than that of Comparative Example 2. Specifically, compared to the exit light exiting the light guide plate of Comparative Example 2 and transmitting through the prism sheet, the exit light exiting the light guide plate of Comparative Example 4 transmits through the prism sheet includes relatively a larger amount of rays of light travelling with an angle range of ±10° with respect to the front direction and includes a relatively small amount of rays of light travelling in a direction having an angle range of ±20° to ±40° with respect to the front direction. Namely, the exit light exiting the light guide plate of Comparative Example 4 transmits through the prism sheet has higher light collecting degree toward the front direction compared to that of Comparative Example 2. The opposite plate surface-side convex lenticular lens portions included over the entire area of the opposite plate surface like Comparative Example 2 provide anisotropic light collecting properties to the light and the light is less likely to be collected with respect to the second direction by the prism sheet, and thus, the front luminance is relatively low. The flat portions included over the entire area of the opposite plate surface like Comparative Example 4 does not provide any specific optical properties to the light and the anisotropic light collecting action provided by the light exit surface-side prism portion is dominant as the optical action applied to the exit light from the light guide plate. The exit light is likely to be collected with respect to the second direction by the prism sheet and the front luminance is relatively high.

Figure 18:
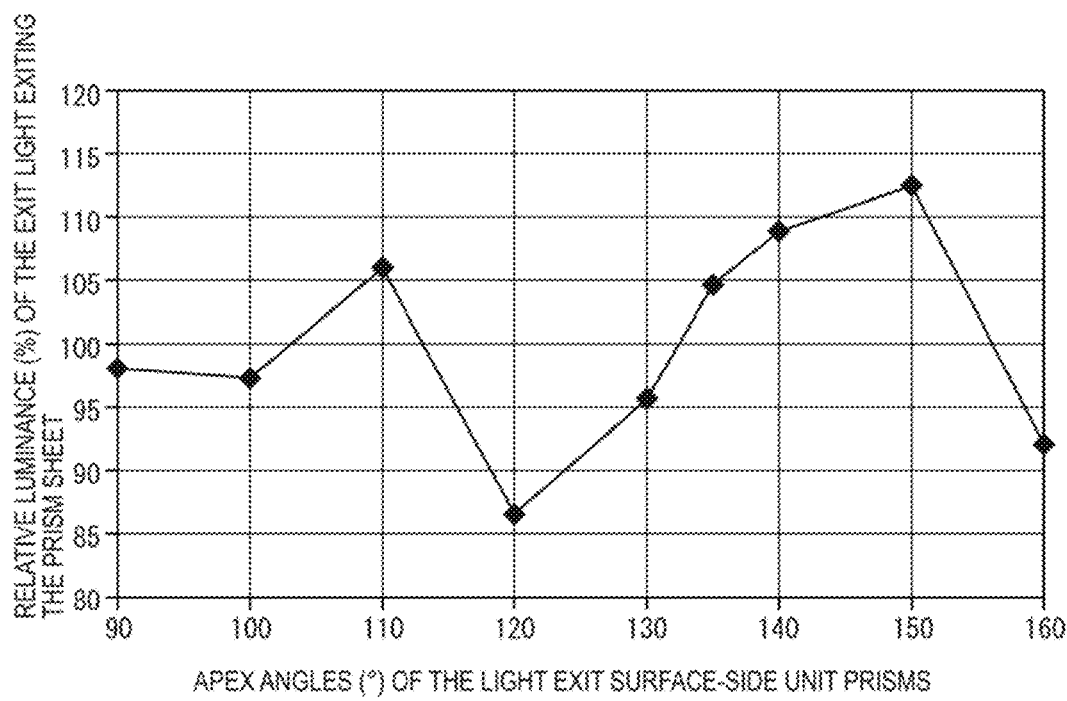
FIG. 18 is a graph representing relation between apex angles of light exit surface-side unit prisms and relative luminance of exit light through a prism sheet in Comparative Experiment 4.

Next, Comparative Experiment 4 was made to know how the luminance changes in the light guide plate including the flat portions over an entire area of the opposite plate surface like Comparative Example 4 of Comparative Experiment 3 when the apex angle of the light exit surface-side unit prism of the light exit surface-side prism portion is varied. In Comparative Experiment 4, the light guide plate of Comparative Example 4 of Comparative Experiment 3 is used and it is measured how the luminance of the exit light exiting the light guide plate through the light exit surface and transmitting through the prism sheet layered on the light exit side of the light guide plate changes according to the variation of the apex angle when the apex angle of the light exit surface-side unit prism of the light exit surface-side prism portion is varied within a range of 90° to 160°. The measurement results are illustrated in FIG. 18. In FIG. 18, a horizontal axis represents apex angles (°) of the light exit surface-side unit prisms and a vertical axis represents relative luminance (%) of the exit light exiting the prism sheet. The relative luminance of the exit light represented by the vertical axis in FIG. 18 is relative values referring the luminance value of the exit light exiting the light guide plate of Comparative Example 2 of Comparative Experiment 3 and transmitting through the prism sheet as a reference value (100%).

The experiment results of Comparative Experiment 4 will be described with reference to FIG. 18. If the light exit surface-side unit prisms have an apex angle that is within a range from 102° to 112° or a range from 135° to 156°, the relative luminance of Comparative Experiment 4 is higher than that of Comparative Example 2 of Comparative Experiment 3. Especially, if the apex angle of the light exit surface-side unit prisms is 110° or within a range from 135° to 155°, the relative luminance is higher than that of Comparative Example 2 by 5% or more. If the apex angle of the light exit surface-side unit prisms is 150°, the luminance is highest and the relative luminance is higher than that of Comparative Example 2 by approximately 13%. The flat portions included over the entire area of the opposite plate surface like Comparative Experiment 4 does not provide any specific optical properties to the light and the anisotropic light collecting action provided by the light exit surface-side prism portion is dominant as the optical action applied to the exit light from the light guide plate. Therefore, the apex angle of the light exit surface-side unit prisms of the light exit surface-side prism portion is preferably 110° or within a range from 135° to 155°, more preferably within a range from 140° to 150°. The above properties are similar in the configuration in which the light guide plate 19 includes on the opposite late surface 19a the opposite plate surface-side convex lenticular lens portions 44 and the flat portions 45 that change the width dimension thereof according to the position in the first direction.

Figure 7:
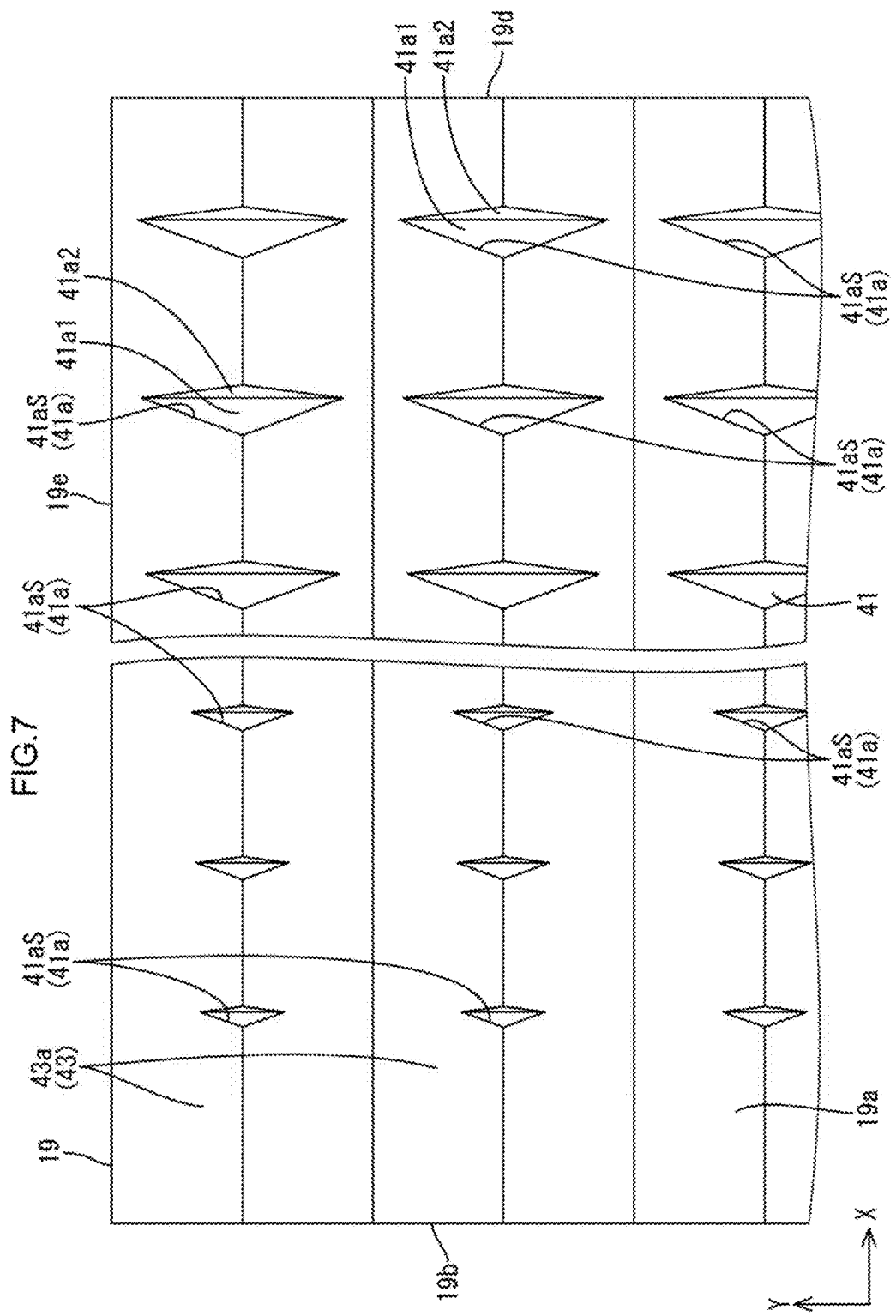
FIG. 7 is a plan view illustrating an edge portion of the light guide plate near a light entrance surface and an edge portion of the light guide plate near an opposite edge surface.

The relation of the exit light reflection portion 41 and the light exit surface-side prism portions 43 formed on the light exit surface 19a of the light guide plate 19 will be described in detail. As illustrated in FIGS. 7 and 9, the unit reflecting portion 41a of the exit light reflection portion 41 is formed by partially cutting off a top portion 43a2 of the light exit surface-side unit prism 43a of the light exit surface-side prism portion 43. Unit reflecting portion 41a is not formed on the bottom portion of the light exit surface-side unit prism 43a opposite from the top portion 43a2 and the bottom portion is a non-forming portion where no unit reflecting portion 41a is formed. The unit reflecting portion 41a has a height dimension (a dimension in the third direction) that is smaller than that of the light exit surface-side unit prism 43a. According to such a configuration, as illustrated in FIG. 6, the unit reflecting portions 41a extend in the second direction but are not continuous over an entire length of the light guide plate 19 in the second direction and are arranged at intervals. Namely, the unit reflecting portions 41a are separated unit reflecting portions 41aS that are arranged at intervals in the second direction. The unit reflecting portions 41a are formed by cutting off a part of the top portion 43a2 of the light exit surface-side unit prism 43a to be open toward a side in the second direction. The number of the separated unit reflecting portions 41aS of the unit reflecting portions 41a is equal to a total number of the light exit surface-side unit prisms 43a of the light exit surface-side prism portions 43. A middle position of each unit reflecting portion 41a with respect to the second direction substantially matches a position of the top portion 43a2 of the light exit surface-side unit prism 43a with respect to the second direction. Further, each of the unit reflecting portions 41a arranged in the first direction has a height dimension (a depth dimension) that is gradually increased as is farther away from the light entrance surface 19b (the LEDs 17) in the first direction (see FIG. 3), and has a width dimension (a formation area in the second direction) that is gradually increased as is farther away from the light entrance surface 19b in the first direction. Accordingly, as illustrated in FIG. 7, the unit reflecting portions 41a arranged near the light entrance surface 19b in the first direction have a width dimension that is relatively small and have a surface area that is relatively small, and the unit reflecting portions 41a arranged near the opposite edge surface 19d in the first direction has a width dimension that is relatively large and has a surface area that is relatively large.

In the unit reflecting portions 41a, the amount of reflecting light tends to be proportional to a surface area thereof. Therefore, the size of the surface area is determined to obtain a required amount of reflecting light. This is similar to the exit light reflection portion 41 and the size of the surface area of the whole exit light reflection portion 41 (a total area of adding the surface areas of the unit reflecting portions 41a) is determined to obtain the required amount of reflecting light reflected by the exit light reflection portion 41. If the unit reflecting portions extend over an entire length of the light guide in the second direction, a dimension of the unit reflection portions in the third direction cannot be greater than a certain value to set the surface area of the unit reflecting portions to the above value. According to the configuration in that the unit reflecting portions 41a include the separated unit reflecting portions 41aS that are arranged at intervals in the second direction, the dimension of the unit reflecting portions 41a with respect to the third direction can be relatively increased to set the surface area of the unit reflecting portions 41a to the above value. Therefore, the separated unit reflecting portions 41aS of the unit reflecting portions on the light exit surface 19a are likely to be formed as is designed when the light guide plate 19 is formed with resin and the exit light reflection portion 41 is integrally formed with the light exit surface 19a. Accordingly, the exit light reflection portion 41 can effectively exert the optical properties. If the unit reflecting portions extend over an entire length of the light guide 19 in the second direction, the number of the unit reflecting portions arranged in the first direction is reduced to adjust the total area of the surface areas of the unit reflecting portions. However, the interval between the unit reflecting portions arranged in the first direction is increased and luminance unevenness may be caused. With the configuration in that the unit reflecting portions 41a include the separated unit reflecting portions 41aS arranged at intervals in the second direction, the number and the arrangement intervals of the unit reflecting portions 41a arranged in the first direction is not necessary to be changed. Therefore, the luminance unevenness is less likely to be caused in the exit light from the backlight device 12. Further, the unit reflecting portions 41a are open in the second direction by cutting off a part of the top portion 43a2 side of the light exit surface-side unit prisms 43a and therefore, the light exit surface-side prism portions 43 effectively exert the light collecting performance. Specifically, if the unit reflecting portions are not open in the second direction but have side surfaces parallel to the first direction, the light is refracted or reflected by the side surfaces parallel to the first direction and the light collecting performance by the light exit surface-side prism portions may be deteriorated. The unit reflecting portions 41a are open in the second direction by cutting off a part of the top portion 43a2 side of the light exit surface-side unit prisms 43a and therefore, the light exit surface-side prism portions 43 effectively exert the light collecting performance and the luminance of the exit light from the backlight device 12 is increased.

Figure 19:
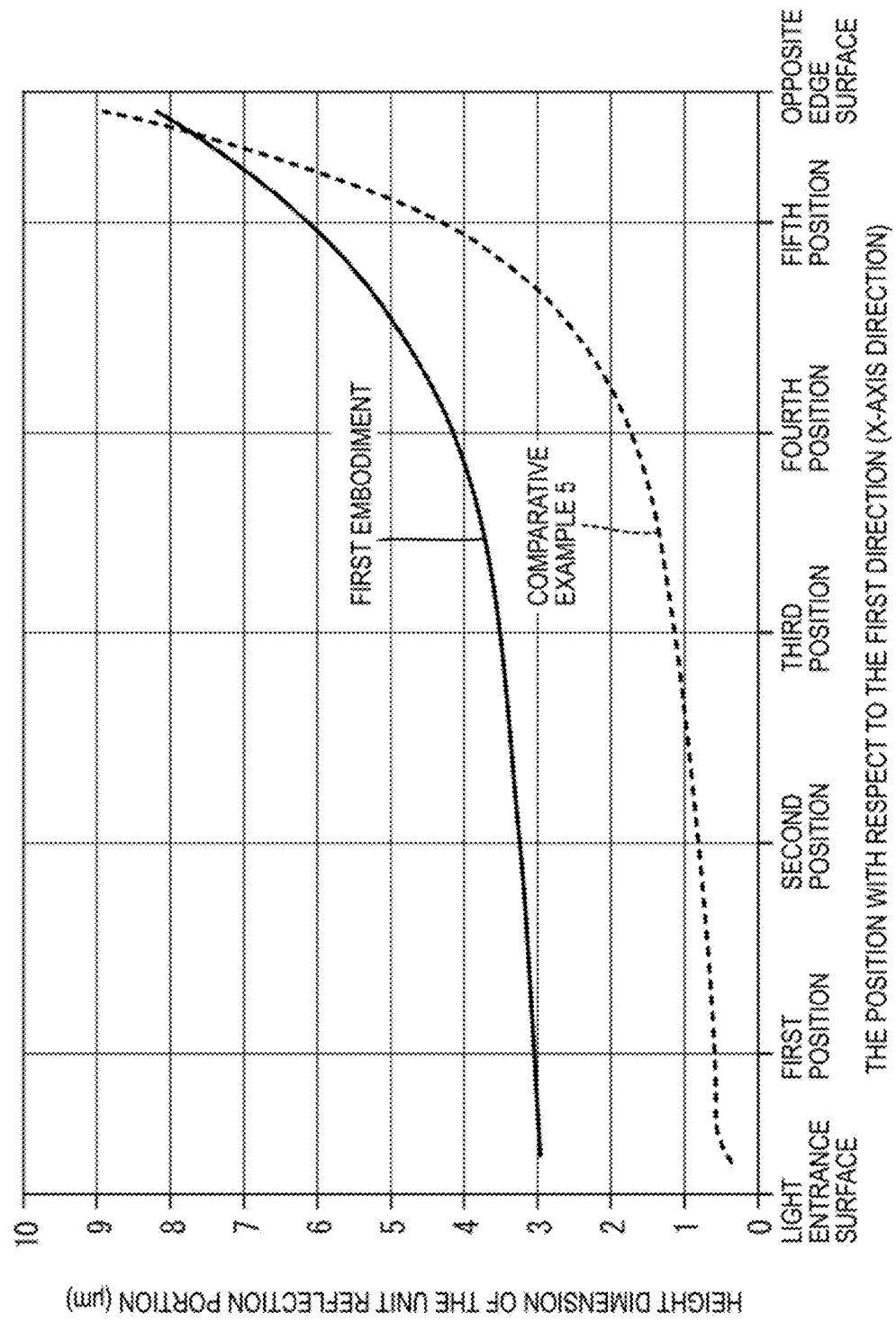
FIG. 19 is a graph representing height dimensions of a unit reflection portion that is an exit light reflection portion of each of light guide plates according to Comparative Example 5 and the first embodiment in Comparative Experiment 5.

Next, Comparative Experiment 5 was made to know how reproducibility of the unit reflecting portions 41a of the exit light reflection portion 41 is changed in the light guide plate including the light exit surface-side prism portions 43 and in the light guide plate without including the light exit surface-side prism portions 43. In Comparative Experiment 5, the light guide plate 19 has the exit light reflection portion 41 and the light exit surface-side prism portions 43 on the light exit surface 19a in the first embodiment, and the light guide plate has the exit light reflection portion on the light exit surface and does not have the light exit surface-side prism portions in Comparative Example 5. The light guide plate 19 of the first embodiment in Comparative Experiment 5 is same as the light guide plate 19 of each of Comparative Examples 1, 2 and the first embodiment. The light guide plate of Comparative Example 5 of Comparative Experiment 5 has a configuration same as that of the light guide plate 19 of the first embodiment other than the feature not including the light exit surface-side prism portions. The unit reflecting portions of the light guide plate of Comparative Example 5 extend continuously (without having any intervals) over an entire length of the light guide plate in the second direction (the Y-axis direction) and the number of unit reflecting portions arranged in the first direction (the X-axis direction) is same as that of the unit reflecting portions 41a of the light guide plate 19 according to the first embodiment. In Comparative Experiment 5, regarding the light guide plate of Comparative Example 5 and the light guide plate 19 of the first embodiment, the height of the unit reflecting portions of the exit light reflection portion according to positions in the first direction is measured and the measurement results are illustrated in FIG. 19. In Comparative Experiment 5, each of the light guide plates of Comparative Example 5 and the first embodiment are defined into six portions with respect to the first direction and defined positions (borders) include a first position, a second position, a third position, a fourth position, and a fifth position in this order from the light entrance surface side. The reproducibility of the unit reflection portion 41a is determined at each position and the results are illustrated in FIG. 20. In FIG. 19, the vertical axis represents a height dimension of the unit reflection portion (μm) and the horizontal axis represents the position in each light guide plate with respect to the first direction. Regarding the positions with respect to the first direction represented by the horizontal axis, the left end in FIG. 19 represents a position of the light entrance surface of each light guide plate and the right end in FIG. 19 represents a position of the opposite edge surface of each light guide plate. FIG. 20 illustrates the height dimensions of the unit reflection portions and determination results regarding reproducibility of the unit reflection portions at each of the first position to the fifth position. The reproducibility of the unit reflection portions is determined based on deviation between the light distribution (theoretical values) of the exit light from the light guide plate obtained with optical simulation and the light distribution (actual measurement values) of the exit light from the light guide plate that is actually formed with resin. The determination regarding reproducibility is "not good" if the deviation is greater than an allowable reference value and the determination is "good" if the deviation is not greater than the allowable reference value.

The experiment results of Comparative Experiment 5 will be described with reference to FIG. 19. In both of the light guide plate 19 of the first embodiment and the light guide plate of Comparative Example 5, the height dimension of the unit reflection portions is gradually increased as is closer to the opposite edge surface from the light entrance surface. The unit reflecting portions 41a of the light guide plate 19 of the first embodiment have the height dimension that is generally greater than that of the unit reflecting portions of the light guide plate of Comparative Example 5. The unit reflecting portions of the light guide plate of Comparative Example 5 extend continuously over an entire length of the light guide plate in the second direction, and the unit reflecting portions 41a of the light guide plate 19 of the first embodiment include separated unit reflecting portions 41aS that are arranged at intervals in the second direction. With such a configuration, the above-described height dimensions are provided and the details will be described below. The amount of reflecting light reflected by the unit reflecting portions is proportional to a surface area of the reflecting portions. Therefore, the size of the surface area of the unit reflecting portions is determined to obtain a required amount of reflecting light. The unit reflecting portions extend over an entire length of the light guide of Comparative Example 5 in the second direction and therefore, a height dimension of the unit reflection portions cannot be increased so much to set the surface area of the unit reflecting portions to the above value. In the light guide plate according to the first embodiment, the unit reflecting portions 41a include the separated unit reflecting portions 41aS that are arranged at intervals in the second direction and therefore, the height dimension of the unit reflecting portions 41a can be relatively increased to set the surface area of the unit reflecting portions 41a to the above value. Accordingly, the unit reflecting portions 41a of the light guide plate 19 of the first embodiment have the height dimension that is generally greater than that of the unit reflecting portions of the light guide plate of Comparative Example 5.

As illustrated in FIG. 20, the reproducibility of the unit reflecting portions is good if the height dimension of the unit reflecting portions is greater than approximately 3 µm. Regarding the light guide plate of Comparative Example 5, the reproducibility of the unit reflecting portions is not good in each of the first position to the fourth position and is good in the fifth position. The results are caused due to the following configurations. Regarding the light guide plate 19 of the first embodiment, the reproducibility of the unit reflecting portions 41a is good in each of the second position to the fifth position and is almost good in the first position. Most of the unit reflecting portions 41a included in the light guide plate 19 of the first embodiment has the height dimension greater than approximately 3 µm that is a reference value for determining the reproducibility of the unit reflecting portions. Most of the unit reflecting portions included in the light guide plate of Comparative Example 5 has the height dimension not greater than the reference value (3 µm). As described before, the light guide plate 19 includes the exit light reflection portion 41 and the light exit surface-side prism portions 43 and the unit reflecting portions 41a of the exit light reflection portion 41 include separated unit reflecting portions 41aS in the first embodiment. According to such a configuration, the unit reflecting portions 41a have an effective great height dimension and the separated unit reflecting portions 41aS of the unit reflecting portions 41a on the light exit surface 19a are likely to be formed as is designed when the light guide plate 19 is formed with resin. Accordingly, the exit light reflection portion 41 can effectively exert the optical properties. The number of the unit reflecting portions arranged in the first direction may be reduced in the light guide plate of Comparative Example 5 to adjust a total area of surface areas of the unit reflecting portions to be a certain value such that the height dimension of the unit reflecting portions is increased. However, in such a configuration, the intervals between the unit reflecting portions arranged in the first direction is increased and the luminance unevenness may be caused in the exit light from the light guide plate. With the configuration of the light guide plate 19 of the first embodiment in that the unit reflecting portions 41a include the separated unit reflecting portions 41aS arranged at intervals in the second direction, the number and the arrangement intervals of the unit reflecting portions 41a arranged in the first direction is not necessary to be changed. Therefore, the luminance unevenness is less likely to be caused in the exit light from the light guide plate 19.

As is described above, the backlight device (the lighting device) 12 of the present embodiment includes the LEDs (a light source) 17, the light guide plate 19, the reflection sheet (a reflecting member) 40, the exit light reflection portion 41, the opposite plate surface-side convex lenticular lens portions 44, and the flat portions 45. The light guide plate 19 has a rectangular plate shape having outer peripheral edge surfaces including a pair of edge surfaces and plate surfaces. One of the edge surfaces is the light entrance surface 19b through which light emitted by the LEDs 17 enters and one of the plate surfaces is the light exit surface 19a through which the light exits and another one of the plate surfaces is the opposite plate surface 19c. The reflection sheet 40 is arranged to be opposite the opposite plate surface 19c of the light guide plate 19 and reflects light. The exit light reflection portion 41 is included in the light guide plate 19 on the light exit surface 19a and reflect light travelling within the light guide plate 19 to accelerate exiting of light through the light exit surface 19a. The exit light reflection portion 41 includes the unit reflecting portions 41a extending in the second direction that is parallel to the pair of edge surfaces of the outer peripheral edge surfaces of the light guide plate 19 including the light entrance surface 19b. The unit reflecting portions 41a are arranged at intervals in the first direction that is parallel to the pair of edge surfaces of the outer peripheral edge surfaces of the light guide plate 19 not including the light entrance surface 19b. The opposite plate surface-side convex lenticular lens portions 44 (the opposite plate surface-side anisotropic light collecting portion) are included in the light guide plate 19 on the opposite plate surface 19c. The opposite plate surface-side convex lenticular lens portions 44 include the opposite plate surface-side convex cylindrical lenses 44a (the opposite plate surface-side cylindrical lens) each of which extends in the first direction and that are arranged in the second direction. The occupied ratio of the opposite plate surface-side convex lenticular lens portions 44 with respect to the second direction is relatively low in a portion near the light entrance surface 19b in the first direction and the occupied ratio thereof is relatively high in a portion far away from the light entrance surface. The flat portions 45 are included in the light guide plate 19 on the opposite plate surface 19c and flat in the first direction and the second direction. The occupied ratio of the flat portions 45 to the opposite plate surface 19c with respect to the second direction is relatively high in a portion near the light entrance surface 19b in the first direction and the occupied ratio thereof is relatively low in a portion far away from the light entrance surface.

According to such a configuration, the light emitted by the LEDs 17 enters the light guide plate 19 through the light entrance surface 19b and travels within the light guide plate 19 with reflecting off the exit light reflection portion 41 included on the light exit surface 19a side of the light guide plate 19. The unit reflecting portions 41a extend in the second direction and are arranged in the first direction at intervals. Therefore, the unit reflecting portions 41a reflect the light traveling within the light guide plate 19 in the first direction toward the opposite plate surface 19c. The light reflected by the exit light reflection portion 41 toward the opposite plate surface 19c is totally reflected by the opposite plate surface 19c or passes through the opposite plate surface 19c and is reflected by the reflection sheet 40. Thereafter, the light exits through the light exit surface 19a.

If the exit light reflection portion 41 is included on the opposite plate surface 19c side, the light is reflected by the exit light reflection portion 41 directly toward the light exit surface 19a and exits therethrough. Compared to this configuration, with the configuration in that the exit light reflection portion 41 is included on the light exit surface 19a side of the light guide plate, light is reflected by the exit light reflection portion 41 toward the opposite plate surface 19c and the light may be totally reflected by the opposite plate surface 19c or reflected by the reflection sheet 40 toward the light exit surface 19a again. Then, the light exits through the light exit surface 19a. Namely, a path of light reflecting off the exit light reflection portion 41 and exiting through the light exit surface 19a is complicated. Especially, the light reflecting off the reflection sheet 40 is refracted at least twice when exiting through the opposite plate surface 19c toward the reflection sheet 40 and when reflecting off the reflection sheet 40 and entering through the opposite plate surface 19c. The light is likely to be dispersed in the second direction due to the refraction, and the light is effectively mixed with respect to the second direction and luminance unevenness is less likely to occur in the exit light through the light exit surface 19a with respect to the second direction.

However, the light reflecting off the exit light reflection portion 41 and reaching the opposite plate surface 19c of the light guide plate 19 may be totally reflected by the opposite plate surface 19c toward the light exit surface 19a or may pass through the opposite plate surface 19c and reflect off the reflection sheet 40 and enter through the opposite plate surface 19c and travel toward the light exit surface 19a. Therefore, the phases of light travelling in the two paths may be matched, and interference unevenness may be caused in the exit light exiting through the light exit surface 19a. The light guide plate 19 includes the opposite plate surface-side convex lenticular lens portion 44 on the opposite plate surface 19c of the light guide plate 19. The opposite plate surface-side convex lenticular lens portion 44 includes the opposite plate surface-side convex cylindrical lenses 44a each of which extends in the first direction and that are arranged in the second direction. A distance between the opposite plate surface-side convex cylindrical lenses 44a and the reflection sheet 40 changes according to a position with respect to the second direction. Therefore, a phase of the light that is totally reflected at a border surface of each opposite plate surface-side convex cylindrical lens 44a is less likely to match a phase of the light that passes through each opposite plate surface-side convex cylindrical lens 44a and reflects off the reflection sheet 40. Thus, interference unevenness is likely to be reduced.

When the light travelling within the light guide plate 19 may be reflected by a border surface of the opposite plate surface-side convex cylindrical lenses 44a of the opposite plate surface-side convex lenticular lens portion 44, the reflected light is less likely to be dispersed over an area greater than an area, with respect to the second direction, where the opposite plate surface-side convex cylindrical lenses 44a are formed. The opposite plate surface-side convex cylindrical lenses 44a selectively collect the light reflected by the exit light reflection portion 41 with respect to the second direction. The light affected by the anisotropic light collecting action is less likely to be used effectively by the optical member if the light guide plate 19 includes the optical member. Therefore, if the opposite plate surface-side convex lenticular lens portion 44 is arranged over an entire area of the opposite plate surface 19c of the light guide plate 19, luminance unevenness is caused with respect to the second direction in the exit light through the light exit surface 19a due to the arrangement of the LEDs 17 and the luminance may be lowered. Luminance unevenness may be distinct in a portion near the light entrance surface 19b with respect to the first direction. The light guide plate 19 includes the opposite plate surface-side convex lenticular lens portion 44 and also the flat portions 45 on the opposite plate surface 19c of the light guide plate 19. The flat portions 45 are flat to be parallel to the first direction and the second direction, and the flat portions 45 are less likely to change optical properties of light. The flat portions 45 are likely to disperse light over a larger area with respect to the second direction compared to the opposite plate surface-side convex lenticular lens portions 44 and luminance is less likely to be lowered.

Regarding the occupied ratio of the opposite plate surface-side convex lenticular lens portions 44 and that of the flat portions 45 to the opposite plate surface 19c with respect to the second direction, the occupied ratio of the opposite plate surface-side convex lenticular lens portions 44 is relatively low near the light entrance surface 19b in the first direction and the occupied ratio of the flat portions 45 is relatively high near the light entrance surface 19b in the first direction. The occupied ratio of the opposite plate surface-side convex lenticular lens portions 44 is relatively high far away from the light entrance surface 19b in the first direction and the occupied ratio of the flat portions 45 is relatively low far away from the light entrance surface 19b. In the portion near the light entrance surface 19b with respect to the first direction, luminance unevenness may be caused with respect to the second direction due to the arrangement of the LEDs 17. In such a portion near the light entrance surface 19b, the luminance unevenness is less likely to be caused with respect to the second direction and luminance is less likely to be lowered in the exit light through the light exit surface 19a by forming the flat portions 45 having a relatively high occupied ratio. In the portion far from the light entrance surface 19b with respect to the first direction where the luminance unevenness is less likely to be caused due to the arrangement of the LEDs 17, the interference unevenness is less likely to be caused by forming the opposite plate surface-side convex lenticular lens portions 44 having a relatively high occupied ratio. Accordingly, the luminance unevenness and the interference unevenness are less likely to be caused and the luminance is improved.

The occupied ratio of the opposite plate surface-side convex cylindrical lens portions 44 is continuously and gradually increased as is farther away from the light entrance surface 19b, and the occupied ratio of the flat portions 45 is continuously and gradually decreased as is farther away from the light entrance surface 19b. Accordingly, compared to a configuration in that the occupied ratio of each of the opposite plate surface-side convex cylindrical lens portions 44 and the flat portions 45 is varied in a stepwise manner, occurrence of the luminance unevenness and the interference unevenness is effectively suppressed and luminance is effectively improved.

The opposite plate surface-side convex cylindrical lens portions 44 and the flat portions 45 are disposed on an entire area of the opposite plate surface 19c, respectively, with reference to the first direction. According to such a configuration, occurrence of luminance unevenness and interference unevenness is effectively suppressed in the portion of the light guide plate 19 near the light entrance surface 19b with respect to the first direction and in the portion of the light guide plate 19 far away from the light entrance surface 19b, and the luminance is effectively improved compared to the following configuration. The opposite plate surface-side convex cylindrical lens portions 44 are not included but only the flat portions 45 are included on the portion of the opposite plate surface 19c close to the light entrance surface 19b with respect to the first direction, and the flat portions 45 are not included but only the opposite plate surface-side convex cylindrical lens portions 44 are included on the portion of the opposite plate surface 19c far from the light entrance surface 19b.

The occupied ratio of the opposite plate surface-side convex cylindrical lens portions 44 is 60% in the portion of the light guide plate 19 closest to the light entrance surface 19b in the first direction and is 90% in the portion of the light guide plate 19 farthest from the light entrance surface 19b. The occupied ratio of the flat portions 45 is 40% in the portion of the light guide plate 19 closest to the light entrance surface 19b in the first direction and is 10% in the portion of the light guide plate 19 farthest from the light entrance surface 19b. Accordingly, occurrence of the luminance unevenness and the interference unevenness is effectively suppressed and luminance is effectively improved in the portion of the light guide plate 19 close to the light entrance surface with respect to the first direction and the portion thereof far from the light entrance surface 19b.

The light guide plate 19 includes outer peripheral edge surfaces and a pair of opposing edge surfaces of the outer peripheral edge surfaces includes the light entrance surface 19b and the opposite edge surface 19d (non-light entrance opposite surface). The opposite plate surface-side convex cylindrical lens portions 44 and the flat portions 45 are disposed such that the occupied ratio of the opposite plate surface-side convex cylindrical lens portions 44 is continuously and gradually increased from the light entrance surface 19 side to the opposite edge surface 19d side with respect to the first direction, and the occupied ratio of the flat portions 45 is continuously and gradually decreased. In such a one-side light entrance type backlight device 12, occurrence of the luminance unevenness and the interference unevenness is effectively suppressed from the light entrance surface 19b side to the opposite edge surface 19d side with respect to the first direction, and the luminance is effectively improved.

The light exit surface-side prism portions 43 (light exit surface side anisotropic light collecting portion) that are included on the light exit surface 19a of the light guide plate 10. The light exit surface-side prism portions 43 include the light exit surface-side unit prisms 43a (light exit surface-side unit light collecting portion) that extend in the first direction and are arranged in the second direction. Accordingly, the anisotropic light collecting action is applied by the light exit surface-side prism portions 43 to at least a part of rays of light that is reflected by the exit light reflection portion 41 toward the opposite plate surface 19c of the light guide plate 19 and reaching the light exit surface 19a again. Namely, the light exit surface-side prism portions 43 include the light exit surface-side unit prisms 43a that extend in the first direction and are arranged in the second direction, and therefore, the light exiting the light exit surface-side unit prism 43a includes light that is selectively provided with the light collecting action with respect to the second direction in which the light exit surface-side unit prisms 43a are arranged. The light traveling within the light guide plate 19 in the first direction without being reflected by the exit light reflection portion 41 is totally reflected by the light exit surface-side unit prisms 43a so as to travel within the light guide plate with being dispersed in the second direction. Accordingly, the light travelling within the light guide plate 19 is effectively mixed with respect to the second direction and the luminance unevenness is less likely to be caused in the exit light through the light exit surface 19a with respect to the second direction.

The exit light reflecting portions 41 include the separated unit reflecting portions 41aS including unit reflecting portions 41a that are arranged in the second direction at intervals. In the unit reflecting portions 41a, the amount of reflecting light tends to be proportional to a surface area thereof. Therefore, the size of the surface area is determined so as to obtain a required amount of reflecting light. If the unit reflecting portions extend over an entire length of the light guide plate 19 in the second direction, a dimension of the unit reflection portions 41a in the normal line of the plate surface of the light guide plate 19 cannot be greater than a certain value to set the surface area of the unit reflecting portions 41a to the above value. With the configuration in that the unit reflecting portions 41a include the separated unit reflecting portions 41aS that are arranged at intervals in the second direction, the dimension of the unit reflecting portions 41a with respect to the normal line of the plate surface of the light guide plate 19 can be relatively increased to set the surface area of the unit reflecting portions 41a to the above value. Therefore, the separated unit reflecting portions 41aS of the unit reflecting portions 41a on the opposite plate surface 19c are likely to be formed as is designed when the light guide plate 19 is formed with resin and the exit light reflection portion 41 is integrally formed with the opposite plate surface 19c. Accordingly, the exit light reflection portion 41 can effectively exert the optical properties.

If the unit reflecting portions extend over an entire length of the light guide 19 in the second direction, the number of the unit reflecting portions 41a arranged in the first direction is reduced to adjust the total area of the surface areas of the unit reflecting portions 41a. However, the interval between the unit reflecting portions 41a arranged in the first direction is increased and luminance unevenness may be caused. With the configuration in that the unit reflecting portions 41a include the separated unit reflecting portions 41aS arranged at intervals in the second direction, the number and the arrangement intervals of the unit reflecting portions 41a arranged in the first direction is not necessary to be changed. Therefore, the luminance unevenness is less likely to be caused in the exit light from the backlight device 12.

Further, the unit reflecting portions 41a of the exit light reflection portion 41 are open in the second direction by cutting off a part of the top portion 43a2 side of the light exit surface-side unit prisms 43a of the light exit surface-side prism portions 43. If the unit reflecting portions are not open in the second direction but have side surfaces parallel to the first direction, the light is refracted or reflected by the side surfaces parallel to the first direction and the light collecting performance by the light exit surface-side prism portions 43 may be deteriorated. The exit light reflection portion 41 is configured such that the unit reflecting portions 41a are open in the second direction by cutting off a part of the top portion 43a2 side of the light exit surface-side unit prisms 43a and therefore, the light exit surface-side prism portions 43 effectively exert the light collecting performance and the luminance of the exit light from the backlight device 12 is increased.

The apex angle of the light exit surface-side unit prisms 43a of the light exit surface-side prism portion 43 is preferably within a range from 135° to 155° or 100°. According to such a configuration, the luminance of the exit light is higher than that in the configuration in that the apex angle of the light exit surface-side unit prisms 43a is smaller than 135° and is not 100° or greater than 150°.

The light exit surface-side unit prisms 43a of the light exit surface-side prism portions 43 have the apex angle of 150°. According to such a configuration, the luminance of the exit light is improved at most.

The prism sheet 42 (light exit side anisotropic light collecting portion) is arranged on the light exit side with respect to the light guide plate 19 and includes the light exit-side unit prisms 42a (light exit-side unit light collecting portions) extending in the first direction and arranged in the second direction. According to such a configuration, the light exiting the light guide plate 19 through the light exit surface 19a is applied with the anisotropic light collecting properties by the prism sheet 42 arranged on the light exit side with respect to the light guide plate 19. The prism sheet 42 includes the light exit-side unit prisms 42a extending in the first direction and arranged in the second direction and with such a configuration, the light exiting the light exit-side unit prisms 42a is selectively applied with the light collecting action with respect to the second direction in which the light exit-side unit prisms 42a are arranged. Accordingly, the luminance of the exit light from the backlight device 12 can be increased.

The liquid crystal display device (the display device) 10 of the present embodiment includes the above-described backlight device 12 and the liquid crystal panel (the display panel) 11 displaying with using the light from the backlight device 12. According to the liquid crystal display device 10 having the above configuration, the luminance unevenness and the interference unevenness are less likely to be caused in the exit light from the backlight device 12 and the luminance is improved, and the display quality is improved.

Second Embodiment

Next, a second embodiment of the present invention will be described with reference to FIGS. 21 to 23. In the second embodiment, a configuration of an opposite plate surface-side convex lenticular lens portion 144 differs from that of the above embodiment. The configurations, operations, and effects that are similar to those in the first embodiment will not be described.

Figure 21:
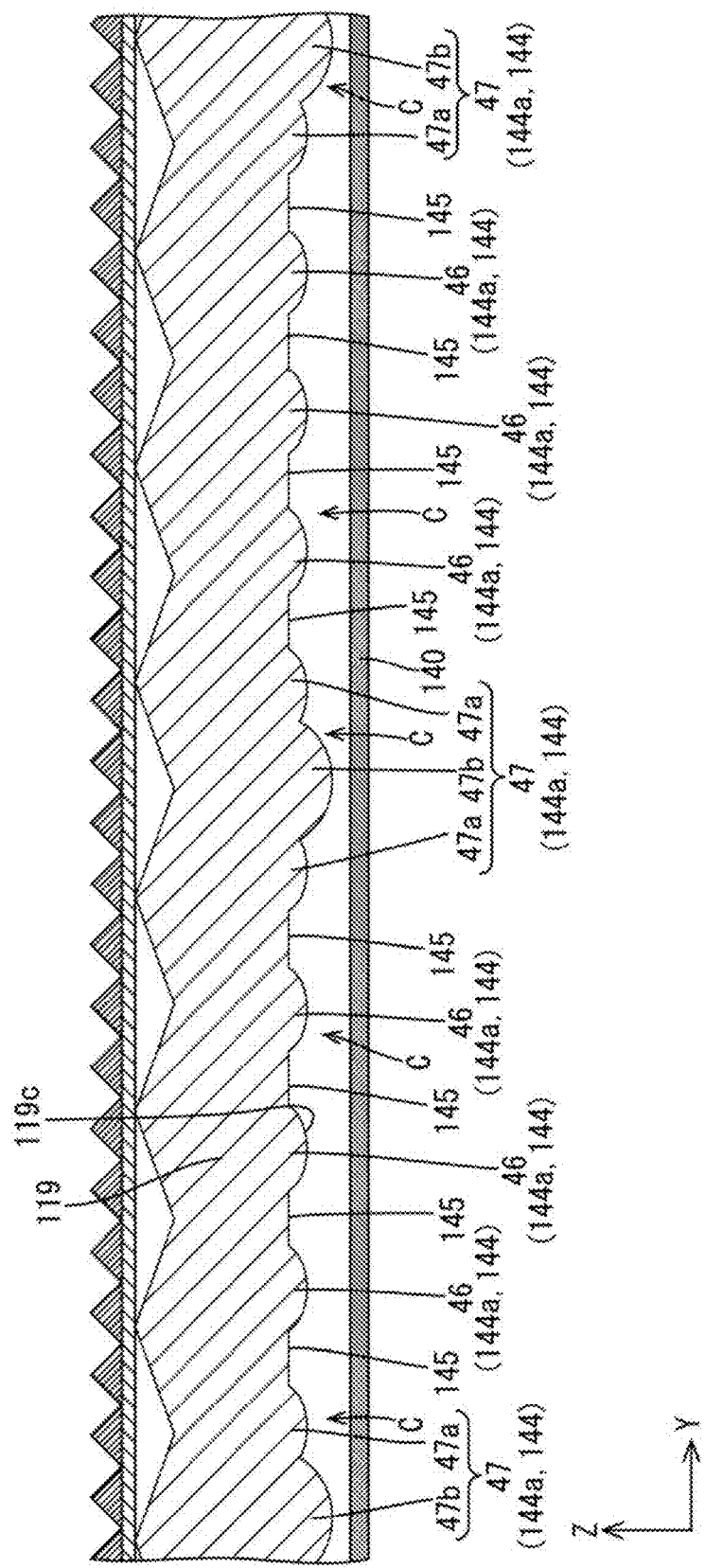
FIG. 21 is a cross-sectional view illustrating a cross-sectional configuration of a light entrance surface-side edge portion of a backlight device with respect to a long-side direction (the first direction, the X-axis direction) according to a second embodiment of the present invention, the cross-sectional view being taken along a short-side direction (the second direction, the Y-axis direction).
Figure 22:
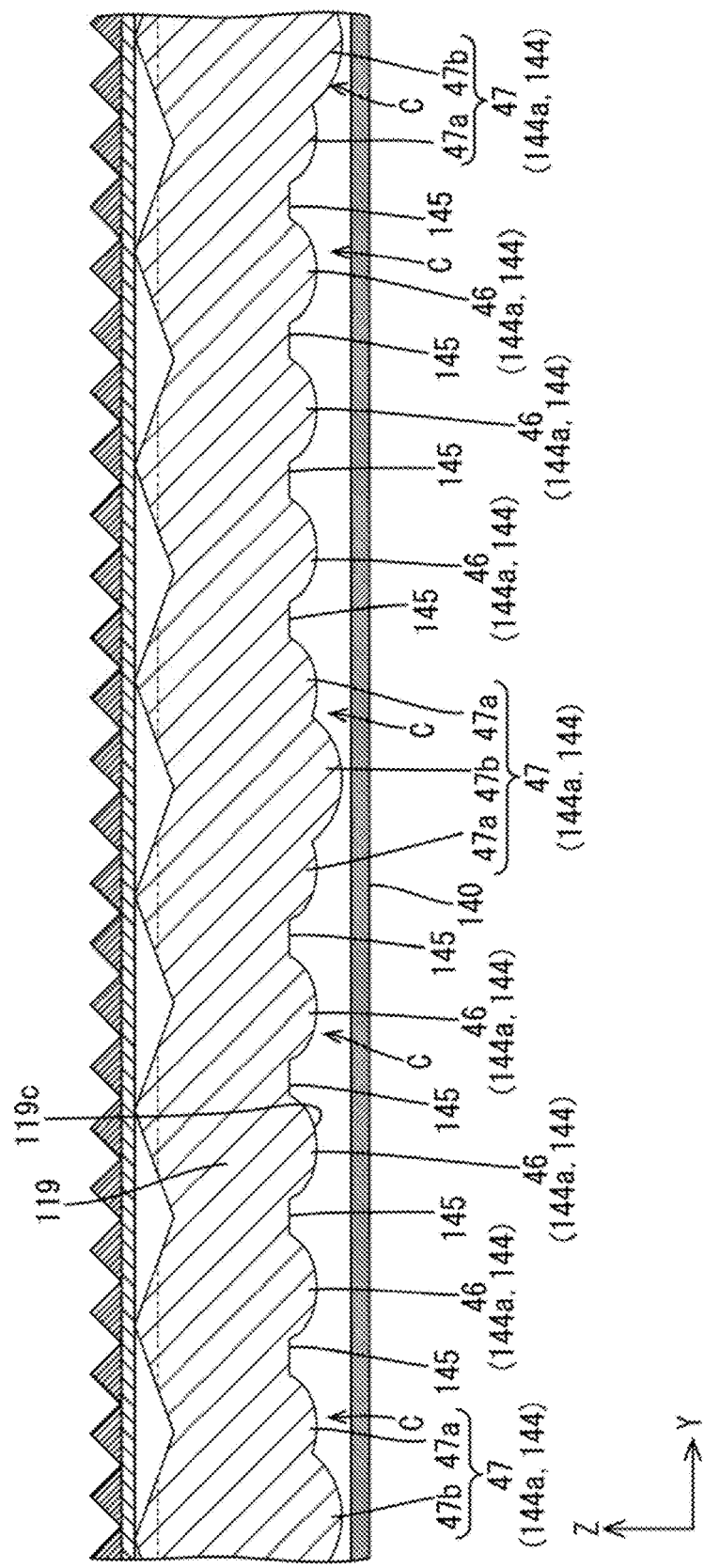
FIG. 22 is a cross-sectional view illustrating a cross-sectional configuration of a middle portion of the backlight device with respect to the long-side direction (the first direction, the X-axis direction) taken along the short-side direction (the second direction, the Y-axis direction).
Figure 23:
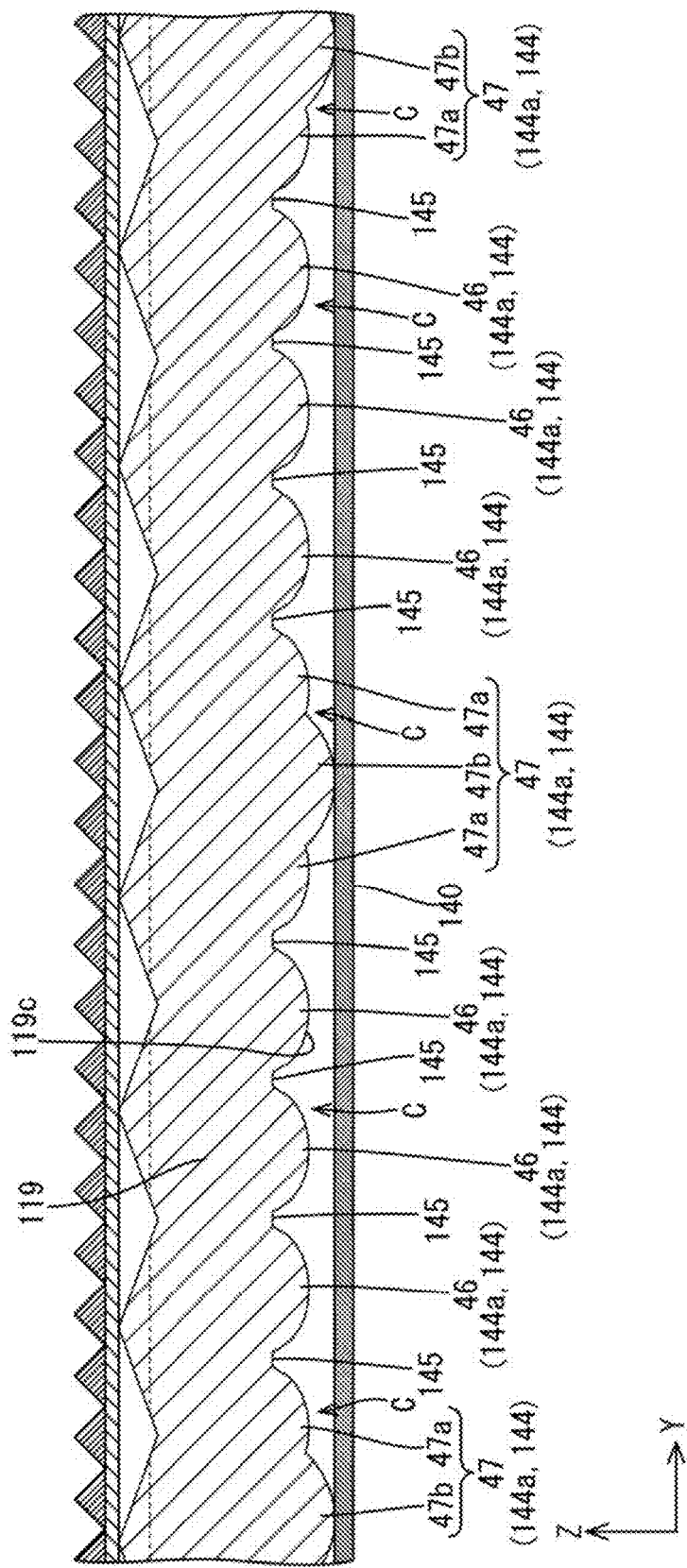
FIG. 23 is a cross-sectional view of an opposite edge surface-side edge portion of the backlight device with respect to the long-side direction (the first direction, the X-axis direction) taken along the short-side direction (the second direction, the Y-axis direction).

As illustrated in FIGS. 21 to 23, the opposite plate surface-side convex lenticular lens portion 144 includes opposite plate surface-side convex cylindrical lenses 144a. The opposite plate surface-side convex cylindrical lenses 144a include single opposite plate surface-side convex cylindrical lenses 46 (single opposite plate surface-side cylindrical lenses) and multiple continuous opposite plate surface-side convex cylindrical lenses 47 (continuous opposite plate surface-side cylindrical lenses). Flat portions 145 are disposed between the single opposite plate surface-side convex cylindrical lenses 46 with respect to the second direction (the Y-axis direction). The continuous opposite plate surface-side convex cylindrical lenses 47 are arranged continuously to each other in the second direction and have different height dimensions. The single opposite plate surface-side convex cylindrical lenses 46 have a configuration similar to that of the opposite plate surface-side convex cylindrical lenses 44a. The single opposite plate surface-side convex cylindrical lenses 46 and the flat portions 145 are alternately arranged in the second direction. The continuous opposite plate surface-side convex cylindrical lenses 47 are arranged at intervals in the second direction and the interval is equal to a dimension of a total of a width dimension of three single opposite plate surface-side convex cylindrical lenses 46 and a width dimension of four flat portions 145. The interval between the adjacent continuous opposite plate surface-side convex cylindrical lenses 47 is preferably set so as not to interfere with an arrangement interval between the pixels of the liquid crystal panel (not illustrated). The continuous opposite plate surface-side convex cylindrical lenses 47 include a pair of first continuous opposite plate surface-side convex cylindrical lenses 47a and a second continuous opposite plate surface-side convex cylindrical lens 47b. The first continuous opposite plate surface-side convex cylindrical lenses 47a have a relatively small width dimension and height dimension. The second continuous opposite plate surface-side convex cylindrical lens 47b has a relatively large width dimension and height dimension. The first continuous opposite plate surface-side convex cylindrical lenses 47a and the second continuous opposite plate surface-side convex cylindrical lens 47b are arranged adjacent to each other and continuously from each other in the second direction. According to such a configuration, a clearance C between a reflection sheet 140 and each of the single opposite plate surface-side convex cylindrical lenses 46, the flat portions 145, and the continuous opposite plate surface-side convex cylindrical lenses 47 is varied in more complicated way according to the position with respect to the second direction. Therefore, a phase of light totally reflecting off border surfaces of the single opposite plate surface-side convex cylindrical lenses 46, the flat portions 145, and the continuous opposite plate surface-side convex cylindrical lenses 47 is less likely to match a phase of light passes through the single opposite plate surface-side convex cylindrical lenses 46, the flat portions 145, and the continuous opposite plate surface-side convex cylindrical lenses 47 and reflecting off a reflection sheet 140. Accordingly, interference unevenness is further reduced.

As described above, according to the present embodiment, the opposite plate surface-side convex cylindrical lenses 144a of the opposite plate surface-side convex lenticular lens portion 144 include the single opposite plate surface-side convex cylindrical lenses 46 (single opposite plate surface-side cylindrical lenses) including the flat portions 145 therebetween with respect to the second direction and the multiple continuous opposite plate surface-side convex cylindrical lenses 47 (continuous opposite plate surface-side cylindrical lenses) that are disposed continuously from each other in the second direction and have different height dimensions. Accordingly, the clearance between the reflection sheet 140 and each of the single opposite plate surface-side convex cylindrical lenses 46, the flat portions 145, and the continuous opposite plate surface-side convex cylindrical lenses 47 is varied in more complicated way according to the position with respect to the second direction. Therefore, a phase of light totally reflecting off border surfaces of the single opposite plate surface-side convex cylindrical lenses 46, the flat portions 145, and the continuous opposite plate surface-side convex cylindrical lenses 47 is less likely to match a phase of light passes through the single opposite plate surface-side convex cylindrical lenses 46, the flat portions 145, and the continuous opposite plate surface-side convex cylindrical lenses 47 and reflecting off a reflection sheet 140. Accordingly, interference unevenness is further reduced.

Third Embodiment

Next, a third embodiment of the present invention will be described with reference to FIGS. 14 to 26. In the third embodiment, an opposite plate surface-side concave lenticular lens portion 48 is included for the opposite plate surface-side convex lenticular lens portion 44 of the first embodiment. The configurations, operations, and effects that are similar to those in the first embodiment will not be described.

As illustrated in FIGS. 24 to 26, a light guide plate 219 of the present embodiment includes the opposite plate surface-side concave lenticular lens portion 48 (an opposite plate surface-side anisotropic light collecting portion) on an opposite plate surface 219c. The opposite plate surface-side concave lenticular lens portion 48 includes opposite plate surface-side concave lenticular lenses 48a (an opposite plate surface-side unit light collecting portion, an opposite plate-side cylindrical lens) on the opposite plate surface 219c. The opposite plate surface-side concave lenticular lenses 48a extend in the first direction (the X-axis direction) and are arranged in the second direction (the Y-axis direction). The opposite plate surface-side concave lenticular lenses 48a are recessed from the opposite plate surface 219c toward the front side (the light exit side) in the third direction (the Z-axis direction 9 and are concave lenses. Each of the opposite plate surface-side concave lenticular lenses 48a has a semicircular cross-sectional shape taken in the second direction and is formed in a groove extending in the first direction and has a recessed arched surface 48a1. Each of the opposite plate surface-side concave cylindrical lenses 48a has a tangent Ta to a basal portion 48a2 of the arched surface 48a1 and a tangent angle θt formed by the tangent Ta and a line in the second direction is approximately 70°. The opposite plate surface-side concave cylindrical lenses 48a having such a configuration have optical characteristics almost same as those of the opposite plate surface-side convex cylindrical lenses 44a (see FIG. 9) described in the first embodiment. In the opposite plate surface-side concave cylindrical lenses 48a, light is likely to be incident on the arched surface 48a1 at an angle of incident greater than the critical angle compared to the opposite plate surface-side convex cylindrical lenses 44a of the first embodiment. Therefore, light is likely to totally reflect off the opposite plate surface-side concave cylindrical lenses 48. If the light reaching the opposite plate surface 219c enters the opposite plate surface-side concave cylindrical lenses 48a through the arched surface 48a1 at an angle of incident not greater than the critical angle, the light exits through the arched surface 48a1 toward the clearance C between the arched surface and the reflection sheet 240 with being refracted by the arched surface 48a1. The light in the clearance C is reflected by a reflection surface 240a of the reflection sheet 240 and when the reflected light reaches the opposite plate surface 219c again, the light enters the opposite plate surface-side concave cylindrical lenses 48a through the arched surface 48a1 and is refracted by the arched surface 48a1 again. The light affected by the anisotropic light collecting action by the opposite plate surface-side concave cylindrical lenses 48a is less likely to be collected with respect to the second direction via a prism sheet 242 and is likely to be dispersed via the prism sheet 242 with respect to the second direction. Therefore, the luminance unevenness in the exit light through the prism sheet 242 is improved but the front luminance may not be improved.

The opposite plate surface-side concave cylindrical lenses 48a are formed such that a width dimension (a dimension with respect to the second direction) varies according to the position in the first direction. Specifically, the opposite plate surface-side concave cylindrical lenses 48a have a width dimension that corresponds to an occupied ratio to the opposite plate surface 219c with respect to the second direction, and the occupied ratio changes as follows. The occupied ratio of the opposite plate surface-side concave cylindrical lenses 48a is continuously and gradually increased as is farther away from the light entrance surface and closer to the opposite edge surface with respect to the first direction. The occupied ratio of the opposite plate surface-side concave cylindrical lenses 48a is continuously and gradually decreased as is farther away from the opposite edge surface and closer to the light entrance surface with respect to the first direction. The specific values of the occupied ratio of the opposite plate surface-side concave cylindrical lenses 48a are similar to those of the opposite plate surface-side convex cylindrical lenses 44a of the first embodiment. The opposite plate surface-side concave cylindrical lenses 48a are formed such that the height dimension thereof (the dimension in the third direction) varies according to the position with respect to the first direction. Namely, the height dimension of the opposite plate surface-side concave cylindrical lenses 48a changes similarly to the width dimension thereof according to the position in the first direction. Therefore, a surface area (area of the arched surface 48a1) of the opposite plate surface-side concave cylindrical lenses 48a also changes similarly to the width dimension and height dimension thereof according to the position in the first direction. The clearance C between the opposite plate surface-side concave cylindrical lenses 48a and the reflection sheet 240 has a height dimension that is equal to the height dimension of the opposite plate surface-side concave cylindrical lenses 48a and changes similarly to the height dimension thereof according to the position in the first direction.

As illustrated in FIGS. 24 to 26, the light guide plate 219 includes flat portions 245 in a non-forming area of an opposite plate surface 219c where the opposite plate surface-side concave lenticular lens portions 48 (the opposite plate surface-side concave cylindrical lenses 48a) are not formed. The flat portions 245 are flat in the first direction (the X-axis direction) and the second direction (the Y-axis direction). The flat portions 245 are included adjacent to the opposite plate surface-side concave cylindrical lenses 48a with respect to the second direction. Namely, the opposite plate surface-side concave cylindrical lenses 48a and the flat portions 245 are included on the opposite plate surface 219c of the light guide plate 219 alternately with respect to the second direction. The flat portions 245 are formed such that the width dimension thereof (the dimension with respect to the second direction) changes according to the position with respect to the first direction. Specifically, the occupied ratio of the flat portions 245 to the opposite plate surface 219c with respect to the width dimension thereof or the second direction is continuously and gradually increased as is closer to the light entrance surface and farther away from the opposite edge surface in the first direction and is continuously and gradually decreased as is closer to the opposite edge surface and farther away from the light entrance surface in the first direction. The specific values of the occupied ratio of the flat portions 245 with respect to the second direction are similar to those of the first embodiment. According to the configuration of the present embodiment, occurrence of the interference unevenness and the luminance unevenness is effectively suppressed and high front luminance is obtained similarly to the first embodiment.

Other Embodiments

The present invention is not limited to the embodiments, which have been described using the foregoing descriptions and the drawings. For example, embodiments described below are also included in the technical scope of the present invention.

(1) Other than the above embodiments, the specific values of the minimum value and the maximum value of the occupied ratio of the opposite plate surface-side convex lenticular lens portions (the opposite plate surface-side concave lenticular lens portions) to the opposite plate surface with respect to the second direction may be changed. Similarly, the specific values of the minimum value and the maximum value of the occupied ratio of the flat portions to the opposite plate surface with respect to the second direction may be changed. In making such change, the minimum value of the occupied ratio of the opposite plate surface-side convex lenticular lens portions (the opposite plate surface-side concave lenticular lens portions) may be smaller than or equal to the maximum value of the occupied ratio of the flat portions. The maximum value of the occupied ratio of the opposite plate surface-side convex lenticular lens portions (the opposite plate surface-side concave lenticular lens portions) may be smaller than or equal to the maximum value of the occupied ratio of the flat portions.

(2) Other than each of the above embodiments, the specific values of the occupied area ratio of the opposite plate surface-side convex lenticular lens portions (the opposite plate surface-side concave lenticular lens portions) to the opposite plate surface may be changed. Similarly, the specific values of the occupied area ratio of the flat portions to the opposite plate surface may be changed. In making such change, the occupied area ratio of the opposite plate surface-side convex lenticular lens portions (the opposite plate surface-side concave lenticular lens portions) may be smaller than or equal to the occupied area ratio of the flat portions.

(3) In each of the above embodiments, the occupied ratio of the opposite plate surface-side convex lenticular lens portions (the opposite plate surface-side concave lenticular lens portions) and the occupied ratio of the flat portions to the opposite plate surface with respect to the second direction are continuously and gradually increased or decreased. However, the occupied ratio of the opposite plate surface-side convex lenticular lens portions (the opposite plate surface-side concave lenticular lens portions) and the occupied ratio of the flat portions to the opposite plate surface with respect to the second direction may be increased or decreased in a stepwise and sequential manner. In such a case, a border between the opposite plate surface-side convex lenticular lens portions (the opposite plate surface-side concave lenticular lens portions) and the flat portions has a stepped plan shape.

(4) In each of the above embodiments, the occupied ratio of the opposite plate surface-side convex lenticular lens portions (the opposite plate surface-side concave lenticular lens portions) and the occupied ratio of the flat portions to the opposite plate surface with respect to the second direction are continuously and gradually increased or decreased and the border between the occupied ratio of the opposite plate surface-side convex lenticular lens portions (the opposite plate surface-side concave lenticular lens portions) and the flat portions is inclined with a plan view. However, the border between the occupied ratio of the opposite plate surface-side convex lenticular lens portions (the opposite plate surface-side concave lenticular lens portions) and the flat portions may be curved with a plan view.

(5) In each of the above embodiments, a change rate of the occupied ratio of the opposite plate surface-side convex lenticular lens portions (the opposite plate surface-side concave lenticular lens portions) and the occupied ratio of the flat portions to the opposite plate surface with respect to the second direction is constant. However, the change rate may be altered and the border between the occupied ratio of the opposite plate surface-side convex lenticular lens portions (the opposite plate surface-side concave lenticular lens portions) and the flat portions may be bent with a plan view.

(6) In each of the above embodiments, the opposite plate surface-side convex lenticular lens portions (the opposite plate surface-side concave lenticular lens portions) and the flat portions are formed over an entire area of the opposite plate surface with respect to the first direction. However, the opposite plate surface-side convex lenticular lens portions (the opposite plate surface-side concave lenticular lens portions) and the flat portions may be formed in a part of the opposite plate surface with respect to the first direction.

(7) Other than each of the above embodiments, the specific values of the apex angle of the light exit surface-side unit prisms of the light exit surface-side prism portions may be changed. Similarly, the specific values of the apex angle of the light exit-side unit prisms included in the prism sheet may be changed.

(8) In the second embodiment, the numbers of the first continuous opposite plate surface-side convex cylindrical lenses and the second continuous opposite plate surface-side convex cylindrical lens included in the continuous opposite plate surface-side convex cylindrical lenses may be changed. The number of the single opposite plate surface-side convex cylindrical lenses and the number of flat portions between the adjacent continuous opposite plate surface-side convex cylindrical lenses may be changed. Continuous opposite plate surface-side concave cylindrical lenses may be included for the continuous opposite plate surface-side convex cylindrical lenses.

(9) In each of the above embodiments, the reflection sheet of a mirror surface reflection type is used. However, a reflection sheet of disperse reflection type may be used.

(10) In each of the above embodiments, the light exit surface-side prism portions may not be included. The prism sheet may not be included.

(11) In each of the above embodiments, the optical sheet includes only one prism sheet. However, the optical sheet may further include other types of optical sheets (such as a dispersing sheet or reflection type polarizing sheet). Multiple prism sheets may be included.

(12) In each of the above embodiments, one LED board is arranged along the light entrance surface of the light guide plate. However, two or more LED boards may be arranged along the light entrance surface of the light guide plate.

(13) In each of the above embodiments, one short-side edge surface of the light guide plate is the light entrance surface and the LED board is arranged opposite the light entrance surface. A long-side edge surface of the light guide plate may be the light entrance surface and the LED board may be arranged opposite the light entrance surface. In such a configuration, the extending direction of the light exit-side unit prisms, the light exit surface-side unit prisms, and the opposite plate surface-side convex lenticular lens portions (the opposite plate surface-side concave lenticular lens portions) may match the short-side direction of the light guide plate, and the width direction (the arrangement direction) of the light exit-side unit prisms, the light exit surface-side unit prisms, and the opposite plate surface-side convex lenticular lens portions (the opposite plate surface-side concave lenticular lens portions) may match the long-side direction of the light guide plate.

(14) In each of the above embodiments, the backlight device of one-side light entrance type is included and in such a backlight device, only one edge surface of the outer peripheral edge surfaces of the light guide plate is the light entrance surface. However, a backlight device of two-sides light entrance type may be used. In such a backlight device, a pair of edge surfaces of the outer peripheral edge surfaces of the light guide plate that are opposite each other is the light entrance surface. A pair of short-side edge surfaces of the light guide plate may be the light entrance surfaces or a pair of long-side edge surfaces may be the light entrance surfaces.

(15) In each of the above embodiments, the light guide plate (the backlight device) is rectangular. However, the light guide plate may be a square. The light guide plate (the backlight device) may be a shape having a curved outer shape such as a circular shape or an ellipsoidal shape other than the rectangular shape.

(16) In each of the above embodiments, the LEDs of a top surface light emitting type are used. However, LEDs of a side surface light emitting type may be used. In the LEDs of the side surface light emitting type, a side surface adjacent to a mounting surface that is mounted on the LED board is a light emitting surface.

(17) In each of the above embodiments, the projection-capacitive touch panel pattern is used for the touch panel. However, a surface-capacitive touch panel pattern, a resistance film type touch panel pattern, and an electromagnetic induction type touch panel pattern may be used. The touch panel may not be included and the touch panel pattern may be built-in the liquid crystal panel (in-cell type). The function of the touch panel may not be included.

(18) A parallax barrier panel (a switching liquid crystal panel) including a parallax barrier pattern may be used. With the parallax barrier pattern, an observer can see stereoscopic images (3D images, three-dimensional images) by separating an image displayed on a display surface of the liquid crystal panel with parallax. Both of the parallax barrier panel and the touch panel may be used.

(19) The parallax barrier panel described in (18) may include a touch panel pattern and the parallax barrier panel may include the function of touch panel.

(20) In each of the above embodiments, the liquid crystal panel used in the liquid crystal display device has a screen size of approximately 5 inches. However, the specific screen size of the liquid crystal panel may be varied other than 5 inches.

(21) In each of the above embodiments, the color filter of the liquid crystal panel includes the color portions of three colors of R, G, and B. However, the color portions may include four colors or more.

(22) In each of the above embodiments, the LEDs are used as the light source. However, other light sources such as organic EL may be used.

(23) In each of the above embodiments, the frame is made of metal. However, the frame may be made of synthetic resin or may not be included. The heat dissipation member may not be included.

(24) In each of the above embodiments, the toughened glass including a chemically toughened layer on a surface thereof is used as the cover panel. However, a toughened glass toughened with air-cooling/tempering (physically toughened glass) may be used.

(25) In each of the above embodiments, the toughened glass is used as the cover panel. However, the toughened glass may not be used but normal glass (non-toughened glass) or synthetic resin may be used as the cover panel.

(26) In each of the above embodiments, the liquid crystal display device includes the cover panel. However, the liquid crystal display device may not include the cover panel or the touch panel. Each of the components included in the liquid crystal display device may not be included, if necessary.

(27) In each of the above embodiments, the TFTs are used as switching components of the liquid crystal display device. However, switching components other than the TFTs (such as thin film diodes (TFDs)) may be included in the scope of the present invention. Furthermore, a liquid crystal display device configured to display black and white images other than the liquid crystal display device configured to display color images.

EXPLANATION OF SYMBOLS

10: liquid crystal display device (display device), 11: liquid crystal panel (display panel), 12: backlight device (lighting device), 17: LED (light source), 19, 119, 219: light guide plate, 19a: light exit surface, 19b: light entrance surface, 19c, 119c, 219c: opposite plate surface, 19d: opposite edge surface (non-light entrance opposite surface), 40, 140, 240: reflection sheet (reflecting member), 40a, 240a: reflection surface, 41: exit light reflection portion, 41a: unit reflecting portions, 41a: separated unit reflecting portions, 42, 242: prism sheet (light exit side anisotropic light collecting portion), 42a: light exit-side unit prisms (light exit-side unit light collecting portions), 43: light exit surface side prism portions (light exit surface side anisotropic light collecting portion), 43a: light exit surface-side unit prisms (light exit surface-side unit light collecting portions), 43a2: top portion, 44, 144: opposite plate surface-side convex lenticular lens portion (opposite plate surface-side anisotropic light collecting portion), 44a, 144a: opposite plate surface-side convex cylindrical lenses (an opposite plate-side cylindrical lenses), 45, 145, 245: flat portions, 46: single opposite plate surface-side convex cylindrical lenses, 47: multiple continuous opposite plate surface-side convex cylindrical lenses, 48: opposite plate surface-side concave lenticular lens portion (an opposite plate surface-side anisotropic light collecting portion), 48a: opposite plate surface-side concave lenticular lenses (an opposite plate-side cylindrical lens), C: clearance

The invention claimed is:

1. A lighting device comprising:
a light source;
a rectangular light guide plate having a top surface, a bottom surface, and a plurality of peripheral edge surfaces, the light source arranged to project light into a first of the peripheral edge surfaces;
a reflecting member arranged proximate the bottom surface of the light guide plate, and configured to reflect back to the bottom surface light exiting from such bottom surface;
a plurality of reflecting elements disposed on the top surface of the light guide plate, each of the reflecting elements extending in a first direction parallel to the first peripheral edge surfaces of the light guide plate, the plurality of reflecting elements arranged at intervals in a second direction orthogonal to the first peripheral edge surface, the reflecting elements configured to help cause light travelling within the light guide plate to exit through the top surface of the light guide plate;
a plurality of cylindrical lenses formed on the bottom surface of the light guide plate and arranged in the first direction and extending in the second direction, a first density of the plurality of cylindrical lenses on the bottom surface being lower near the first peripheral edge surface than distal from the first peripheral edge surface; and
a plurality of flat portions formed on the bottom surface of the light guide plate, each flat portion proximate to at least one of the plurality of cylindrical lenses, a second density of the plurality of flat portions on the bottom surface being higher near the first peripheral edge surface than distal from the first peripheral edge surface.

2. The lighting device according to claim 1, wherein
the plurality of cylindrical lenses include a plurality of single and continuous cylindrical lenses,
the flat portions are disposed between the single and continuous cylindrical lenses along the first direction, and the single and continuous cylindrical lenses are arranged continuously to each other in the first direction and have different height dimensions.

3. The lighting device according to claim 1, further comprising a plurality of light exit side light collecting portions disposed on the light exit side, the plurality of light exit side light collecting portions extending in the second direction and arranged in the first direction.

4. A display device comprising:
the lighting device according to claim 1; and
a display panel configured to display images using light from the lighting device.

5. The lighting device according to claim 1, wherein
the first density is continuously and gradually increased as is farther away from the first peripheral edge surface along the second direction, and the second density is continuously and gradually decreased as is farther away from the first peripheral edge surface along the second direction.

6. The lighting device according to claim 5, wherein
the cylindrical lenses and the flat portions extend along an entire area of the bottom surface in the second direction.

7. The lighting device according to claim 5, wherein
the first density is about 60% in a portion of the light guide plate closest to the first peripheral edge surface, and about 90% in a portion of the light guide plate farthest from the first peripheral edge surface, and
the second density is about 40% in a portion of the light guide plate closest to the first peripheral edge surface, and about 10% in a portion of the light guide plate farthest from the first peripheral edge surface.

8. The lighting device according to claim 5, wherein
the first density is continuously and gradually increased and the second density is continuously and gradually decreased, from the first peripheral edge surface to an opposite second peripheral edge surface side with respect to the second direction.

9. The lighting device according to claim 1, further comprising a plurality of top surface side light collecting portions disposed on the top surface side of the light guide plate, the light plurality of top surface side light collecting portions extending in the second direction and arranged in the first direction.

10. The lighting device according to claim 9, wherein the plurality of top surface side collecting portions include prisms each having an apex angle of 100°.

11. The lighting device according to claim 9, wherein the plurality of reflecting elements include separated reflecting elements arranged at intervals in the first direction.

12. The lighting device according to claim 11, wherein the plurality of reflecting elements are formed by cutting off a part of a top portion of each of the light collecting portions.

13. The lighting device according to claim 9, wherein the plurality of top surface side light collecting portions the light exit include prisms each having an apex angle within a range from 135° to 155°.

14. The lighting device according to claim 13, wherein the prisms each having an apex angle of 150°.

* * * * *